(12) United States Patent
Katoh et al.

(10) Patent No.: US 6,289,125 B1
(45) Date of Patent: *Sep. 11, 2001

(54) IMAGE PROCESSING DEVICE AND METHOD FOR INDENTIFYING AN INPUT IMAGE, AND COPIER SCANNER AND PRINTER INCLUDING SAME

(75) Inventors: Mitsutaka Katoh; Kouichi Ohmae; Shinya Sonoda, all of Kyoto; Masahito Yanagida, Nagaokakyo; Masanori Senga, Takatuki, all of (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,001

(22) Filed: Jan. 9, 1998

Related U.S. Application Data

(63) Continuation of application No. 08/376,142, filed on Jan. 20, 1995, now Pat. No. 5,845,008.

(30) Foreign Application Priority Data

Jan. 20, 1994 (JP) .................................................... P6-19879
Feb. 25, 1994 (JP) .................................................... P6-51100
May 13, 1994 (JP) .................................................... P6-123319

(51) Int. Cl.⁷ ..................................................... G06K 9/62
(52) U.S. Cl. ......................... 382/194; 382/135; 382/218; 382/317
(58) Field of Search .................................... 382/135, 137, 382/287, 317, 100, 232, 203, 217, 218, 194; 399/366; 283/72, 93, 902; 358/1.14

(56) References Cited

U.S. PATENT DOCUMENTS

| 4,265,469 | * | 5/1981 | Mowry, Jr. et al. ................... 283/94 |
| 4,341,404 | * | 7/1982 | Mowry, Jr. et al. ................... 283/93 |

(List continued on next page.)

FOREIGN PATENT DOCUMENTS

| 0 342 060 | 11/1989 | (EP) . |
| 0 382 549 | 8/1990 | (EP) . |
| 0 490 457 A1 | 6/1992 | (EP) . |
| 2 067 322 | 7/1981 | (GB) . |

(List continued on next page.)

OTHER PUBLICATIONS

Copy of the European Search Report dated Dec. 7, 1996 in European Application No. 95100769.95 (5 pages).

*Primary Examiner*—Jon Chang
(74) *Attorney, Agent, or Firm*—Dickstein Shapiro Morin & Oshinsky LLP

(57) ABSTRACT

An image processing device is disclosed which can reliably detect documents which may not be copied, which has a very small probability of false positives, and which can handle newly issued documents which may not be copied. In addition, an image processing scheme is disclosed which would accurately obtain the location of a pattern indicating a document to be detected; which would extract that pattern; which would determine correctly whether it is the right pattern; and which would make it difficult for anyone to tamper with the pattern. To achieve this, a specified pattern is imprinted before use on a document which may not be copied, and a previously specified number of positioning marks and dummy marks which identify the location of the pattern may also be imprinted. The device is able to detect a wide variety of documents and perform the required processing at high speed.

20 Claims, 66 Drawing Sheets

U.S. PATENT DOCUMENTS

| | | |
|---|---|---|
| 4,475,122 | 10/1984 | Green . |
| 4,567,610 | 1/1986 | McConnell . |
| 4,596,038 * | 6/1986 | Yoshida ................................ 382/182 |
| 4,736,109 | 4/1988 | Dvorzsak . |
| 4,823,393 | 4/1989 | Kawakami . |
| 4,908,873 * | 3/1990 | Philibert et al. ..................... 382/100 |
| 4,945,914 | 8/1990 | Allen . |
| 5,063,603 | 11/1991 | Burt . |
| 5,189,292 | 2/1993 | Batterman et al. . |
| 5,241,166 | 8/1993 | Chandler . |
| 5,245,165 | 9/1993 | Zhang . |
| 5,260,556 | 11/1993 | Lake et al. . |
| 5,363,212 | 11/1994 | Taniuchi et al. . |
| 5,475,468 | 12/1995 | Natsudaira . |
| 5,506,936 | 4/1996 | Hisano . |
| 5,515,451 | 5/1996 | Tsuji et al. . |
| 5,572,596 | 11/1996 | Wildes et al. . |
| 5,740,514 * | 4/1998 | Natsudaira ........................... 399/366 |
| 5,757,926 * | 5/1998 | Nagashima et al. .................. 399/366 |
| 6,128,401 * | 10/2000 | Suzuki et al. ........................ 382/135 |

FOREIGN PATENT DOCUMENTS

| | | |
|---|---|---|
| 2 088 051 | 3/1992 | (GB) . |
| 2-052384 | 2/1990 | (JP) . |
| 5-324839 | 12/1993 | (JP) . |
| 6-054186 | 2/1994 | (JP) . |
| 6-070155 | 3/1994 | (JP) . |
| 6-268859 | 9/1994 | (JP) . |

* cited by examiner

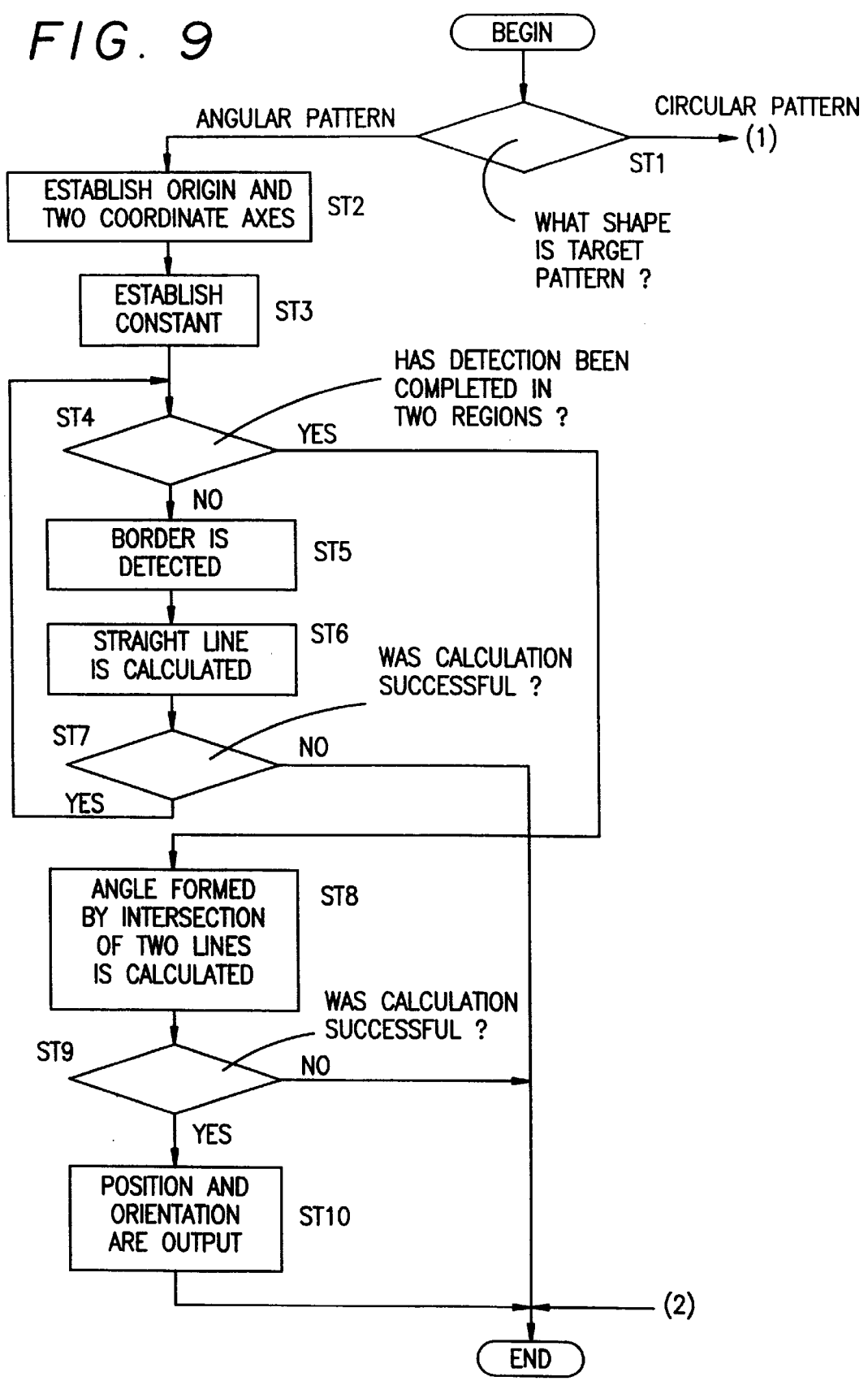

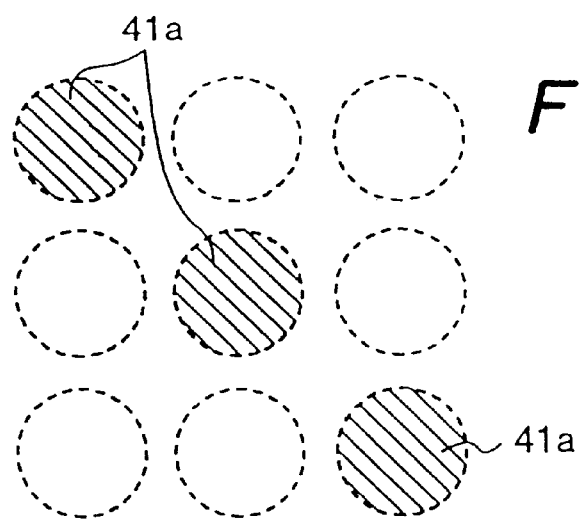
FIG. 18(A) ⇒ "A"
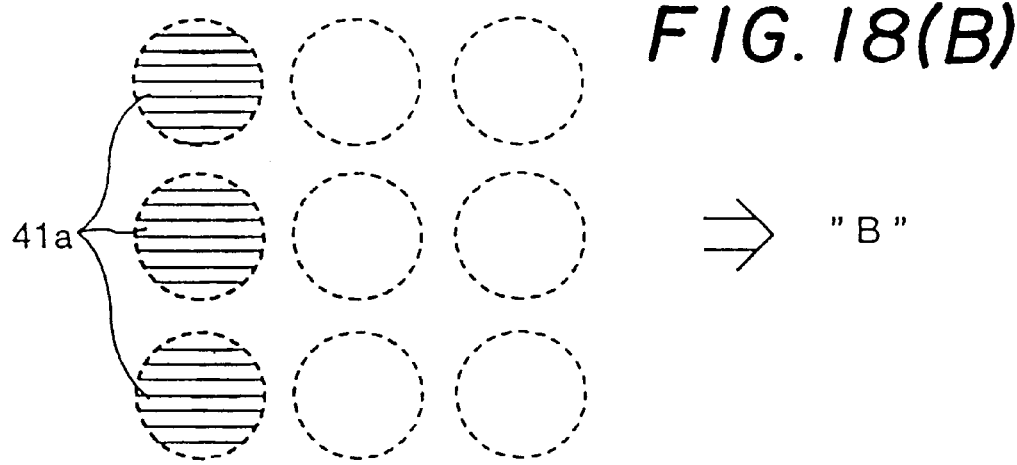
FIG. 18(B) ⇒ "B"
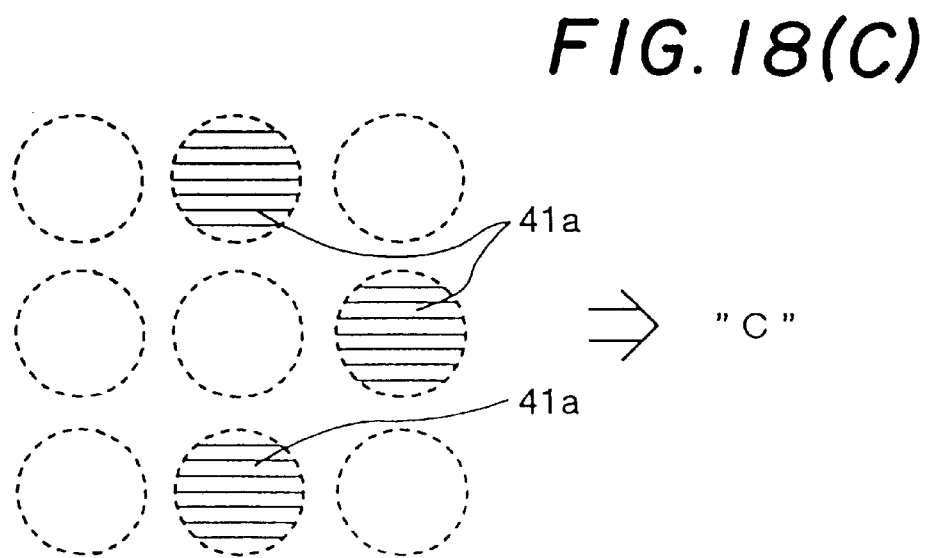
FIG. 18(C) ⇒ "C"

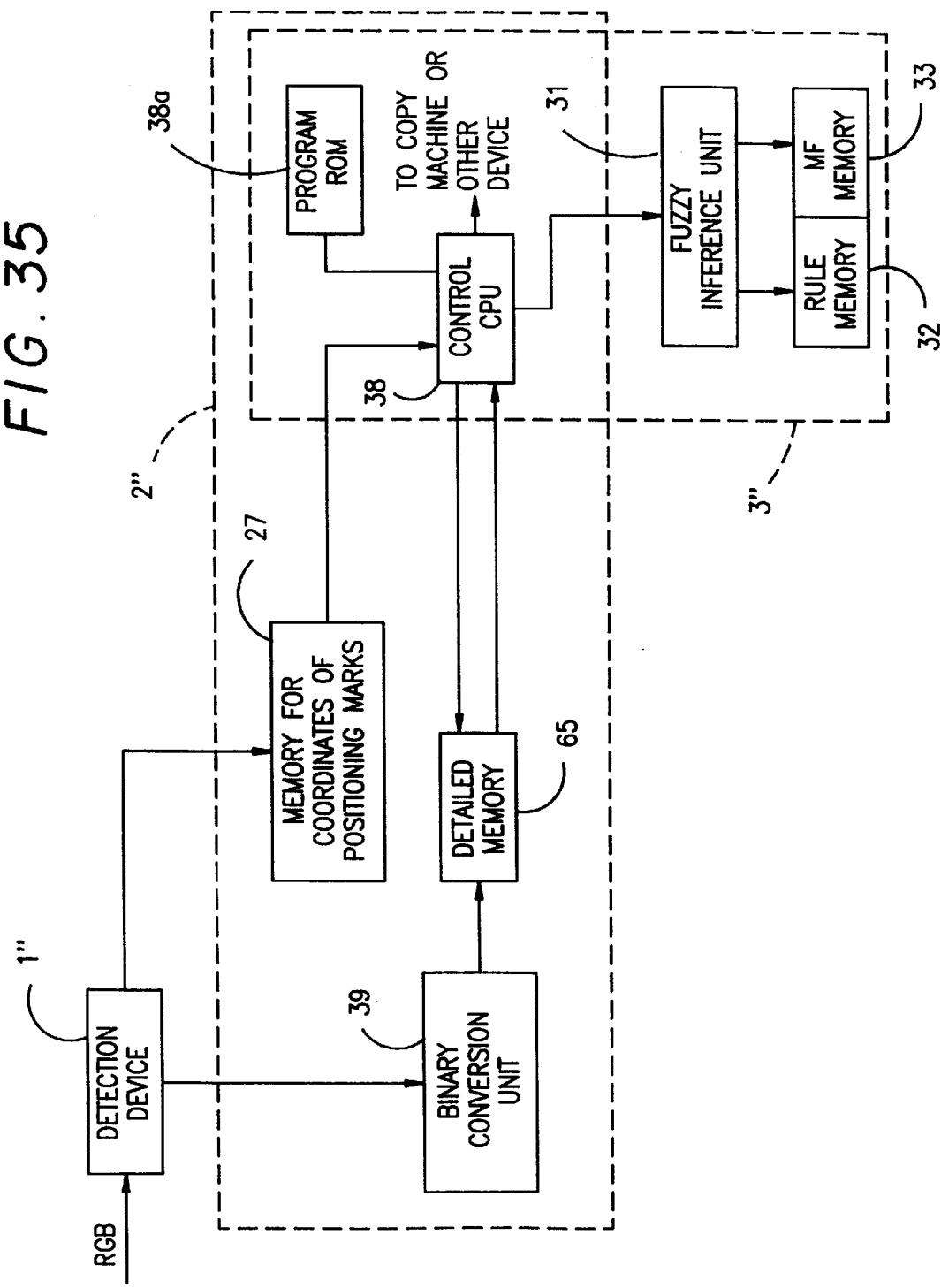

EXAMPLES OF RULES

IF CHARACTERISTIC COUNT 1 IS MEDIUM,
   CHARACTERISTIC COUNT 2 IS MEDIUM,
   CHARACTERISTIC COUNT 3 IS HIGH, AND
   CHARACTERISTIC COUNT 4 IS MEDIUM,

THEN THE PATTERN IS IDENTICAL TO THE REFERENCE PATTERN

| 0   | 0   | 0   | 0   | 0.5 | 0.8 | 0.8 | 0.8 | 0.8 | 0.8 | 0.8 | 0.5 | 0   | 0   | 0   |
|-----|-----|-----|-----|-----|-----|-----|-----|-----|-----|-----|-----|-----|-----|-----|
| 0   | 0   | 0   | 0.5 | 0.8 | 1   | 1   | 1   | 1   | 1   | 1   | 0.8 | 0.5 | 0   | 0   |
| 0   | 0   | 0.5 | 0.8 | 1   | 0.8 | 0.8 | 0.8 | 0.8 | 0.8 | 0.8 | 1   | 0.8 | 0.5 | 0   |
| 0   | 0.5 | 0.8 | 1   | 0.8 | 0.5 | 0.5 | 0.5 | 0.5 | 0.5 | 0.5 | 0.8 | 1   | 0.8 | 0.5 |
| 0   | 0.5 | 0.8 | 1   | 0.8 | 0.5 | 0   | 0   | 0   | 0   | 0.5 | 0.8 | 1   | 0.8 | 0.5 |
| 0   | 0.5 | 0.8 | 1   | 0.8 | 0.5 | 0   | 0   | 0   | 0   | 0.5 | 0.8 | 1   | 0.8 | 0.5 |
| 0.5 | 0.8 | 1   | 0.8 | 0.5 | 0   | 0   | 0   | 0   | 0   | 0.5 | 0.8 | 1   | 0.8 | 0.5 |
| 0.5 | 0.8 | 1   | 0.8 | 0.5 | 0   | 0   | C   | 0   | 0   | 0.5 | 0.8 | 1   | 0.8 | 0.5 |
| 0.8 | 1   | 0.8 | 0.5 | 0   | 0   | 0   | 0   | 0   | 0   | 0.5 | 0.8 | 1   | 0.8 | 0.5 |
| 0.8 | 1   | 1   | 0.8 | 0.5 | 0   | 0   | 0   | 0   | 0   | 0.5 | 0.8 | 1   | 0.8 | 0.5 |
| 0.5 | 0.8 | 0.8 | 1   | 0.8 | 0.5 | 0   | 0   | 0   | 0   | 0.5 | 0.8 | 1   | 0.8 | 0.5 |
| 0   | 0.5 | 0.8 | 1   | 0.8 | 0.8 | 0.5 | 0   | 0   | 0.5 | 0.8 | 1   | 0.8 | 0.5 | 0   |
| 0   | 0.5 | 0.8 | 1   | 1   | 1   | 0.8 | 0.5 | 0.5 | 0.8 | 1   | 0.8 | 0.5 | 0   | 0   |
| 0   | 0   | 0.5 | 0.8 | 0.8 | 1   | 0.8 | 0.8 | 0.8 | 0.8 | 1   | 0.8 | 0.5 | 0   | 0   |
| 0   | 0   | 0   | 0.5 | 0.8 | 1   | 1   | 1   | 1   | 1   | 1   | 0.8 | 0.5 | 0   | 0   |

FIG. 49

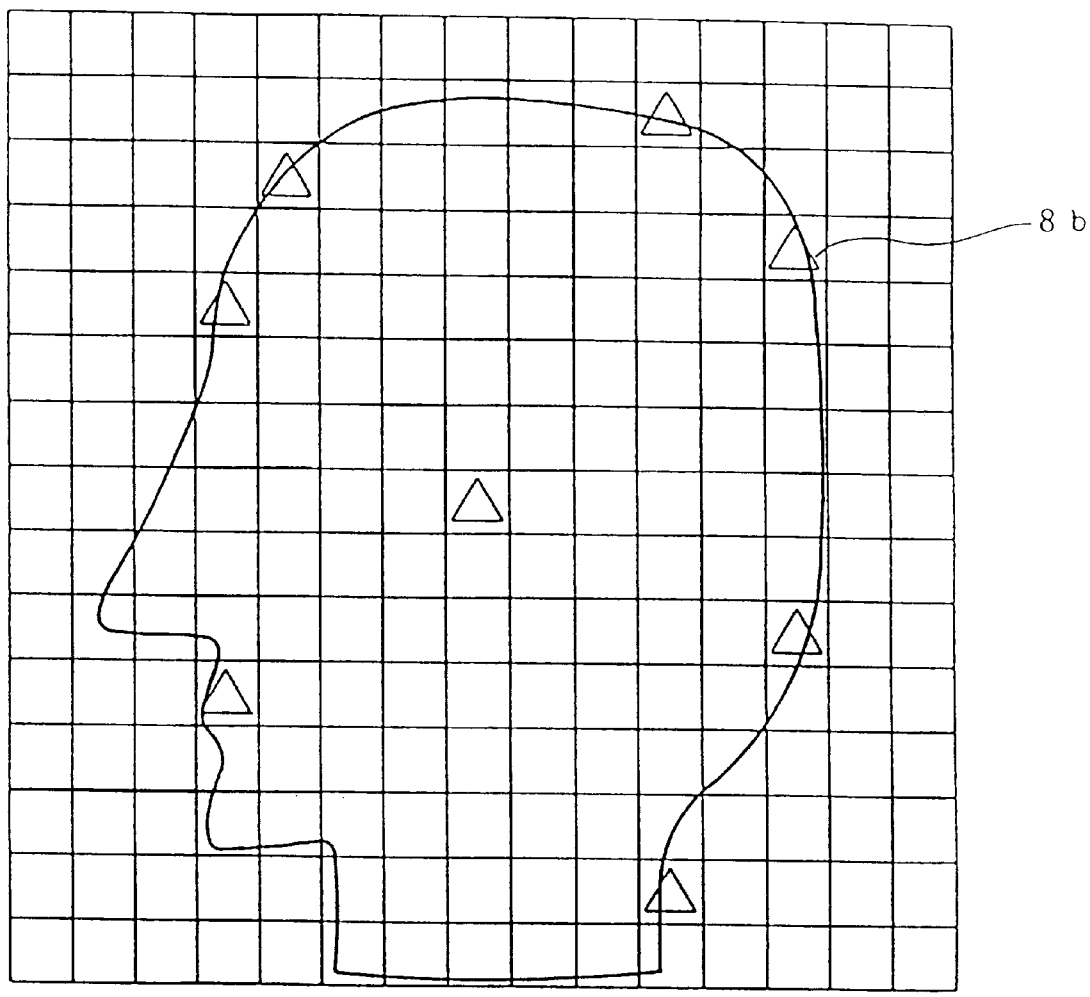
F I G. 60

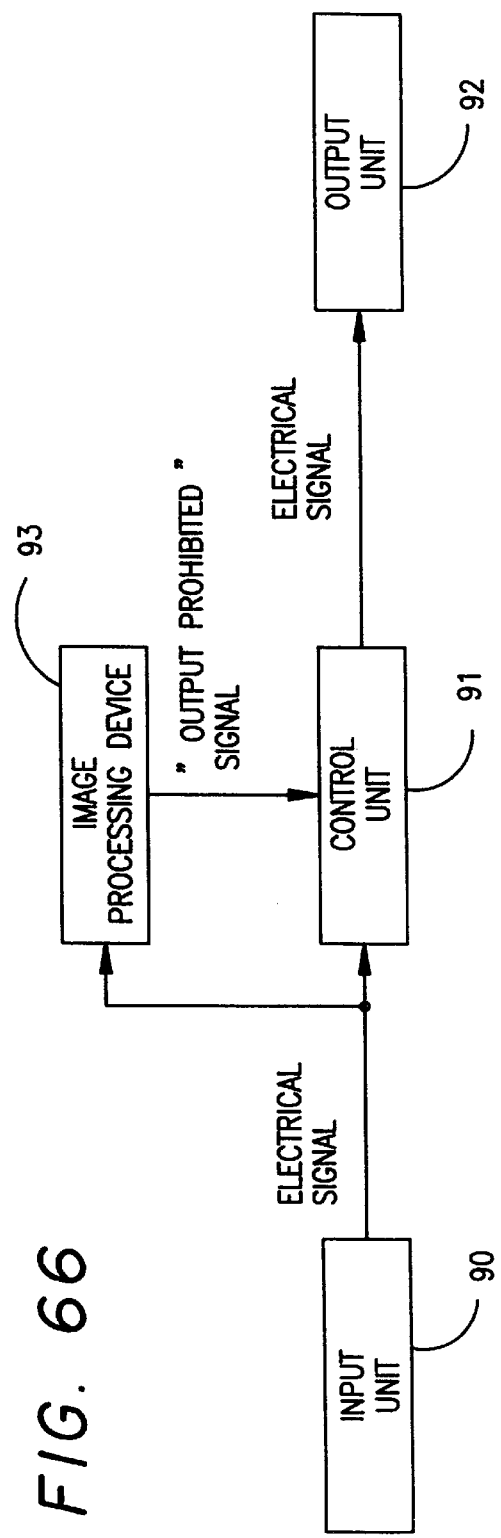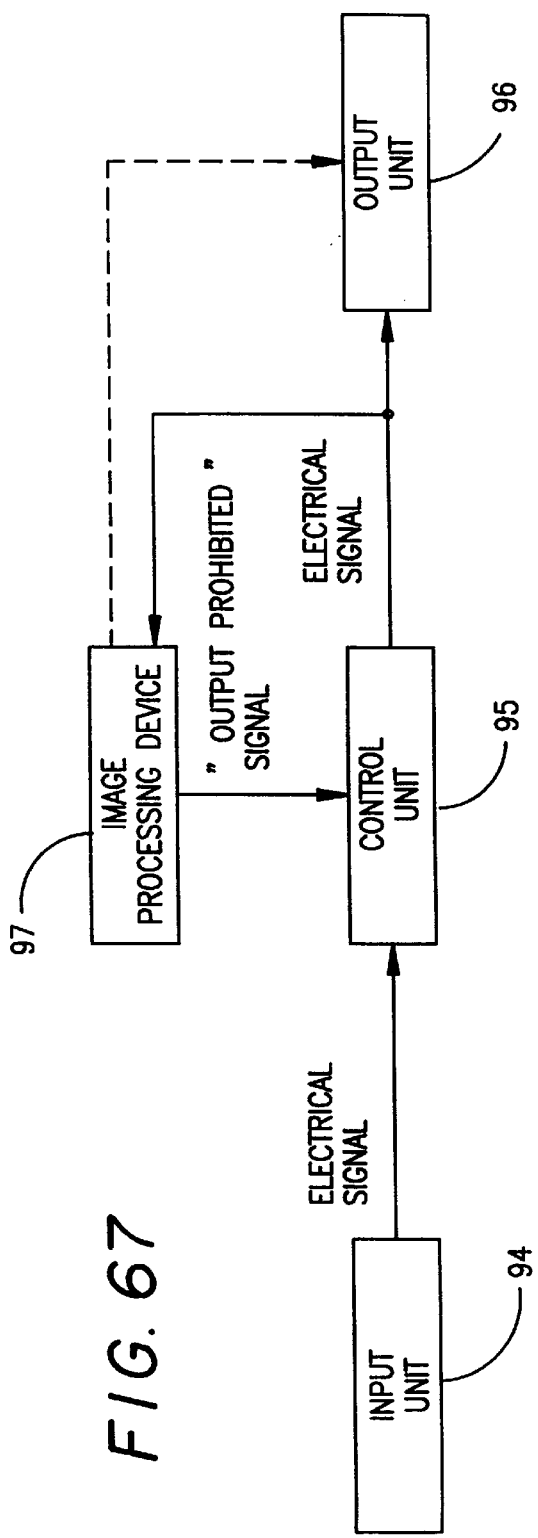

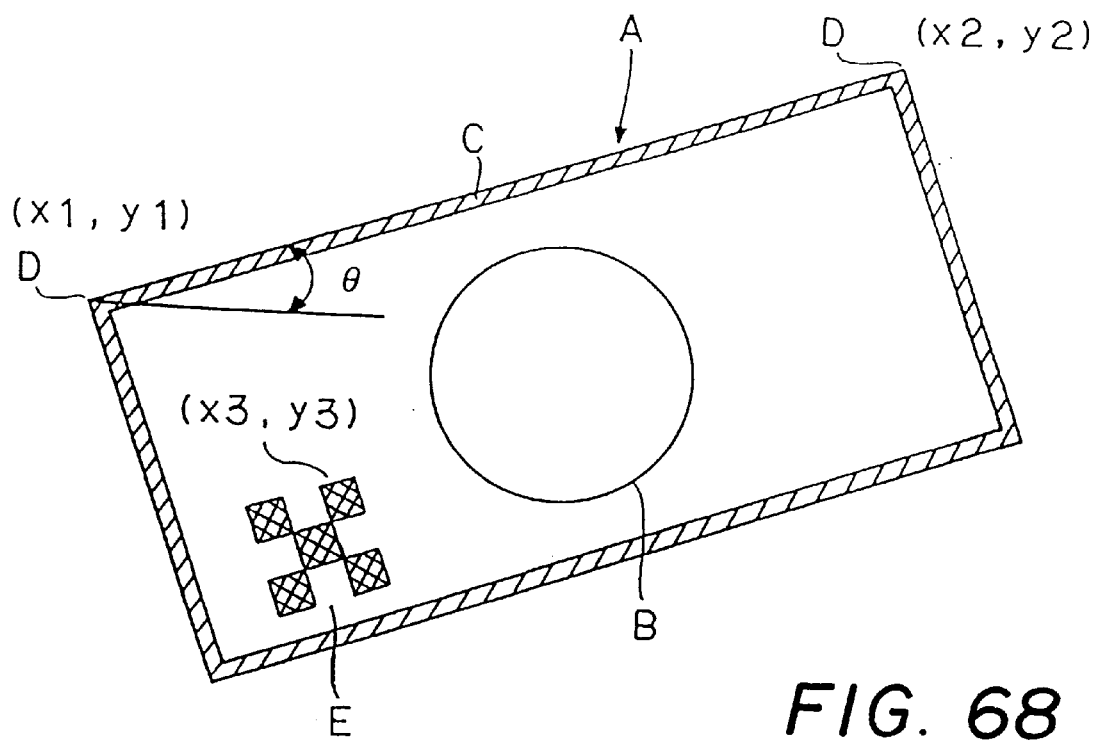
FIG. 68
PRIOR ART
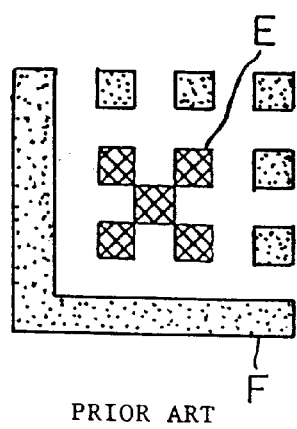
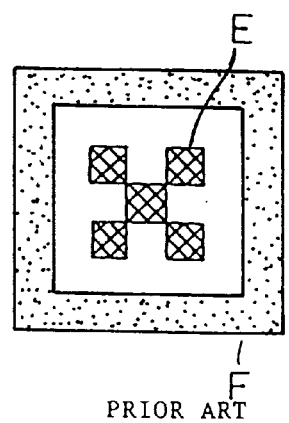
FIG. 69(A)   FIG. 69(B)
PRIOR ART   PRIOR ART

IMAGE PROCESSING DEVICE AND METHOD FOR INDENTIFYING AN INPUT IMAGE, AND COPIER SCANNER AND PRINTER INCLUDING SAME

This application is a continuation of U.S. patent application Ser. No. 08/376,142, filed Jan. 20, 1995, now U.S. Pat. No. 5,845,008.

FIELD OF THE INVENTION

This invention concerns an image processing device and Method for identifying an input image, and Copier Scanner and Printer including same. More precisely, this invention concerns an image processing device and method for identifying an input image ideally suited for scanning documents which may not be copied, such as bank notes or negotiable securities, and preventing a copier from printing out copies of them. It also concerns a copier, scanner and printer in which such a device is installed.

This invention involves two major embodiments. The first embodiment concerns an image processing device equipped with a device to detect a pattern within image data it has received which is a potential match for a specified pattern; a device to extract this pattern, once detected, from the aforesaid image data; and a matching device which performs a fuzzy inference using fuzzy knowledge which is assembled beforehand based on the specified pattern which is established, and which calculates the goodness of fit of the said potential match with respect to the said specified pattern.

This image processing device of the first embodiment is distinguished by the following. The aforesaid specified pattern consists of a number of cells. The density of one or more of these cells is made to differ from that of those surrounding it or them. The segment containing the information which is coded in this way may be a portion of the pattern or the entire pattern.

The second embodiment concerns an image processing scheme ordered as follows. First, marks are detected which are arranged in a given spatial relationship in image data printed on, for example, bank notes or negotiable securities. Next, from the location of the said marks, a region is obtained which has a given spatial relationship with respect to them. The image data in the said region are extracted, and a determination is made as to whether they contain a pattern which tags this document as a target.

BACKGROUND OF THE INVENTION

The development in recent years of copying devices such as full-color copiers has enhanced the quality of reproduction to a level at which one cannot distinguish the copy from the original with the naked eye. Such faithful reproductions can now be obtained inexpensively. However, we must consider that along with this benefit comes the increased risk of copiers being put to such illicit uses as counterfeiting money, negotiable securities, and other original documents whose reproduction is legally prohibited. To avert this danger, various devices have been developed to prevent copiers from being used for counterfeiting. One such device is the image processing device disclosed in Japanese Patent publication 2-210481, 2-210481 and an American patent application Ser. No. 08/321,651 filed on Oct. 11, 1994.

That prior art image processing device reads the original image placed on the glass of the copier by scanning the entire original four times. It is used in full-color digital copy machines. Let us assume that a bank note has been loaded into the copy machine. On the first scan, the device detects the rough location of watermark B on bank note A, the document whose forgery is to be prevented (See FIG. 68), on the assumption that the document on the glass is, in fact, a bank note.

On the second scan, the device detects, based on the location of watermark B, the exact position of the bill and the angle at which it is placed (i.e., the exact position coordinates of the bill on the glass). Since the length, size and shape of bank note A, the item to be detected, are known in advance, when the data exceed a given threshold value we convert them to binary values and extract edges C (hatched area) of bank note A. Based on the location of these edges, we obtain the coordinates of two of the bill's apices D, $(x_1, y_1)$ and $(x_2, y_2)$.

In this way we can obtain slope $\theta$. On the third scan, the device calculates the position coordinates $(x_3, y_3)$ of the red seal E stamped on the bill from the exact position of the bill obtained in the second scan (i.e., from the coordinates of apices D and angle $\theta$). Based on these position coordinates, it extracts an image from the region in which seal E is placed, and it determines whether there is in fact a red seal on this item.

By scanning the item three times, the device is able to determine whether the document loaded in the copier is one which it would be illegal to copy (in this case, a bank note). If the device detects that a prohibited document such as a bank note has been loaded to be copied, it will perform its specified anti-counterfeiting operations on the fourth scan, such as making the entire display go black and preventing the copier from operating.

Since existing devices such as that described above require a number of scans to detect a bank note or other item which cannot be copied, arriving at a judgment is time-consuming. Furthermore, not all full-color copiers use a four-scan copying scheme like the one described above. Some scan the original three times, and others only once. The processing device described above cannot be used with these types of copiers. Another problem is that an extremely large memory capacity is needed merely to store data concerning one feature such as the size of paper money. Inevitably, then, only a limited number of kinds of money can be detected.

With the existing scheme, a pattern is selected from all the patterns on a document which may not be copied. This pattern must-have the appropriate number of features so that it can be clearly distinguished, and it must be a pattern which cannot be found on ordinary documents which may be copied. This pattern is matched against suspect patterns on the document to be copied. Even if the process is limited to a single country, there are an enormous number of documents which may not be copied. Attempting to detect all of them with certainty requires a huge memory capacity and lengthy processing time. Existing devices are unable to perform this processing in real time. If, after the copier is manufactured, a new document appears which may not be copied, the device will not be able to handle the document or even detect it. To detect the document, a new set of features must be selected and taught to the copier, which is a complicated procedure. If we are to include the documents of other countries, the problem becomes even more overwhelming.

Such a device requires three scans to determine whether the document loaded in the copier is a bank note or some other item which may not be copied. And if, for example, apex D of bank note A is folded or otherwise mutilated, the device will be unable to obtain the location of seal E. Consequently, it will be unable to determine whether the document being processed is actually bank note A.

One solution to this problem is shown in FIGS. 69 (A) and (B). Here guidelines F, consisting of thick solid or broken lines, are printed so as to enclose specified pattern E. We extract the interior of the region enclosed by guidelines F and determine whether this is the specified pattern. When guidelines F like those in the drawing are used, it becomes easier to separate the specified pattern from other image data. Using straight lines makes it easier to calculate slope, angles and coordinates of apices, so the pattern can be extracted more simply and accurately.

However, guidelines F are prominent enough (i.e., the feature is large enough) that they, and with them the pattern E which they designate, can easily be recognized. This makes it easier for a person to mutilate guidelines F or pattern E (by adding extra lines, erasing portions, and so on). Such mutilation may affect whether the pattern can be recognized (and so extracted), or even if the pattern is recognized, the device may be unable to determine whether it is the specified pattern.

When an existing scheme or the scheme described above using guidelines F is used, a pattern must be selected from the shapes found on the prohibited document which is well suited for a characteristic count, such as the red seal on a bank note. (A suitable pattern is one which can be conclusively distinguished and which will not be found on any ordinary document which may be copied.) Candidates are then matched against this pattern. Even if we limit the scope to a single country, there is a vast number of documents which may not be copied. To detect all of them reliably would require an extensive memory capacity and a significant amount of processing time. This would make it impossible to perform the copier processing in real time.

If, after the copier is manufactured, a new document appears which may not be copied, the device will not be able to handle the document or even detect it. To detect the document, a new set of features must be selected and taught to the copier, which is a complicated procedure. If we are to include the documents of other countries, the problem becomes even more overwhelming.

SUMMARY OF THE INVENTION

In view of the difficulties discussed above, the first objective of this invention is to provide an image processing device which is able to detect a bank note or other proscribed document by scanning it only once; which will not require a large memory capacity; which will be capable of performing high-speed processing in real time; which can be produced at a low cost; which can detect specified patterns with certainty, with a very small probability of false positives; which can detect a broad range of documents; and which will be able to handle new documents which may not be copied, as well as a copier in which such a device is employed.

The second objective of this invention is to provide an image processing scheme and device which can solve these various problems as well as a copier, scanner and printer in which they are employed. More specifically, this scheme and device will be able to recognize unmistakably a specified pattern on a document and specify its location. This will make the extraction of the pattern and the determination of its identity easier and more accurate. The third objective of this invention is to provide a scheme and device which will use the minimal number of scans to detect and evaluate a pattern, and which will ideally be able to perform the processing on a single scan. Yet the fourth objective is to provide a scheme and device such that the specified pattern (including the positioning marks, if such marks are used to pinpoint the location of the pattern) would be difficult for an uninformed person to discern, so as to minimize the probability of tampering.

First Embodiment

To achieve the objectives outlined above, the image processing device of the first embodiment is equipped with a device to detect a pattern in image data which it has received which is a potential match for a specified pattern; a device to extract this pattern, once detected, from the aforesaid image data; and a device to perform a fuzzy inference using fuzzy knowledge which was assembled beforehand based on the specified pattern which was established, and which calculates the goodness of fit of the said potential match with respect to the said specified pattern. The aforesaid specified pattern consists of a number of cells. The density of one of these cells is made to differ from that of those surrounding it. The segment containing the coded information may be a portion of the pattern or the entire pattern.

Ideally, the aforesaid matching device creates a gradated image by reducing the resolution of the said image data which it has received and matches this gradated image against a gradated image of the said specified pattern which was established beforehand.

A number of the aforesaid specified patterns may be established which have in common a portion outside the aforesaid coded information and/or a portion of that information. The specified pattern may consist of a number of cells arranged either in a grid of dimensions n×m, or in concentric circles.

To cause the color density of a cell to vary from that of the surrounding cells, one could saturate the entire cell with a color and use its entire surface as a region from which to extract a characteristic count; however, considering the danger of misregister, it would be better to establish in a specified location within a given cell a fictitious mark whose diameter is less than the width of a cell and then vary the color density of this mark. Alternatively, an identical result can be obtained by selecting as the sampling region the portion of that cell which is within a circle of specified location whose diameter is less than the width of the cell.

The color density of the aforesaid cell should have a number of grades, so that the density of a single cell can be expressed as multivalued data.

The copier of this invention has at least a device to scan a document; a device which is connected to said scanning device and which transforms the image data which that device has scanned into color signals for printing; and a printing device, which receives the output of the signal transformer and performs specified processing needed for printing. This copy machine has one of the image processing devices described herein. It inputs the image data output by the aforesaid document scanner in parallel to the aforesaid signal transformer and to the aforesaid image processor, which determines whether the, said specified pattern can be found in the document being processed. It sends a control signal to the specified processing device in the copy machine at least when it has determined that the said specified pattern is present in order to prevent the copying operation from proceeding.

The device to detect a specified pattern reduces the resolution of the specified pattern which it is supposed to detect using image data which it receives to create a gradated image. It uses this gradated image in the matching process to detect candidates which are potential matches for the specified pattern. It then sends the image data concerning the said candidates to the device which extracts the specified pattern. Based on the image data which it has stored, this device extracts the image which is in the specified region independently from the processing performed for the aforesaid rough search. It sends the extracted image to the matching device, which performs the next stage of the process. This device matches the patterns using fuzzy inference and determines whether the candidate which has been found is in fact the specified pattern. Using fuzzy inference to compare the patterns allows us to overcome the problem of misregister or printing error so that proscribed documents will be detected reliably and accurately. The device to detect a specified pattern narrows the field of candidates before the final matching process is performed, so the actual number of candidates which must be matched is reduced.

With this invention, there will be in at least a portion of a given specified pattern which is detected coded data which were determined ahead of time. Because this specified pattern is printed somewhere on the bank note, stock certificate, or other item which may not be copied, a proscribed document will be detected accurately regardless of what type of document it is or what its shape or appearance may be. There is virtually no possibility that an ordinary document would have a pattern identical to a specified pattern in at least a portion of which there are coded data. This minimizes the probability of false positives. Since the object to be detected is already determined, processing can be performed at high speed.

When a bank note or other proscribed document has been loaded in a copier in which the image processing device of this invention is installed, the specified pattern on the document will be detected. A prohibit copy command will be issued, and the item will not be copied or output.

Second Embodiment

To achieve the objectives outlined above, the image processing scheme of the second embodiment is designed as follows. Positioning marks, which are arranged in a given spatial relationship, are detected among the image data received. From the location of the said positioning marks which are detected, a region is obtained which is in a specified relationship with respect to the marks. The image data from the said region are extracted from the data received during a given number of scans performed after the marks are detected. A determination is then made as to whether the pattern which tags a document as one which may not be copied has been found among the said image data.

Ideally, in addition to the said positioning marks in a given location on the document, there will be an arrangement of dummy marks which are either identical or similar to the positioning marks. These dummy marks can be used in the aforesaid specified processing. If the specified pattern is composed of marks which are identical or similar to the positioning marks, but which are arranged in a given spatial relationship different from that of the positioning marks, the aforesaid specified processing can be performed using these marks as a basis.

An image processing device according to this invention in which such a scheme could be implemented consists of a device to detect among the image data which it receives a specified set of positioning marks provided in given locations on documents to be detected; a device to extract the region containing the specified pattern, which it calculates using data concerning the positions of the marks detected by the said detection device; and a device to compare two patterns, which determines whether the specified pattern which occurs on documents to be detected can be found in the region extracted by the extraction device.

Ideally, the said device to detect the positioning marks detects at least three positioning marks which are arranged in a predetermined spatial relationship. The shape formed by the imaginary lines linking the said three or more adjacent marks arranged in a specified relationship is an isosceles triangle or some other asymmetrical shape.

The device to detect the positioning marks should have a device to convert to binary form the image data it receives and a searching device which uses a mask partitioned into n×m units to detect, from the binary dark-light image data detected in each cell comprising the said mask, any mark identical to the said positioning marks, and detect its coordinate data. Then, despite its simple configuration, the device will be able to process data at high speed.

If the said device to compare two patterns obtains the degree of resemblance between the said pattern in the extracted region and the reference pattern, or more specifically, if it uses fuzzy inference (i.e., fuzzy pattern matching) to calculate the degree of resemblance, the device will cope well with shifts of position, and its recognition rate will be high.

Alternatively, the said device to compare two patterns may, for example, partition the said extracted region into N cells; decode it using the result obtained for the density of each cell; and determine whether the decoded data match the coded reference data on the document to be detected, which were obtained earlier.

Another processing scheme which would achieve the objectives stated above would be to detect, among the image data received, a given set of identical marks, store the location of these marks, and obtain the number of marks on the outline of a given shape based on data concerning the location of the said marks. From the total number of these marks, it can be determined whether the pattern detected among the said data is, in fact, the specified pattern.

When this scheme is used, the various procedures described above could also be performed on an arrangement of dummy marks which are identical or similar to the marks in specified locations on the document, as described earlier. If the dummy marks are identical to the real marks, they must be located away from the outline of the shape delineated by the real marks constituting the specified pattern. If the dummy marks merely resemble the real marks, they may be placed anywhere. It is also desirable that one more identical mark be placed in the center of a specified pattern consisting of a number of identical marks arranged along the outline of a given shape.

The relative location of the said marks on the outline of the given shape can serve as a criterion for concluding that a specified pattern consisting of a number of the said marks has been found, so that a determination as to whether the pattern which would tag the document can be found in the said image data is based on the total number of marks in the outline of the said shape and on data concerning the location of each mark in the outline of the given shape.

The device in which the various schemes discussed above is implemented may, for example, consist of a device to detect among the image data which it receives specified marks provided in given locations on documents to be detected; and a device which receives data concerning the locations of the marks detected by the said detection device, and, using at least the criterion of whether there is a specific number of marks along the outline of a given shape, determines whether the specified pattern has been found. The device to detect the marks may have essentially the same configuration as the device to detect positioning marks described above.

It is desirable that the said device to detect a specified pattern should weight the data with a coefficient which decreases with the distance from the outline of the said shape, and consider both the number of marks detected and the coefficients of the locations of said marks when determining whether this is the specified pattern. The said device to detect a specified pattern should at least be equipped with a device which calculates the goodness of fit of a pattern based on the number of marks detected, and a device which, when the goodness of fit calculated by the said calculating device for a certain pattern exceeds a specified value, matches that pattern, using rotary matching, against at least one previously provided reference pattern to detect the desired specified pattern.

The copier, scanner and printer of this invention are equipped with one of the image processing devices described above. The image data output by the device in the copier which reads the document are input in parallel fashion into both the device to convert color signals and the said image processing device. Input/output signals to the control device in the scanner or printer are input in parallel to the image processing device.

Based on specific image data obtained by scanning the document, the device performs processing to detect the said specified pattern. It determines whether or not the said pattern can be found on the document loaded for copying. If it determines that the said pattern is present, it sends a control signal to the said processing device to control the specified processing, which is either copying, scanning the image, or outputting the copy (printing it out).

The device to detect the positioning marks is operated. An inspection is made to determine whether there are positioning marks among the image data received. If such marks are detected, data representing their position coordinates are obtained. The device to extract the specified pattern is operated. From the location of the positioning marks, the location of the specified pattern, which is in a given spatial relationship with respect to the marks, is calculated. The image in a given region is extracted based on its location among the image data received. (These data are the same ones in which the positioning marks are detected.) The extracted data are sent to the device to compare two patterns, where the next stage of the operation will be performed. The given comparison is performed and it is determined whether the specified pattern can be found in the given region. The device to detect a specified pattern narrows the field of candidates before the final matching process is performed, so the actual number of candidates which must be compared is reduced, and the determination can be made in real time.

When the specified pattern consists of a number of identical marks arranged in a given spatial relationship without the use of positioning marks, the processing performed by the device to detect the marks is virtually identical to that used to detect the said positioning marks. The specified pattern consists of a given number of marks arranged to form the outline of a given shape. On this basis, the device to detect the specified pattern can count the marks in the outline of a given shape. By determining whether the value it finds is a specified number (with a margin provided above and below it), the device can determine, in a simple fashion, whether the specified pattern has been found.

If more than one specified number is used as a judgment criterion, the value of the pattern consisting of detected marks is compared with a number of reference values sequentially. Based on each of these values, a determination is made as to whether the specified pattern has been found. In this case, coded data can be added to the pattern, detection can be made more complex, and mistaken identification can be minimized, thus enhancing the reliability of the device.

If the data are weighted according to their location, and given a coefficient which decreases with the distance from a given location, then a given mark will be counted among the total even if it has been shifted slightly from its predicted location as a result of a misprint or detection error. This will enable the specified pattern to be detected conclusively, without mistakes in identification or detection.

If the location (i.e., the relative location) of each mark in the outline of a given shape is also used as a criterion for detecting the specified pattern, the processing is as follows. First, the goodness of fit of the pattern is calculated by the device for that purpose, based on the number of marks detected. Next, if the goodness of fit calculated by the said device exceeds a fixed value, the matching device matches the pattern against at least one previously established reference pattern and determines if the patterns match. If the specified pattern contains angle data, determinations can be processed more rapidly. If, without considering angle data, candidates are preprocessed (eliminated) according to their goodness of fit, the number of candidates which must actually be matched will be much reduced, and processing can be performed at high speed.

As long as the coordinates of the positioning marks or those constituting the specified pattern are specified, the marks can be reduced in size to make them less conspicuous. This will make it more difficult for an uninformed person to find the pattern, which is in a given spatial relationship with respect to the positioning marks. So if any person attempts to counterfeit a bill by tampering with a specified part of it so that the positioning marks or the pattern itself will not be detected, he will not be able to pinpoint the location of the marks. Bills marked in this way will be difficult to tamper with; even if they are tampered with, there is little likelihood that the tampering will correspond to the location of the marks. Prohibited documents such as bank notes will be detected with absolute certainty. If dummy marks are provided in addition to the positioning marks, tampering can be suppressed even more effectively.

When a bank note or other proscribed document has been loaded in a copier in which the image processing device of this invention is installed or when a scanner and printer are caused to scan the document and print it out, the specified pattern on the document will be detected. A halt copy command will be issued, and the item will not be copied, scanned, or printed out.

BRIEF DESCRIPTION OF THE DRAWINGS

FIG. 9 is a flow chart illustrating the function of corner detection in the position detection unit.

FIG. 14 (B) shows a modified version of this specified pattern.

FIGS. 18(A)–18(C) illustrate another way in which the specified pattern may be employed.

FIG. 35 is a block diagram showing the internal organization of the device to extract the specified pattern and the device to match this pattern against a reference pattern.

FIG. 49 illustrates the operation of the device to detect the specified pattern.

FIG. 60 shows an example of how code data can be incorporated in the specified pattern.

FIG. 66 shows an example of a scanner according to this invention.

FIG. 67 shows an example of a printer according to this invention.

FIG. 68 illustrates the operation of an image processing device belonging to the prior art.

FIGS. 69(A)–69(B) illustrate one idea used in the prior art to solve a problem.

DETAILED DESCRIPTION OF THE INVENTION

First Embodiment

We shall next give a detailed explanation, with reference to the appended drawings, of a first ideal embodiment of the image processing device and system and the copier in which these are used which are designed according to this invention. The processing device in this example is installed in a full-color copy machine. It is designed to detect paper money when someone attempts to copy it and prevent the copying process from proceeding to completion.

The substance of this invention is that a specified pattern (details of which will be discussed later) which can be detected reliably, is unlikely to be found on any ordinary document, and is unlikely to give rise to false positives is prepared beforehand. This pattern is printed in a desired location on bank notes, stock certificates, or any other documents which may not be copied. The image processing device is given knowledge of this specified pattern. When a new document appears which may not be copied, the specified pattern can be put on it, and it too will be detected. Since the item to be detected is always the same specified pattern, it can be applied to a wide variety of proscribed documents. Processing can be performed at high speed.

Figure 1:
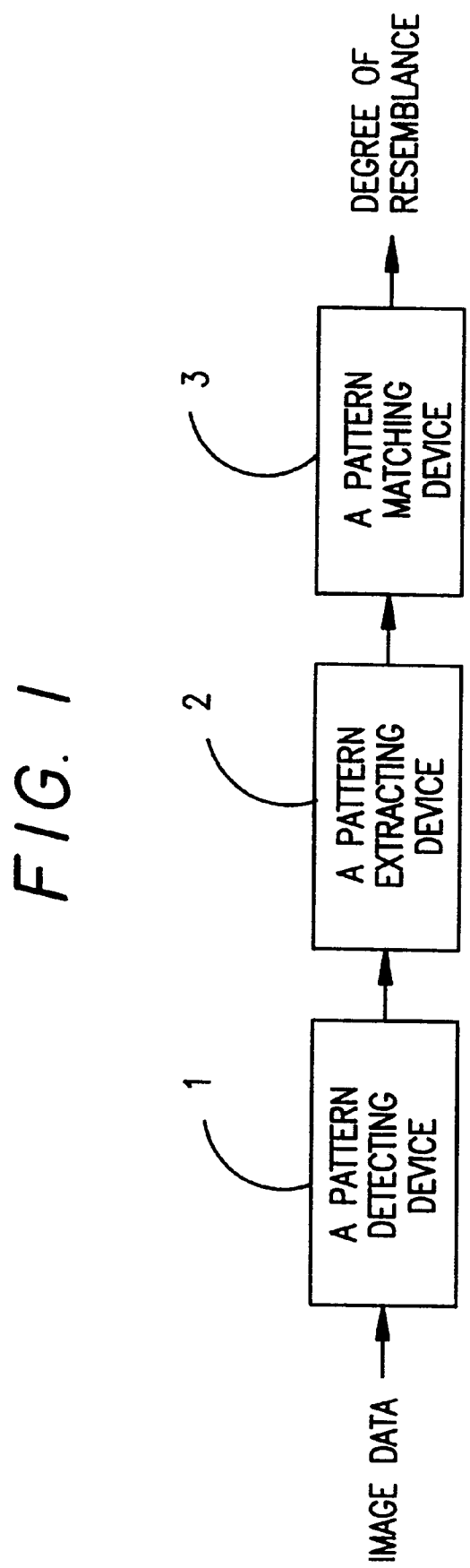
FIG. 1 shows the overall configuration of an ideal first and second embodiments of the image processing device of this invention.

As c an be see n in FIG. 1, the image data which are scanned by the image sensor in the copier are input into detection device 1, the device which detects the specified pattern. As these image data are scanned by an image sensor such as a CCD, they are transmitted successively, region by region, to device 1. The actual data which are sent are full color data for each of the red (R), green (G) and blue (B) components, with resolution of 400DPI.

Detection device 1 compresses the image data it has received to form a gradated image. U sing masks of specified sizes, it checks the area of this image for patterns which are possible matches with each specified pattern which is to be detected (a mark, figure, etc.). If it detects a possible candidate, it roughly specifies a reference position (the center for a circle, the apex of a corner for a rectangle, and so on) for it and transmits the relevant data to device 2, the device to extract a specified pattern.

Extraction device 2 detects these reference positions more precisely, based on the image data before they are compressed. These data include the potential matches detected during the rough search. Device 2 also creates patterns to be used for comparison in the pattern matching process to be performed later. Potential matches are stored temporarily in a specified storage area in device 2. Extraction device 2 makes a preliminary judgment as to whether the extracted patterns resemble each specified pattern to be detected, based on the detailed, non-compressed image. If it finds a pattern similar to a specified pattern, it extracts the portion of it which surrounds the aforesaid reference position and transmits this portion to device 3, where it will be matched against the specified pattern to be detected.

Device 3 uses fuzzy pattern matching logic to determine the goodness of fit between each extracted pattern and its reference pattern (i.e., the specified pattern to be detected), and it judges whether this pattern is, in fact, the one which is being sought. If it is, device 3 outputs a specified control signal.

In this example, then, a rough search is made of the data scanned by the copier in its normal fashion. In this search, the gradated data are matched one by one against a pattern which is synthesized from the aforesaid reference pattern, and potential candidates for a match are extracted. The data concerning these potential matches are stored in a storage area, and they are matched against the reference pattern by means of fuzzy inferences when the specified processing sequence has been completed. Each potential match is judged as to whether it is, in fact, the pattern being sought. Matching device 3 uses for comparative purposes a detailed image which approximates the original image. Before an attempt is made to match candidates to this detailed image, their number has been reduced by conducting a rough search at high speed.(Candidates can be evaluated swiftly and accurately when judgments are based on gradated image data.) All processing is performed at high speed in real time. All data concerning candidates for the matching procedure are stored temporarily in the extraction device. Even though image data may be sent to detection device 1 successively, device 1 performs the detection processing without regard to the state of the latter-stage processing (i.e., without waiting for the results of that processing), and the processing can be performed in real time at high speed.

In this section we shall discuss the actual configuration of each device referred to above. Pattern detection device 1, which detects a specified pattern, is pictured as pattern detection device 1' in FIG. 2. Here we see that the image data are sent to spatial averaging unit 10, where a specified number of neighboring pixels in the relevant data are combined to form larger units. The density of the pixels in each unit is averaged to create a gradated image consisting, as it are, of rather larger pixels.

Figure 3:
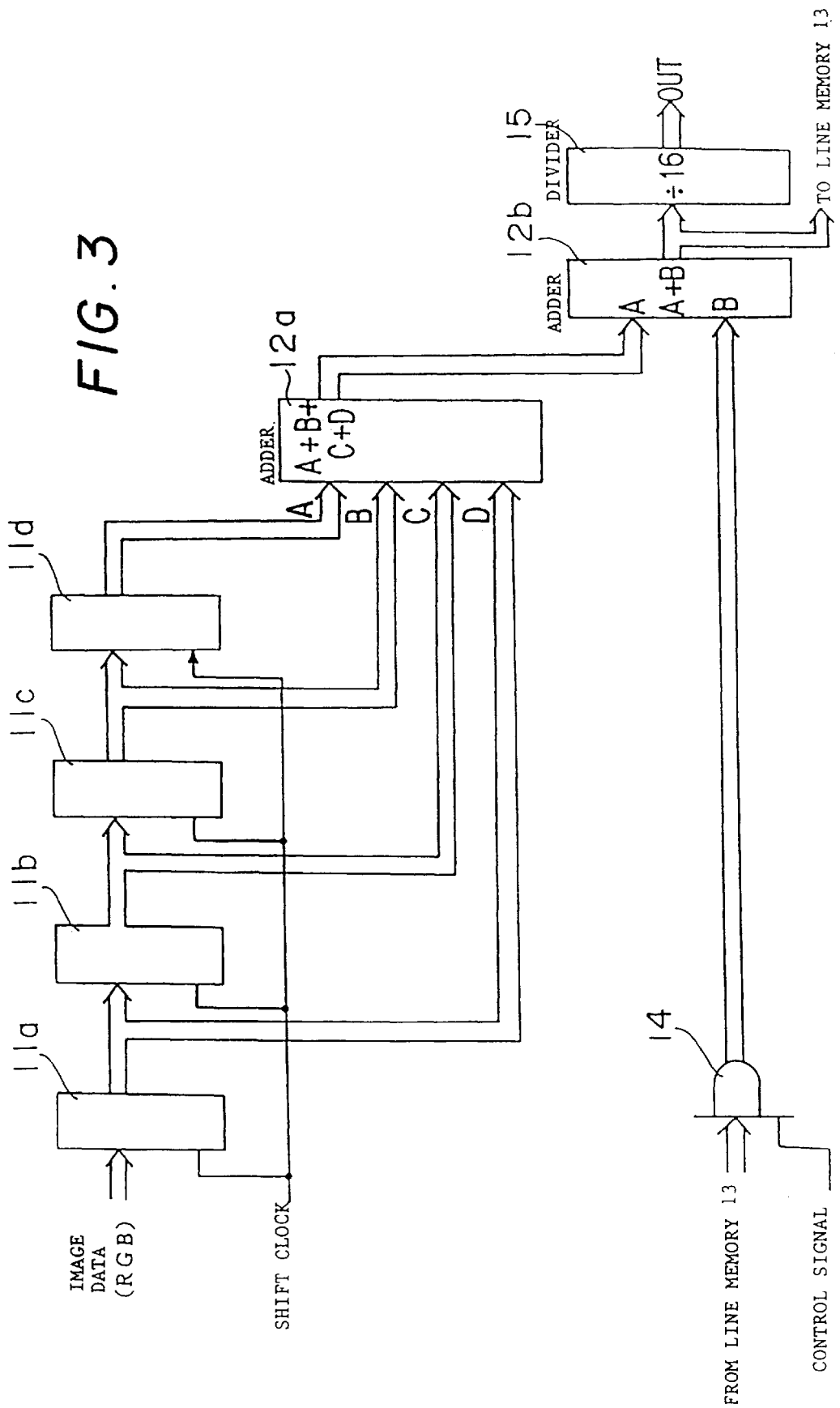
FIG. 3 is a block diagram of the internal structure of the device to perform the averaging operation.

Averaging unit 10 might consist of the components shown in the block diagram in FIG. 3. Each output from latches 11a through 11d, which are connected in four stages that sequentially output data synchronized by a shift clock, is input into adder 12a. Each pixel in each line of the image data is input, in sequential order, into latch 11a. Each pixel is represented as multivalued data which express its density (or gradation of brightness). Thus in each of latches 11a through 11d, a specified number of bits is set which correspond to these multivalued data.

The first adder, 12a, adds the four values which represent the densities of the pixels stored in latches 11a through 11d, which are the last four pixels to have been input (the last four pixels on the path which is being scanned), and transmits the result to the second adder, 12b, through one of its input terminals. The sum of the densities of specified pixels in the last three lines, which are stored in line memory 13, is input into the other input terminal of adder 12b via AND circuit 14. The result of the addition performed by adder 12b is sent to a specified address in the aforesaid line memory 13 (i.e., the address which is read out in order for adder 12b to perform its addition) and to divider 15.

The output of adder 12b is written into line memory 13 each time four pixels have been added, in response to a control signal which is not pictured in the diagram. In other words, the first through fourth pixels on the line being processed are input simultaneously into adder 12a. Based on the result of the addition performed by adder 12a, further addition is performed by adder 12b, after which the first write-in of data into line memory 13 is performed. When the fifth through eighth pixels have been added, the result is input into line memory 13 in the second write-in. This procedure is performed repeatedly. In this way, the result of the addition of every four pixels on line 1 is stored in order in line memory 13.

When line 2 is processed, the result of adding every four pixels is obtained from latches 11a through 11d and adder 12a just as with line 1; at the same time, however, previous results of addition which are stored in line memory 13 are read out, and adder 12b adds the results obtained by adding every four pixels on line 2 to the corresponding results for every four pixels on line 1. In this way the densities of eight pixels, four of which are contiguous to the other four in each of two rows, are added together; the result of this addition is stored in line memory 13.

When line 3 (or line 4) is processed, the totals of the densities of certain pixels in lines 1 and 2 (or lines 1 through 3), which are obtained by the addition performed during the processing of the previous lines and stored in line memory 13, are added to the corresponding densities in the current line. When line 4 is processed, the result of the addition performed by adder 12b (the total of the densities of 4×4, or 16, pixels) is sent to divider 15, where it is divided by 16 to obtain an average value. The control signal which is input into AND circuit 15 goes to zero once line 4 has been processed. Readout of data from line memory 13 is prohibited and the cumulated value is reset.

By increasing or decreasing the number of latches, we can increase or decrease the number of pixels whose density is averaged. Increasing the number of latches will produce an image with lower resolution. By varying the number of latches and choosing an appropriate timing for the input of the control signal (0) to AND element 14, we can obtain an average density for N×M pixels. Which conditions are appropriate will depend on the image to be matched.

The average density of each sixteen pixels is used to construct an image consisting of new, larger pixel units. The data concerning this new image are sent to binary processor 16, where at a certain threshold density they are converted to binary values. The resulting binary image is stored temporarily in line memory 17. This generated image is more blurry than the original image. Details of the original patterns in the image have been lost, and only rough shapes can be discerned. By setting an appropriate threshold for the conversion to binary, we can produce an image in which the interior of a given pattern will appear totally black while the background is totally white. Even if a misregister or other printing error in the original image as read out and input results in a slight discrepancy between the specified pattern which is stored and the pattern which is being checked, the discrepancy will vanish when the image is gradated. This scheme allows the image to be detected simply and quickly.

The output from the aforesaid binary processor 16 is sent to search unit 18, where the gradated image with low resolution (actually, the binary data) is searched for a pattern of a given shape. That is to say, a search is made for a specified pattern in a region of a given size, such as a mask with dimensions N×N. This search will be explained in concrete fashion below.

Figure 2:
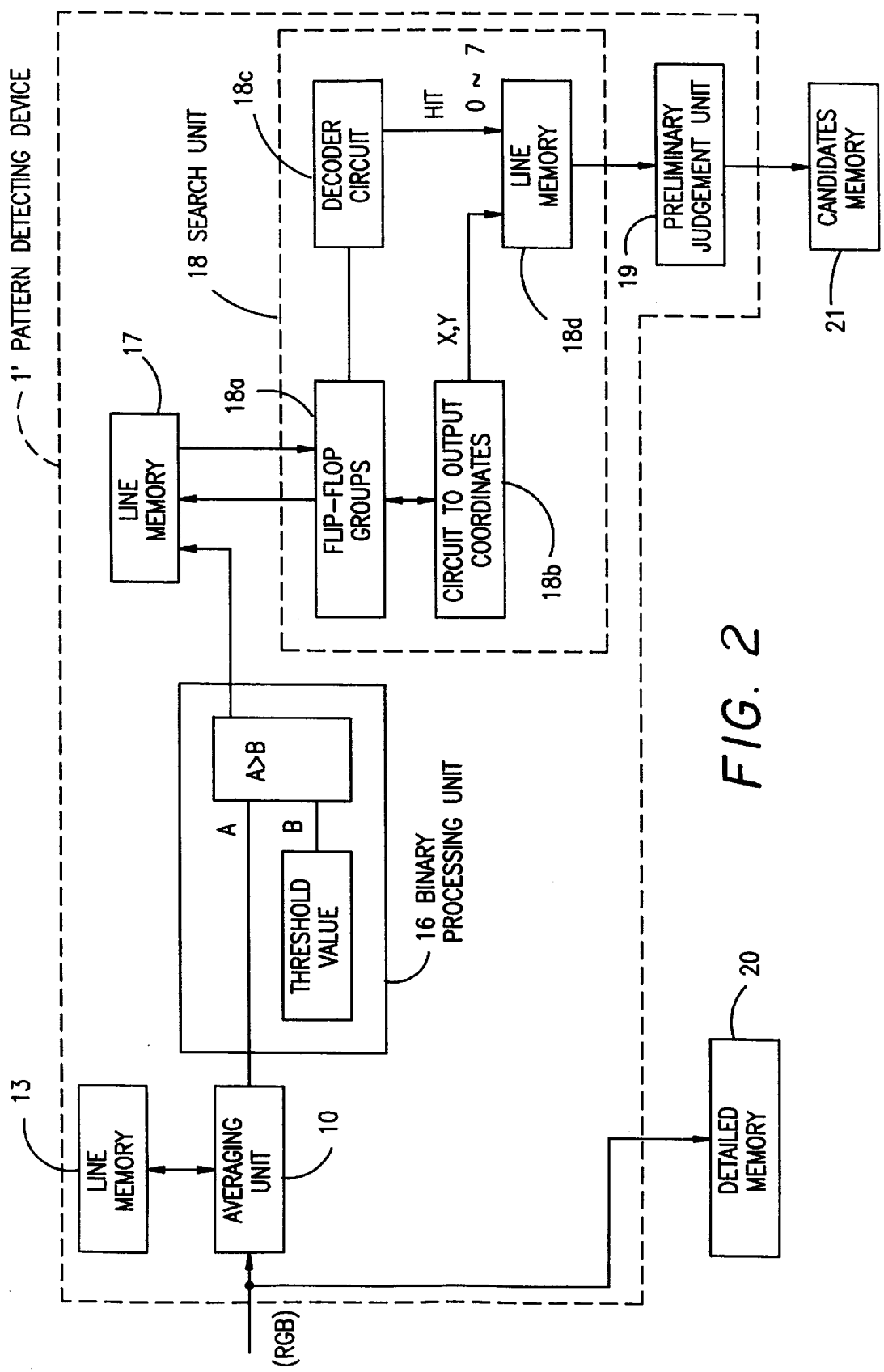
FIG. 2 is a block diagram of the internal structure of the device to detect a specified pattern.

Search unit 18, shown in FIG. 2, is composed of flip-flop group 18a; circuit to output coordinates 18b, which receives the output from flip-flop group 18a, obtains the point coordinates of the hits which indicate the positions of patterns representing possible matches, and outputs those coordinates; decoder circuit 18c, which specifies the orientation and other features of the patterns; and line memory 18d, in which are stored the data representing detected patterns which are possible matches.

Figure 4:
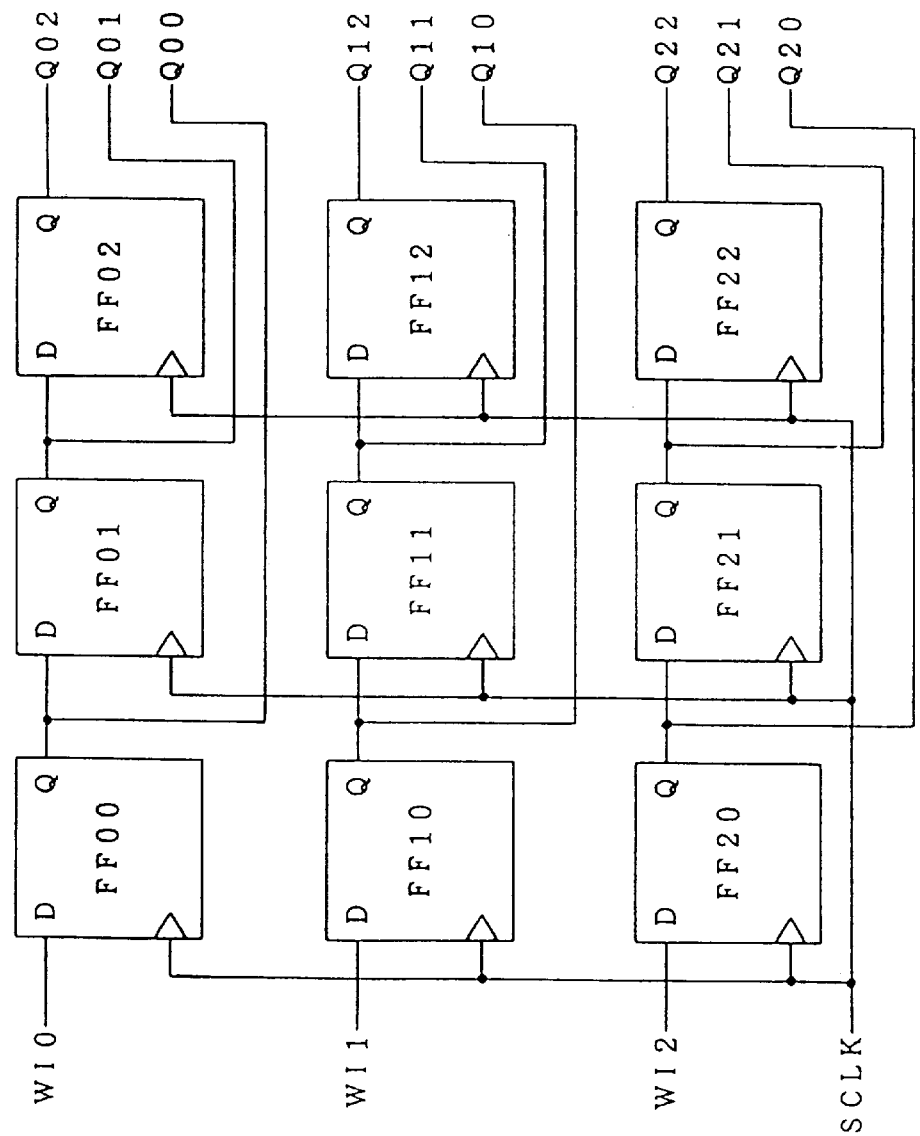
FIG. 4 is a block diagram of the internal structure of the flip-flop groups in the detection device.

The actual arrangement of flip-flop group 18a is shown in FIG. 4. In this example, the area being processed consists of 3 pixels of scanning×3 pixels of feed, or 9 (3×3) flip-flops FF. The three pixels W10, W11 and W12, which are in line in the feed orientation, are taken from the image data stored in line memory 17, synchronized by means of the shift clock SCLK, and input to the first column of flip-flops, F00, F10 and F20. New pixel data are input to W10, W11 and W12 sequentially according to timing provided by the shift clock, and the data are transmitted to the next column of flip-flops. The pixel data which are input for the binary image, Q00, Q01, Q02, Q10, Q11, Q12, Q20, Q21 and Q22, are output through the output terminal Q on each flip-flop. For a black pixel, the output of the flip-flop will be "1".

When all scanning data up to the end of one line have been input, the device shifts down one line in the direction of feed and inputs data from the beginning of that line. In this way, the 3×3 pixel area (the mask) which is the domain of the search is moved over the surface of the document.

Each of the aforesaid outputs, Q00, Q01, Q02, Q10, Q11, Q12, Q20, Q21 and Q22, is input into decoder circuit 18c. Decoder circuit 18c is pictured in FIG. 5. If the pattern of 3×3 pixels which is output by flip-flop group 18a is one of the eight patterns (Hit 0 to Hit 7), the output of the corresponding AND element will go high. If the output from decoder circuit 18c for Hit 0 goes high, we know that there is a dark area in the top left-hand corner of the grid, centered around flip-flop FF11. If the output for Hit 4 goes high, we know that there is a dark area covering the upper part of the grid, centered around flip-flop FF11. In this example, the object of the search is a corner. Therefore, patterns other than these eight, such as when the central pixel is in the middle of a border or entirely within or outside a dark area, will not be detected, and the output in any of these cases will go low.

Circuit 18b is connected to the addresses in multiple line memory 17. It outputs to flip-flop group 18a the addresses of images which must be input, and it outputs to line memory 18d the coordinates (XY) of the pixels output by FF11, the central flip-flop in group 18a. The output of decoder circuit 18c and the central coordinates XY at that moment are stored in line memory 18d. The detection results for several lines worth of data are also stored in memory 18d.

Figure 5:
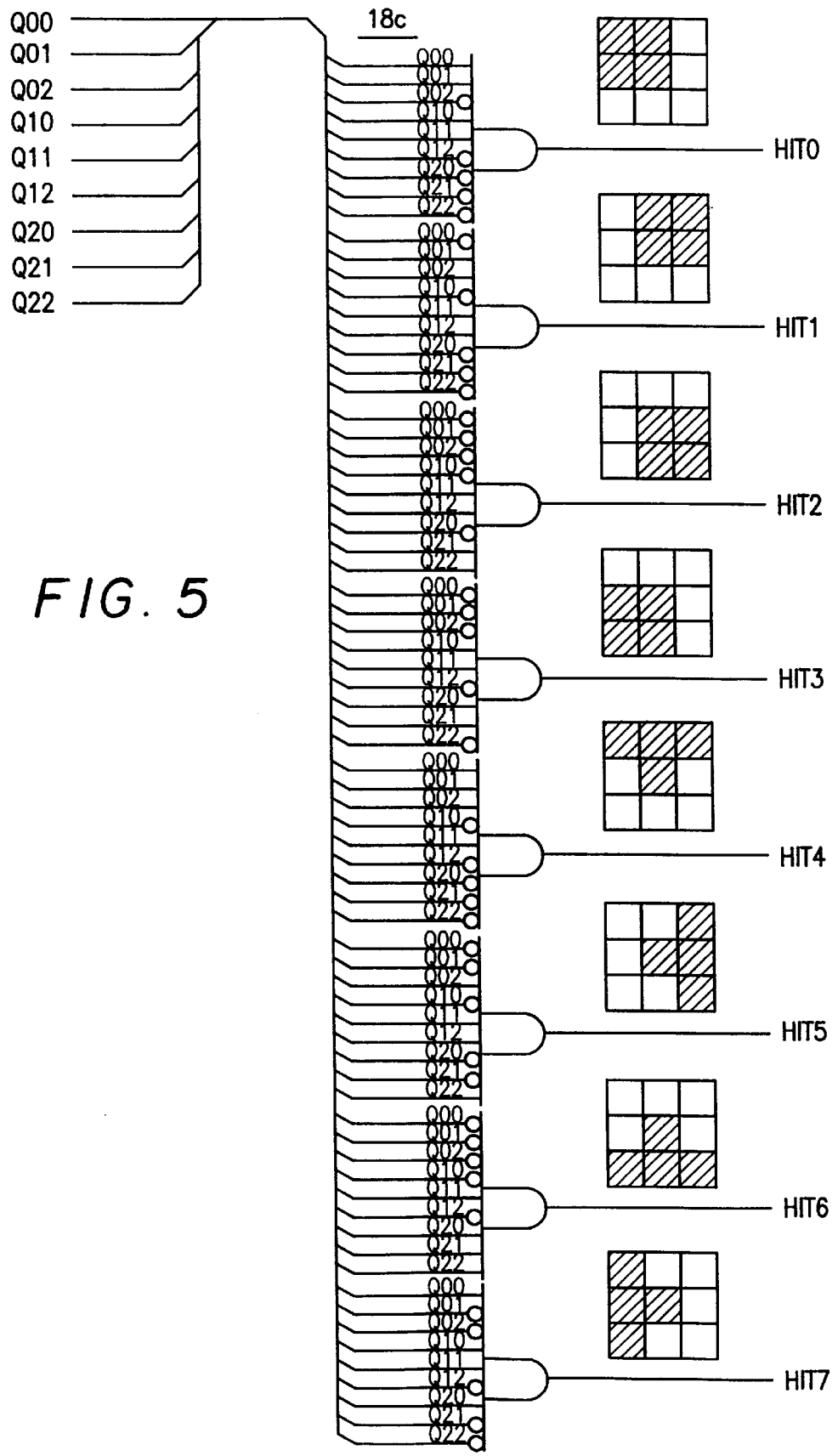
FIG. 5 is a block diagram of the internal structure of the decoder circuit in the detection device.

In this example, nine flip-flops representing 3×3 pixels are used to detect the corner of a figure as shown in FIG. 4 and the states of the decoder circuit are those shown in FIG. 5. However, the number of flip-flops used and the conditions for the decoder must be selected according to the shape of the pattern one wishes to detect and which portion of it one chooses to focus on. It would, of course, be possible to detect a circle or some other shape as required.

In the example described above, the search for the specified pattern to be detected is carried out by hardware. It would also be possible to handle this processing via specified software. Line memory 18d in a search unit 18 which is comprised of hardware contains numerous unnecessary data which will not need to be sent to pattern extraction device 2 for the next step of processing. The data which are stored in line memory 18d are sent instead to preliminary judgment unit 19, where a judgment is rendered as to whether those data should be processed by pattern extraction device 2 (preselection of hit points).

In this example, a rough search is performed with reference to gradated data. This allows image data which potentially have the specified pattern to be identified swiftly and surely as possible matches. At the same time, a large quantity of useless data are also detected. When the states of the pixels on the periphery lead to the judgment that a given pattern is not the specified pattern, that pattern can be eliminated without being output, obviating the need for subsequent more detailed judgments. Only the actual hit points are output to candidates memory 21 in pattern extraction device 2.

To process this judgment, data stored in memory 18d for which the output goes high (the hit points) are extracted, and effective hit points are detected based on the relative spatial relationships among these hit points and other hit points which are on their periphery. The position coordinates XY and the orientation data for these points, HIT 0 to 7, are stored in candidates memory 21.

Figure 6A:
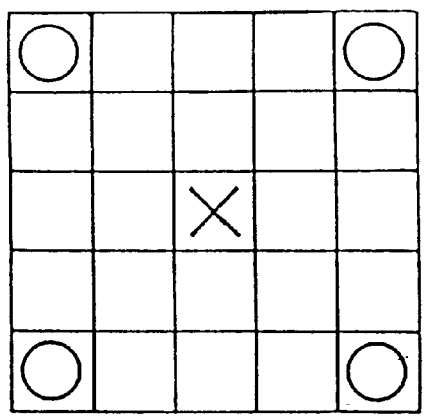
FIGS. 6(A) and 6(B) illustrate how the preliminary judgment unit works.
Figure 6B:
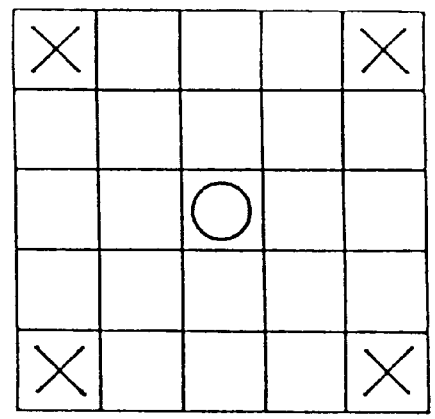

To give one example, depending on the type of pattern being sought (its shape, size, etc.), if there is another hit point in the vicinity of a hit point which has been detected, or within a specified area around that hit point, then the first hit point will be regarded as valid. If a number of hit points are found within a specified area, then an appropriate decision will be made, depending on the pattern, to consider only the periphery (FIG. 6(A)) or only the center (FIG. 6(B)). In particular, if the hit points are close to one another, there is a high probability that the detected pattern is identical to the specified pattern. In this case it would be acceptable to try to match the patterns based on one of these hit points.

Figure 7:
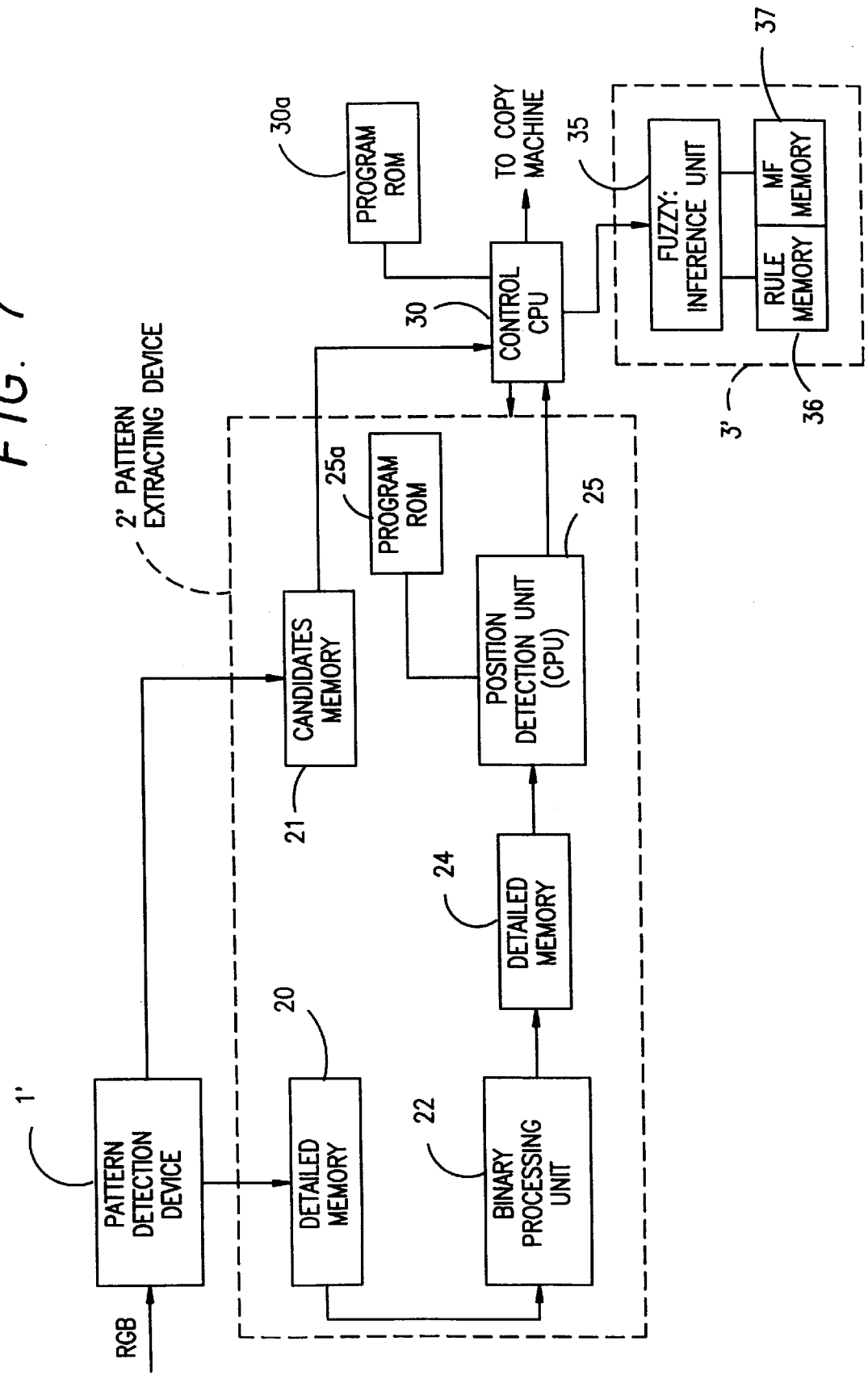
FIG. 7 is a block diagram of the internal structure of the device to extract a specified pattern and the device to match it against a reference pattern.

FIG. 7 is a block diagram illustrating the configuration of pattern extraction device 2. As shown in the figure, device 2' continuously stores in detailed memory 20 the RGB data (the variable density image) from detection device 1' which have not yet been converted to binary values. Memory 20 has a sufficient capacity to allow it to maintain storage of image data from the pixels (or the line) currently scanned by the image sensor to a specified earlier point (at least as large as the pattern to be detected). If its capacity is reached, the oldest data (those acquired earliest) are erased and new data are written in their place.

As was described earlier, the coordinate values and orientation of valid hit points output by preliminary judgment unit 19 in detection device 1' are written into candidates memory 21. The stored coordinate values are read out by control CPU 30. This CPU sends various control signals to extraction device 2', thus controlling its operation. One such control signal is the command sent to detailed memory 20 telling it to output, based on the coordinate values read out from memory 21, the image data which contain the pattern associated with a valid hit point.

Based on the coordinates read out by CPU 30, the corresponding image data stored in memory 20 are sent to binary processing unit 22. Here the RGB image data are converted to binary values; however, the threshold value for this conversion need not be the same as that used by binary processing unit 16 in the aforesaid pattern detection device 1'.

The binary data produced in this fashion are stored temporarily in detailed memory 24 and sent in order to position detection unit (CPU) 25. Here reference points are obtained for the matching operation to be performed in matching device 3. Based on data stored in program ROM 25a, which is connected to CPU 25, a certain specified position in the specified pattern to be detected is obtained. For a corner, this position is the accurate location of the apex, and for a mark, the accurate location of the center. If when position detection unit 25 has extracted an accurate location and it is determined that this is not the specified pattern, output will cease. A full explanation will be given below.

When Searching for a Corner

Figure 8:
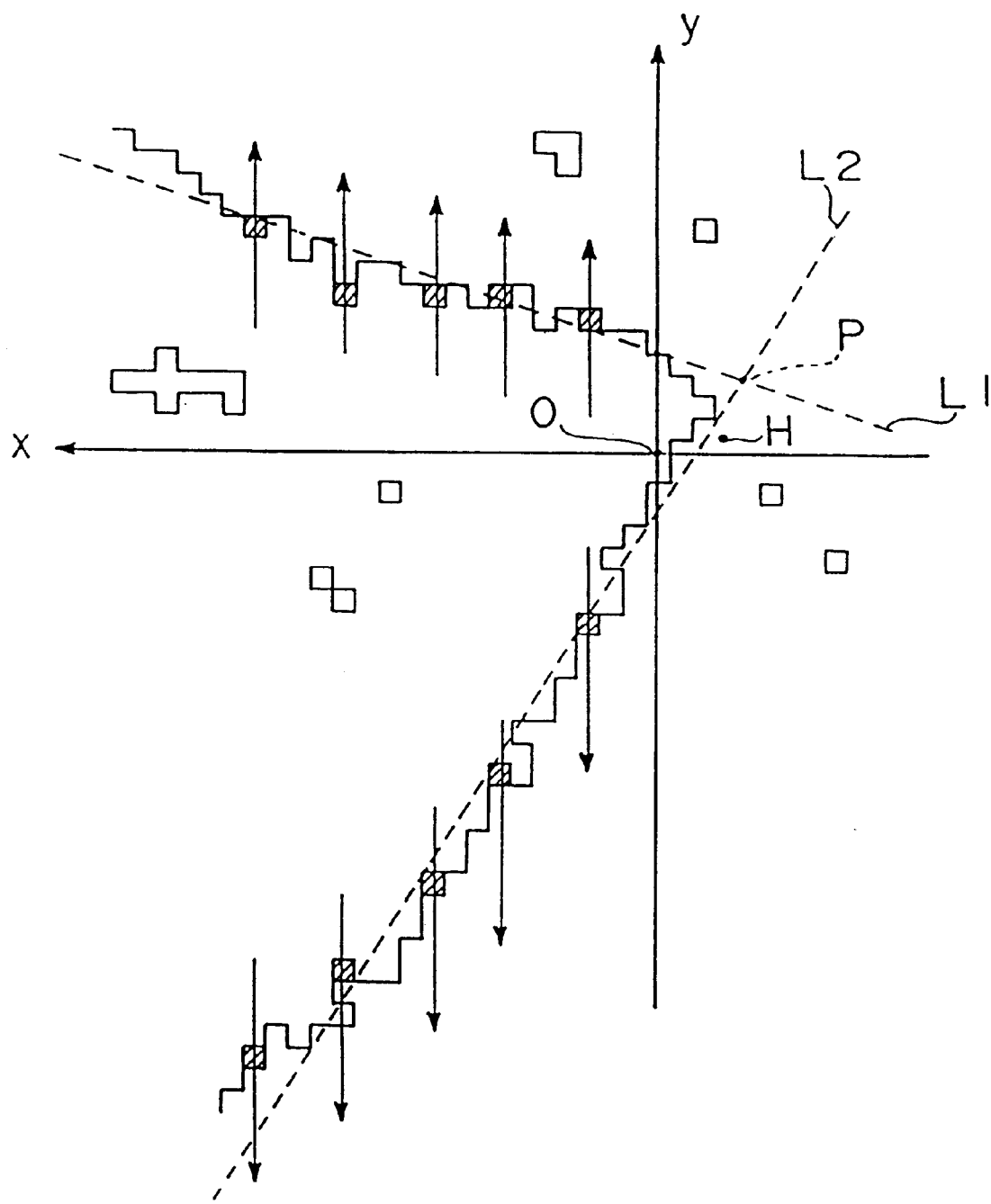
FIG. 8 shows how corner detection works in the position detection unit.

In the rough search, the approximate apex of the corner (the hit point) is known, as well as the orientation of the corner. As illustrated in FIGS. 8 and 9, a hypothetical origin 0 is established in a specified position in the vicinity of hit point H and inside the corner. From this hypothetical origin 0, a horizontal X axis and a vertical Y axis are established (Steps 1 and 2).

Next, the necessary constant is established for detection of a specified position in the pattern (Step 3). Moving along the X axis in steps of a specified width (indicated by arrows in the drawing), we scan at each step in a positive (upward) and negative (downward) direction parallel to the Y axis, judging whether the pixels are black or white. We find the border between black and white (the border where black ends and white begins will be called an edge hereafter) (Steps 4 and 5), and we draw a straight line following the edge which has been detected as closely as possible (segments indicated by hatching). The minimum mean square criterion, for example, might be used to cause the various edges which have been detected to approximate a straight line (Steps 6 and 7). When the relevant processing is performed, the two edges which extend on both sides of the Y axis are regularized as straight lines $L_1$ and $L_2$. The intersection of these two lines is found and labeled apex P (Steps 8 and 9).

The precise orientation of the corner can be computed from the slope of one of the aforesaid straight lines (or edges) which have been detected or from the slope of the line bisecting the angle formed by the two straight lines (Step 10). The coordinates of the apex and the slope are transmitted to control CPU 30. If when the aforesaid apex is extracted two edges cannot be found, or if an insufficient number of edge data are found, or if the angle formed by the two edge lines varies substantially from the specified angle, then a judgment will be rendered that the pattern found is not the corner we are seeking (i.e., it is not the specified pattern to be detected), and output will cease.

When Searching for a Mark

Figures 10A, 10B:
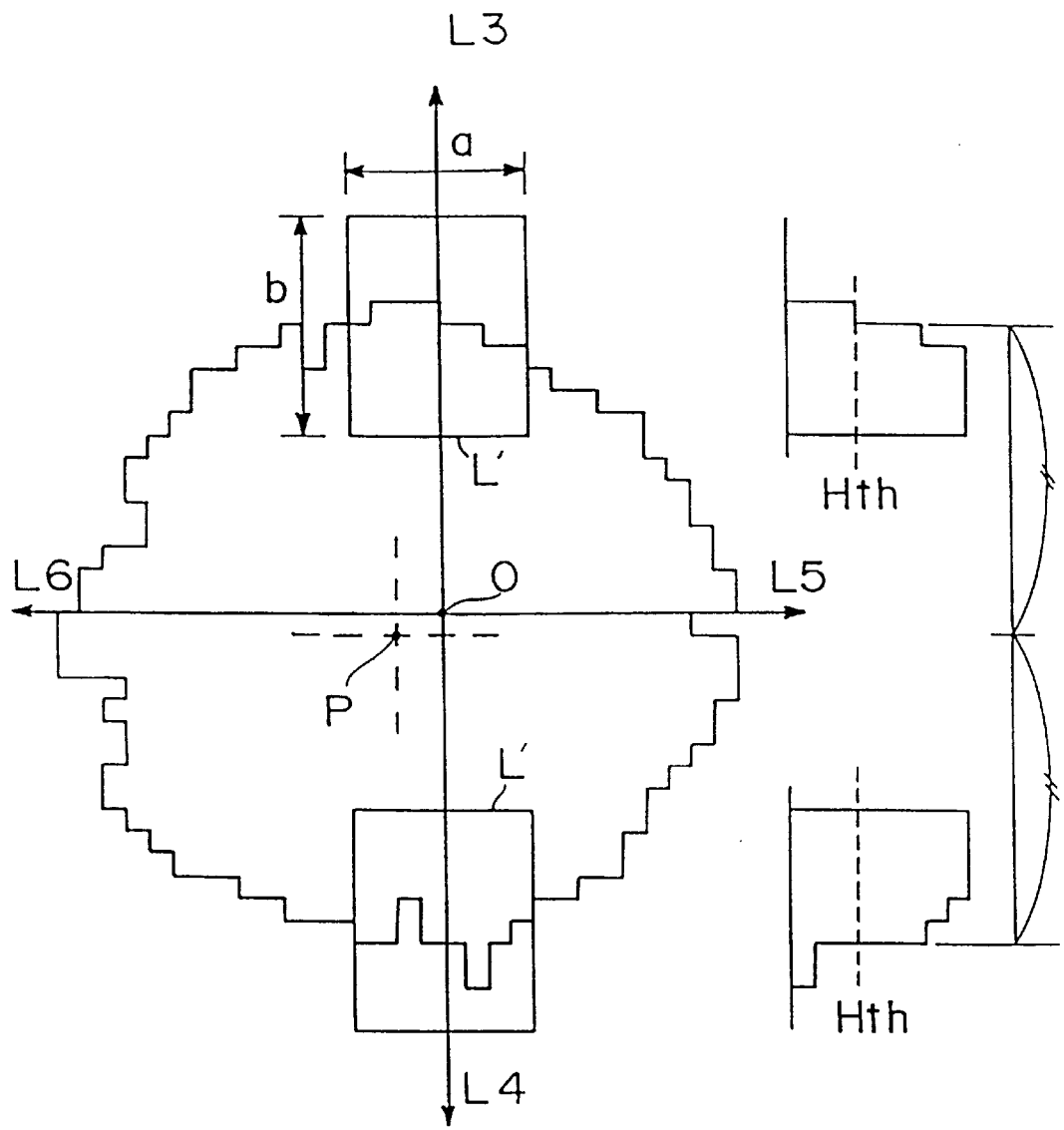
FIGS. 10A and 10B show how mark detection works in the position detection unit.
Figure 11:
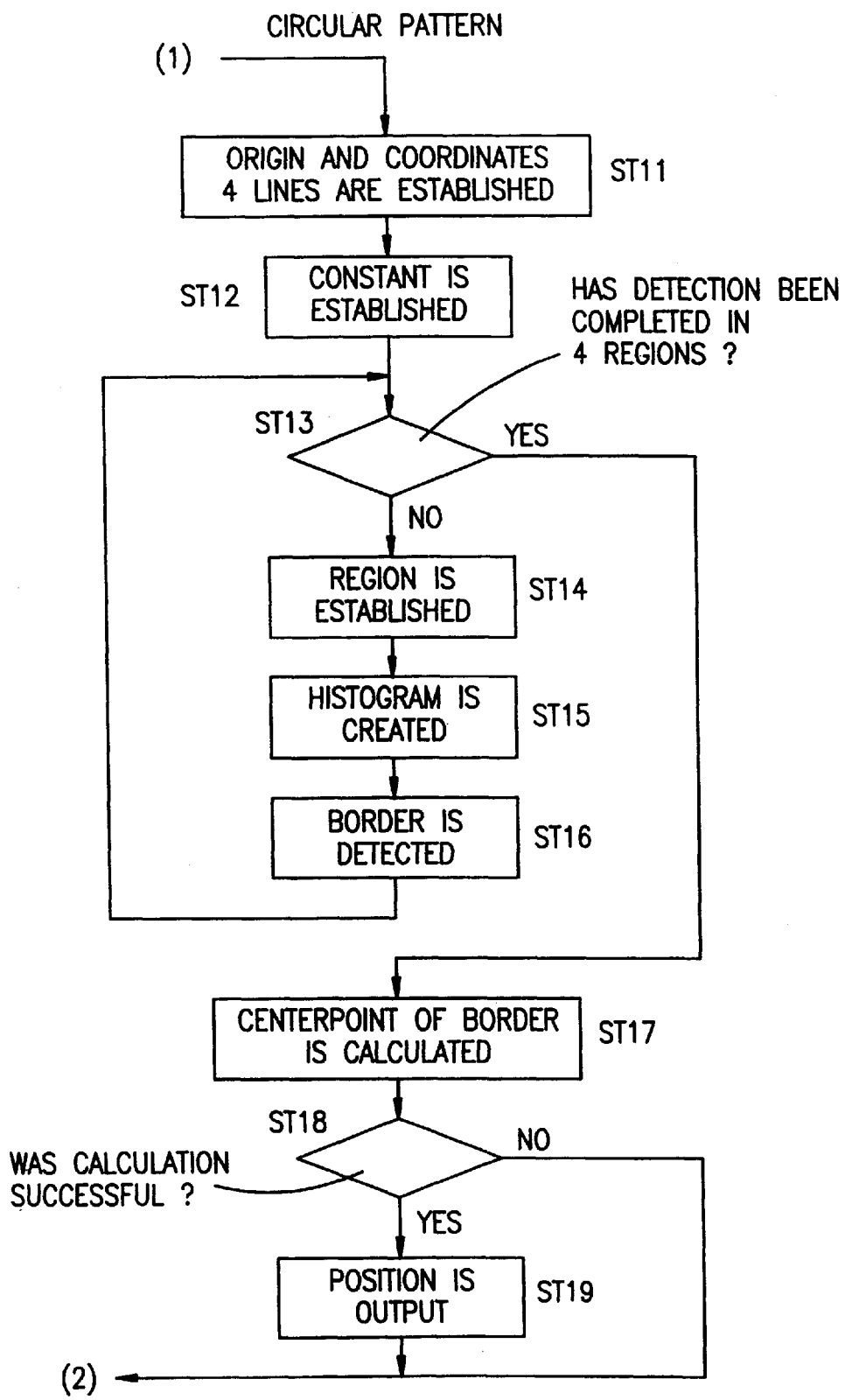
FIG. 11 is a flow chart illustrating the function of mark detection in the position detection unit.

As is illustrated in FIGS. 10 and 11, the hit point discovered in the rough search for a mark is considered to be the hypothetical center point 0. Lines L3 through L6 are drawn in the four compass directions from center point 0 to form X and Y axes (Step 11). The necessary constants are established for the detection of specified positions in the pattern (Step 12). Since the radius of the mark is already known, the approximate location of its circumference (i.e., its edge) can be determined. A line L' is drawn orthogonal to the radius, and this line is used to establish a window (i.e., an area) with a width a and a depth b (Steps 12 to 14).

A histogram is drawn of the black pixels in the direction of the search (the radial direction) and the orthogonal direction. A certain height of the histogram $H_{th}$ is chosen to be the threshold value. Levels greater than height $H_{th}$ are considered to represent the mark as far as they continue. The point where they end is considered to be the start of the blank area. The border between these areas is considered to be the edge. Rather than making a judgment based solely on processing involving a threshold value, it would alternatively be possible to extract the border between the pattern and non-pattern portions based on the variation in the height of the histogram and its continuity (Steps 15 and 16).

The search for the edge is performed in a radial direction on both the left and right sides, and a center position P is obtained for the edges which have been extracted as a result of the search. In the same way, the upper and lower edges are found, and center positions are obtained for them (Steps 17 and 18).

When only one edge can be extracted, the radius of the target image can be used to determine the center. This is done by moving back from the edge which has been detected along a radius a distance equal to the radius of the target and declaring that point to be the center. When the center position and the radius have been determined in this way, the relevant data are output to control CPU 30 (Step 19).

If a center cannot be found when a number of hypothetical center points have been detected as described above (because the diameters vary too much or edges cannot be detected on both sides of the diameter), a judgment will be rendered that the image data being processed do not contain the specified pattern to be detected, and output will cease.

Since in this example only the data within the window are searched, the processing can be done at a high speed. If there is a specific shape within the specified pattern or a characteristic of some kind inside the mark, the data can be expressed as a four-directional histogram in the same way as is described above. Since the angle of rotation is known, it, too, can be transmitted to CPU 30 as needed.

Figure 12:
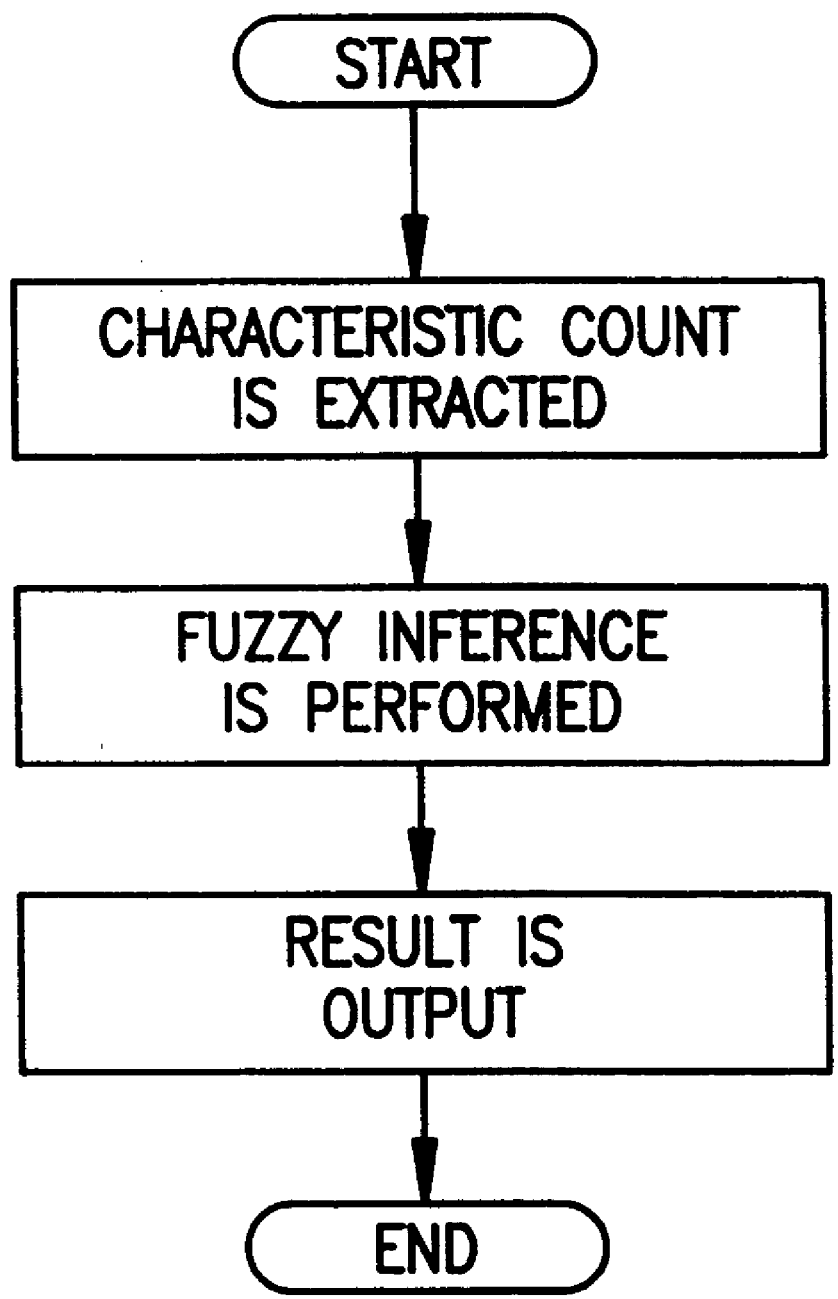
FIG. 12 is a flow chart illustrating how the device to match a specified pattern against a reference pattern works.

We shall next discuss the workings of pattern matching device 3. As is shown in FIG. 7, the coordinate data for the apex and slope of a corner resembling the specified pattern or for the center position of a mark are sent from detection unit 25 to CPU 30. Based on the data stored in program ROM 30*a*, CPU 30 specifies which of the image data stored in detailed memory 24 must be read out, and it decides which area of the image data should be matched against the specified pattern to be detected. The relevant image data in this region are transmitted from memory 24 to fuzzy inference unit 35 based on a control signal from CPU 30. Inferences are processed using the fuzzy knowledge, which includes the rules stored in rule memory 36 and the membership functions stored in MF memory 37. A judgment is then rendered as to the degree of resemblance between the received image data and the previously established specified pattern to be detected (See FIG. 12).

Figure 13:
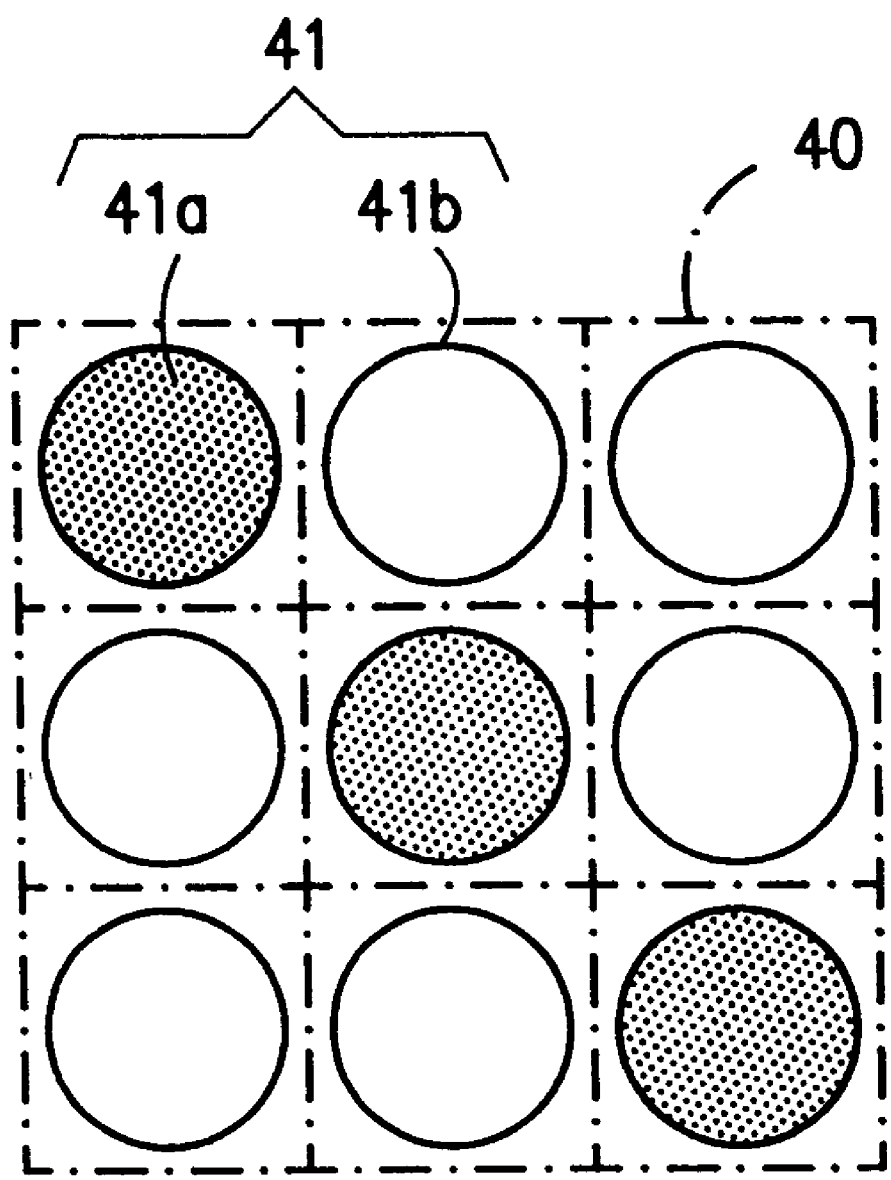
FIG. 13 gives an example of a specified pattern used in this first embodiment.

Put more concretely, in the example of FIG. 13, a round mark 41, whose diameter is less than the length of an edge of a cell 40, is provided in each of nine square cells, which are arranged in the 3×3 grid pattern, to form the pattern to be detected. The darkness of at least some (41*a*) of marks 41 is varied from that of the others (41*b*) to create a pattern containing bit data. As can be understood from the drawing, in this example the dark marks 41*a* are completely colored, while the light marks 41*b* are completely uncolored. In this way each cell 40 can be made to express 1 bit of data as it is either "1" or "0". Since in this example the overall pattern is a square, the processing to extract hit points which is performed by detection device 1 and extraction device 2 will use a search for a corner. By providing in this fashion a number of dark marks 41*a* (in cells) to which color has been applied, we create a pattern which will not be affected by printing misregisters, dirt on the document, or, when the pattern is extracted, errors or tampering.

Since the relevant pattern would be printed ahead of time in a specified location on any documents which may not be copied, such as bank notes or negotiable securities, the fuzzy knowledge concerning this pattern can be stored in memories 36 and 37.

Figure 14A:
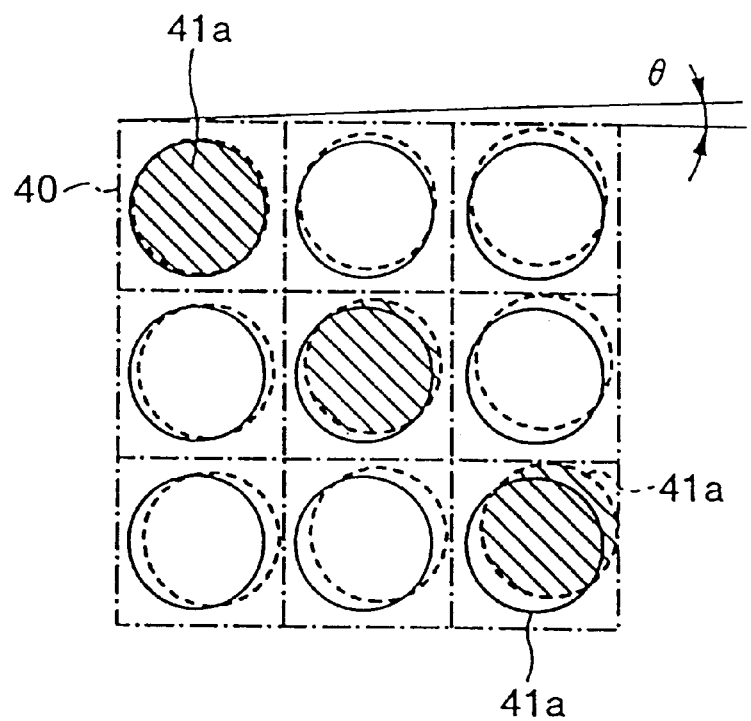
FIG. 14 (A) illustrates the advantage conferred by the specified pattern used in this first embodiment.

In this example the diameter of marks 41 is less than the length of cells 40. Even if the orientation of the pattern is momentarily shifted by angle e, as shown in FIG. 14(A), marks 41 will not extend far enough beyond the square of their own cell to overlap a neighboring cell. If the angle is shifted due to a printing or scanning error or an error which occurs during image processing, there is only a minimal probability that there will be an error in recognition. This scheme also responds well when the document is moved either horizontally or vertically, regardless of angular shift.

Figure 14B:
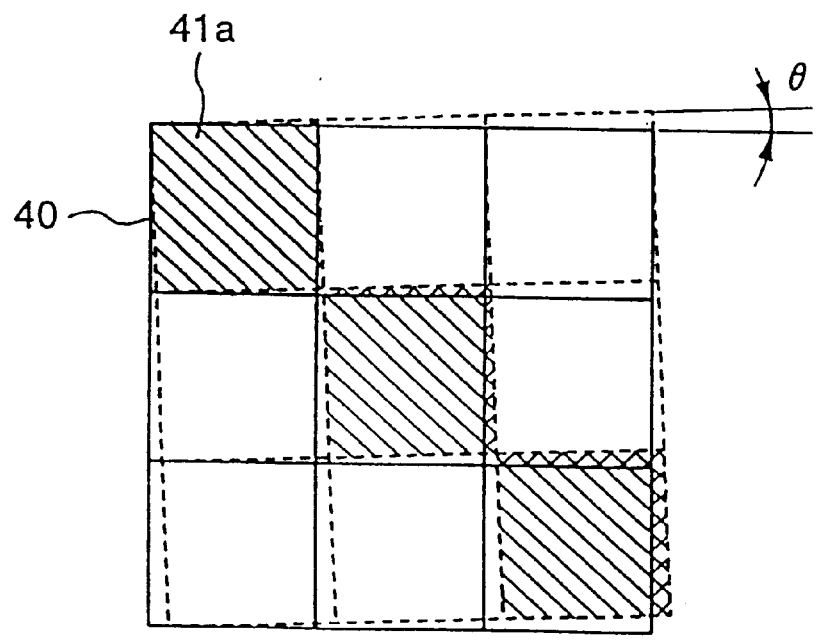

In this example, the diameter of a mark 41 is less than the length of one side of a cell 40; however, the invention is not limited to this design. The diameter could as well be equal to the length of a side. In this case, only a small portion of the mark would overlap the adjacent cell, so the probability of recognition errors resulting from angular shift would be small. It would also be acceptable to color the entire area of a cell 40, as shown in FIG. 14(B). In this case, the rate of recognition when the image is shifted over a small angle, as described above, will be lower than with the scheme employed in this example. However, this can be compensated for by setting up appropriate membership functions.

In this example, it is desirable to provide a guide on the periphery of the specified pattern, as shown in FIG. 15. This will facilitate the search for a corner which is described above, and allow us to determine the position and orientation of the specified pattern and of each cell. We might, for example, provide the guidelines 42 shown in FIG. 15(A), extending on two contiguous sides and meeting at the corner. This would allow us to ascertain precisely the location of the hit point and the orientation (i.e., the angle) of the specified pattern. In the extraction of the pattern, a specified distance can be obtained from the apex of the angle formed by guidelines 42. Then by extracting in the specified location, we can determine accurately the location of each cell. The subsequent characteristic count will also be accurate. This scheme also allows the subsequent fuzzy matching procedure to be performed rapidly and accurately.

Figure 15A:
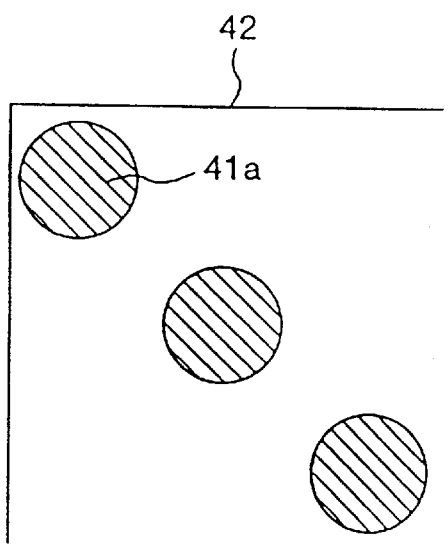
FIGS. 15(A)–15(D) shows another version of the specified pattern.
Figure 15B:
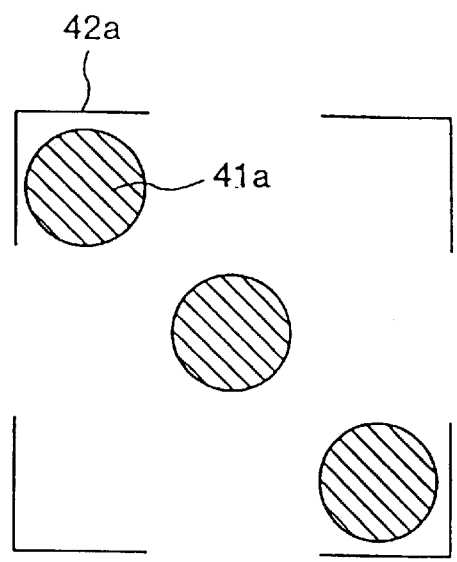
Figure 15C:
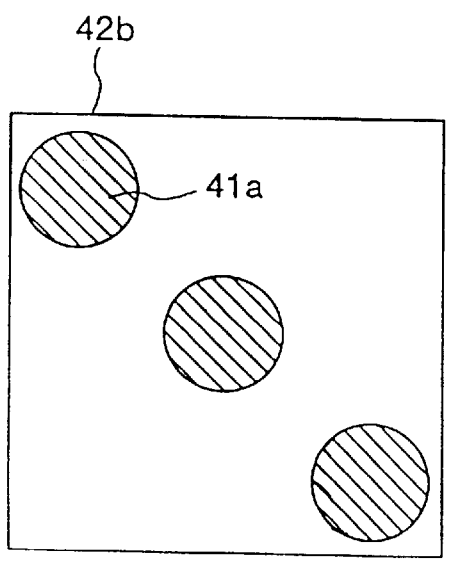

It would also be possible to provide guidelines 42*a* in each corner of the grid, as shown in FIG. 15(B), or to surround the grid with guidelines 42*b*, as shown in FIG. 15(C): In these cases, we would not be able to ascertain which edge is the top of the grid; however, we would be able to accurately determine the location of the specified pattern and from this to accurately obtain the location of each cell. These schemes, then would yield a result identical to that of this example. In the three examples given above, we printed only the dark marks 41*a* which had been colored. The light marks, those which are not colored, are not printed, nor are their (circular) outlines. However, they may be printed if desired.

Figure 15D:
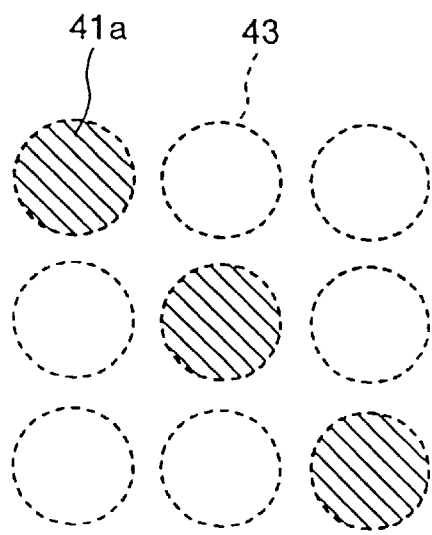

It would be acceptable to create circular lines 43 in the portions which are not to be colored, in addition to colored marks 41*a*, as shown in FIG. 15(D). In this case, marks 41*a* and circles 43 together form the shape of the square. This entire segment can be extracted. From the relationship between adjacent marks 41*a* and circles 43, we can obtain an accurate location for each cell (i.e., each region for which a characteristic count is to be extracted). When detection device 1 lowers the resolution and gradates the image, setting the threshold value at an appropriate level will cause the portions occupied by the specified pattern to be entirely colored. This will allow the pattern to be detected and extracted with relative ease.

Figure 16:
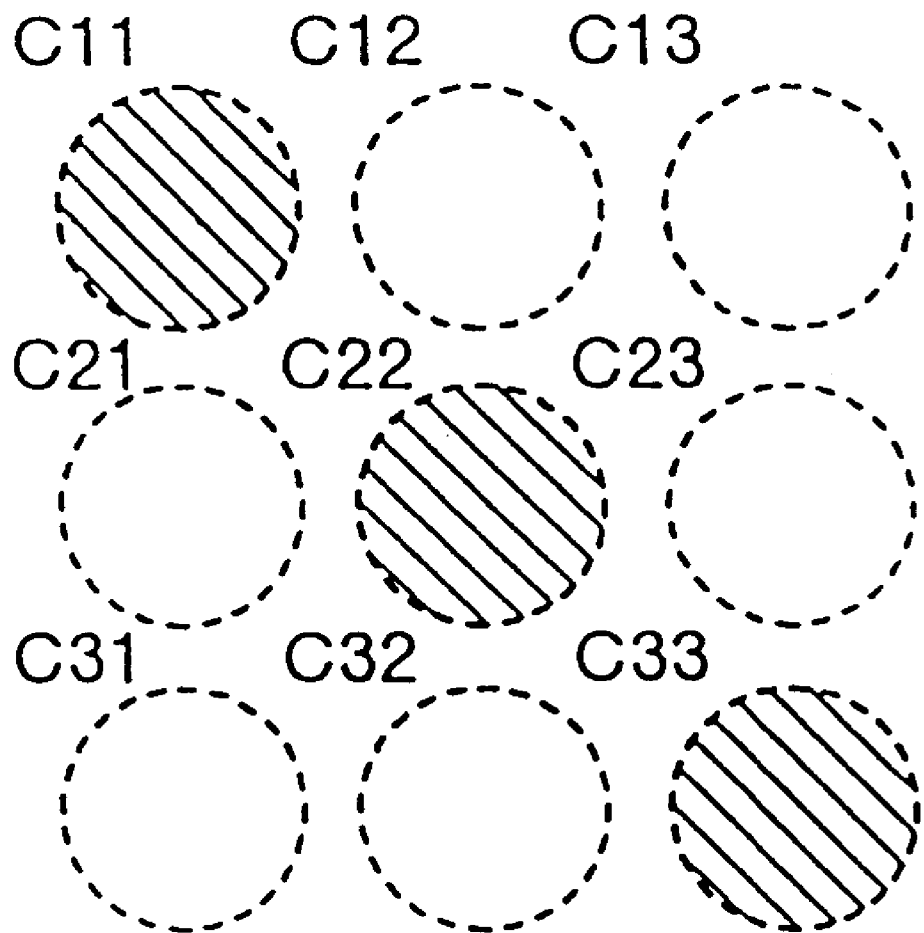
FIG. 16 illustrates the operation of the device. is FIGS. 17(A)–17(I) give the membership function of each cell in the pattern shown in FIG. 16.
Figure 17A:
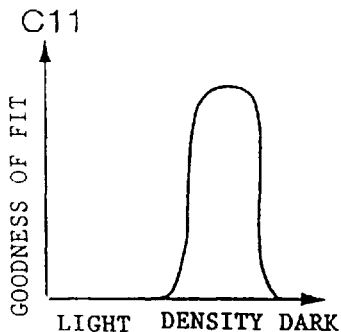
Figure 17B:
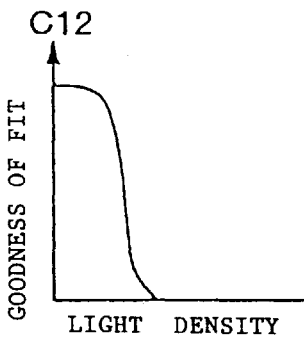
Figure 17C:
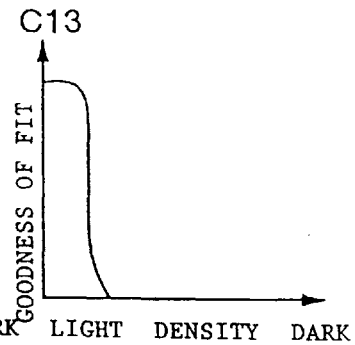
Figure 17D:
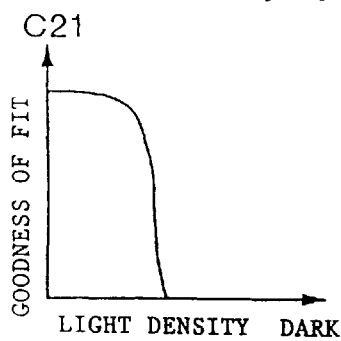
Figure 17E:
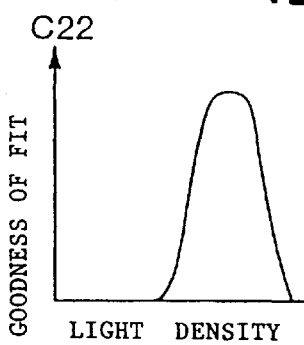
Figure 17F:
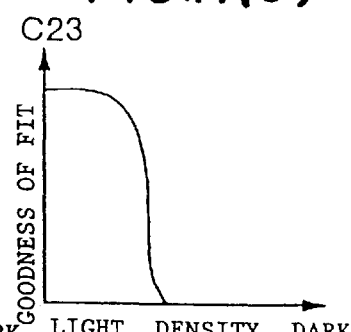
Figure 17G:
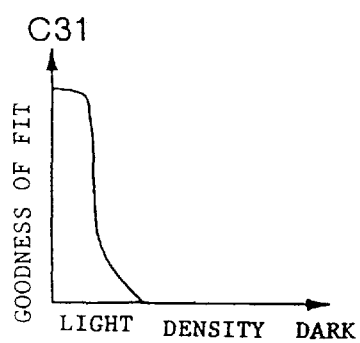
Figure 17H:
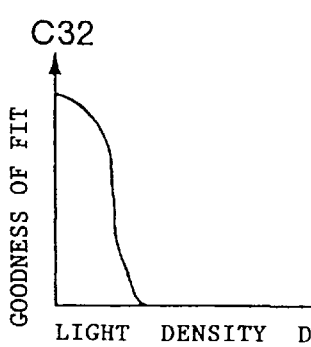
Figure 17I:
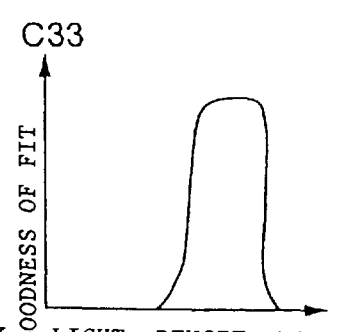

We shall now discuss the fuzzy knowledge stored in the aforesaid memories 36 and 37. Let us assume that the specified pattern has nine marks (or cells), which we shall call C11 through C33, as shown in FIG. 16. Let us also assume that Cells C11, C22 and C33 are the dark marks. In this example, for each mark which indicates a bit datum, the density of the mark is expressed as a membership function which represents a characteristic count. These membership functions are stored in MF memory 37. More specifically, C01, C22 and C33 have a high goodness of fit on the dark side, as shown in FIG. 17; the other cells have a high goodness of fit on the light side. The width, shape and other characteristics of each membership function are set so as to be able to cope with shifts of position. To give an example, the functions of cells C13 and C31, which would be far from the dark marks even if the pattern are shifted slightly, can be made steeper.

For the example shown in FIG. 16, the following rule would be stored in rule memory 36.

If the characteristic counts for C01, C22 and C33 are high and those for C12, C13, C21, C23, C31 and C32 are T times lower, then this is the specified pattern.

In the actual processing performed by matching device 3, characteristic spaces (regions consisting of nine cells) are set up using pre-gradated image data. The number of characteristics is extracted by counting the actual number of colored (i.e., black) pixels in each characteristic space. In this way we obtain the pixel count for each characteristic space. Characteristic spaces which have colored marks will have colored pixels in the portions covered by those marks, which when counted will increase the characteristic count. (I.e., these spaces are darker.) Fuzzy inference unit 35 reads out the data stored in memories 36 and 37 and, using the extracted characteristic count as input, performs a fuzzy inference based on the rules and membership functions (shown in FIG. 17) which were previously established. It determines and outputs the goodness of fit (the degree of resemblance) of the candidate with respect to the specified pattern.

The goodness of fit obtained as a result of the inference is output to a PPC (a copier) by way of CPU 30. When the goodness of fit exceeds a given threshold value, the copier will conclude that the document presented is a bank note or some other item which cannot be legally copied. It will proceed to execute the program it has for prevention of forgery (prohibiting the copying operation, outputting a totally black screen, and so on). As an alternative, CPU 30 can render a judgment as to whether the item presented is a prohibited document (i.e., whether it contains one of the specified patterns to be detected), and it can output the result (as, say, a stop signal) to the copier.

With the example described above, the same specified pattern containing predetermined coded data (bit data) can be applied in a specified location on various kinds of documents which may not be copied. Then, no matter what type of document it may be, the pattern will be detected. By applying the specified pattern to new varieties of bank notes, stock certificates, and so on as they are issued, we can ensure that this image processing device will be widely effective in detecting documents which may not be copied, and that it can be used semipermanently. Also, with this example only patterns which resemble the specified pattern are extracted as candidates, and only those patterns are matched against the specified pattern. Thus the specified pattern may be placed anywhere on the document which may not be copied.

In this example, we discussed an example in which the same specified pattern is applied to various documents. However, this invention is not limited to this idea. Rather, as shown in FIG. 18, the bit data may be used purposefully. By varying the arrangement of colored marks 41a, we can have the pattern express different meanings.

Figure 19:
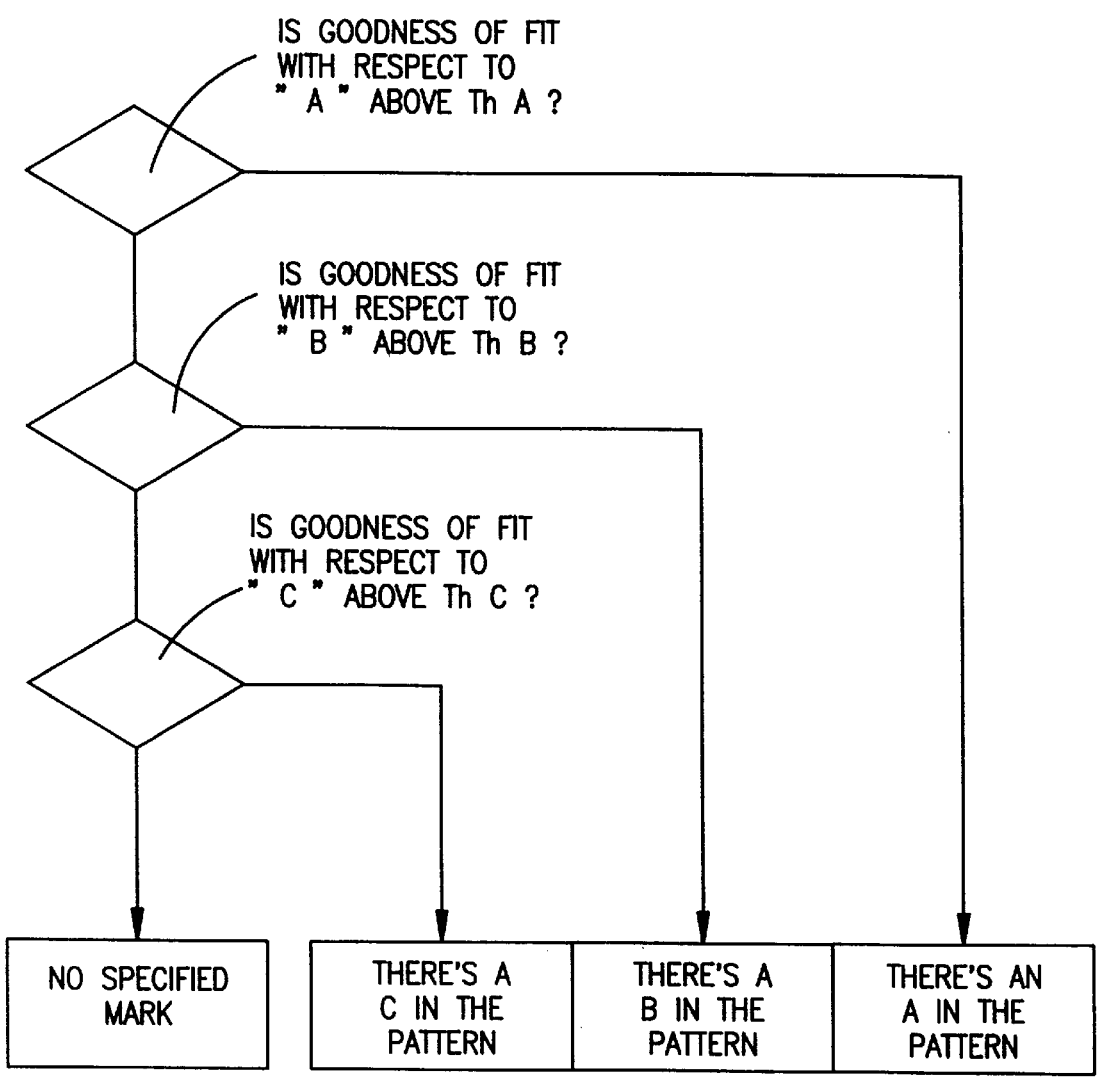
FIG. 19 is a flowchart showing some of the operations and functions performed by the device to match a specified pattern when one of the patterns shown in FIG. 18 is used.

When several specified patterns are used, as in this case, inference unit 35 must obtain the goodness of fit of an extracted pattern with respect to each of specified patterns A through C. It may, for example, follow the flow pictured in FIG. 19 to determine which of the specified patterns has been found.

When several specified patterns are provided in this fashion, the various patterns can be placed in different locations on a single document. Then if all the patterns, or at least a given number of them, are found on a document, the copying operation can be prevented. The use of multiple checks minimizes the probability that the proscribed document will not be recognized. If one of the patterns has become hard to detect because it has become abraded or soiled through long use, the document can still be detected via the remaining patterns. When a single pattern is used, copying will be prevented if a pattern identical to one of the specified patterns happens to be found among the density data (in the characteristic count) from an ordinary document. By requiring the matching of a number of specified patterns, we can reduce the chance that the copying of an ordinary document which should be allowed is prevented.

The aforesaid coded data can be made to correspond to the type of bank note or stock certificate, or in the case of a bank note, to the denomination. Then when this system is operating and the copying procedure with respect to a prohibited document has been completed, the type of pattern detected and the fact that a stop command is issued can be stored, so that we can determine what type of documents are placed for copying in this device, or more specifically in the copier in which this device is installed.

Figure 20:
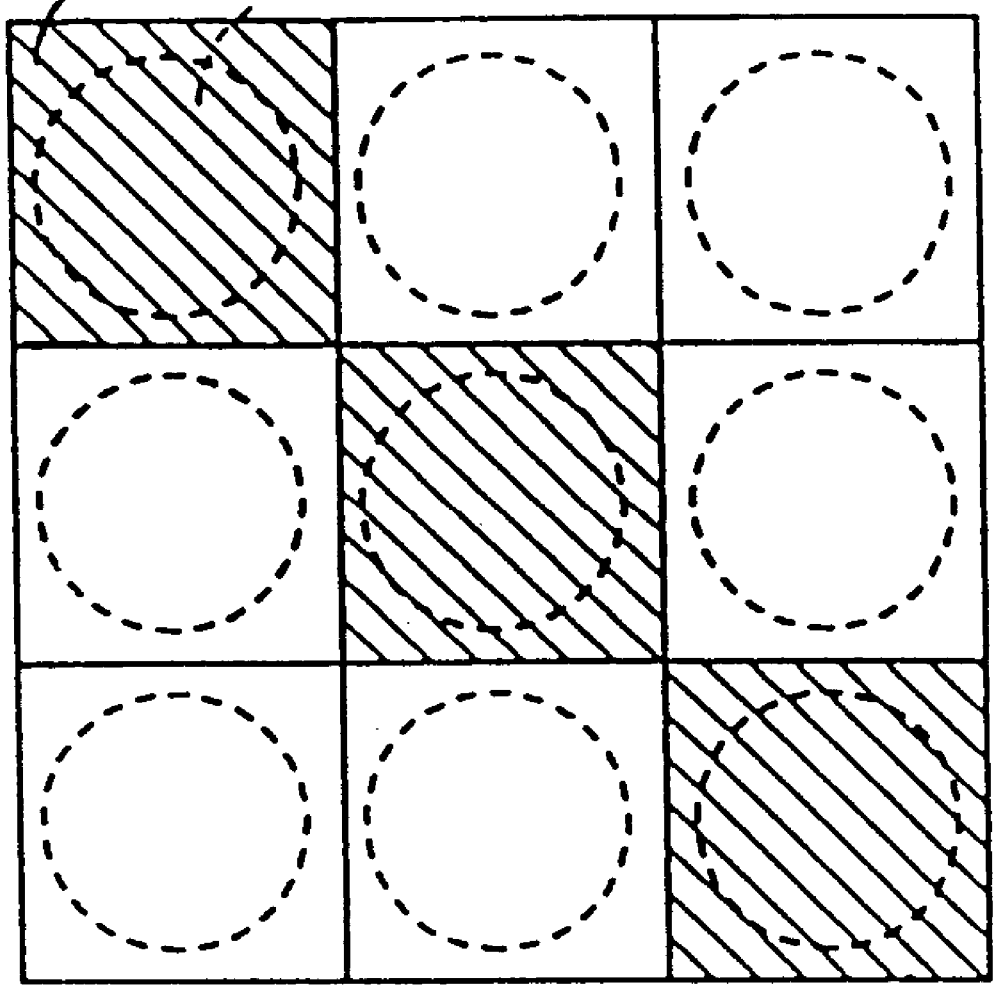
FIG. 20 shows another version of the specified pattern.

In the example discussed above, sampling and characteristic count extraction are performed on the entirety of each cell; however, the invention is not limited to this design. It would also be possible, for example, to color all of a given cell as shown in FIG. 20, and sample only a part of it. Sampling region 44a might be round and have a diameter smaller than the width of the cell, as shown in the drawing. This scheme can cope effectively with the shifts of position pictured in FIGS. 14(A) and 14(B). It allows the processing for S extracting and removing the pattern to be simplified, since the corner of the cell can clearly be distinguished (i.e., the corner is highly visible because the color extends all the way to it).

In the example discussed above and its modified version, the mark in each cell is either colored or left uncolored to produce 1 bit of data. It would also be possible to provide a mark of intermediate density, which would produce multi-valued data in a single cell. This would allow various types of data and classifications to be distinguished using a small number of cells. It would also allow more complex marks to be created which would be more difficult to decode.

Figure 21A:
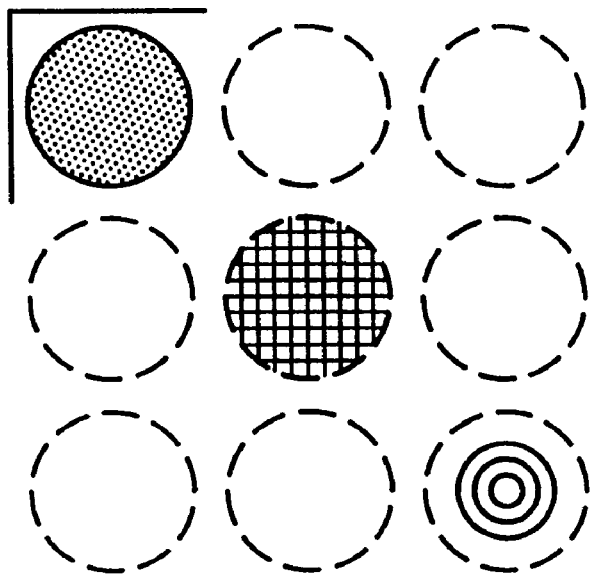
FIGS. 21(A)–21(B) show another version of the specified pattern.
Figure 21B:
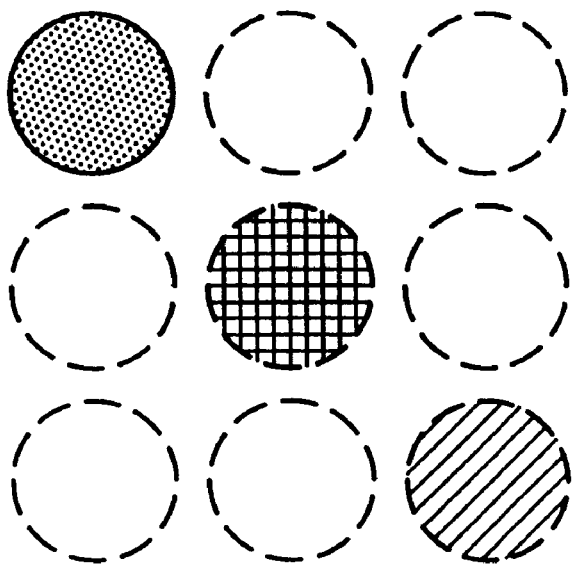

Let us now consider some concrete schemes by which the density of the marks may be varied. FIG. 21(A) shows different densities created by saturating the entire mark with color, using hatching to leave some portions white, and using progressively smaller shapes in the mark (in the example shown, three concentric circles are used). FIG. 21(B) shows how the density may be reduced entirely in step fashion. The same effect could be achieved by varying the color which is used.

Figure 22:
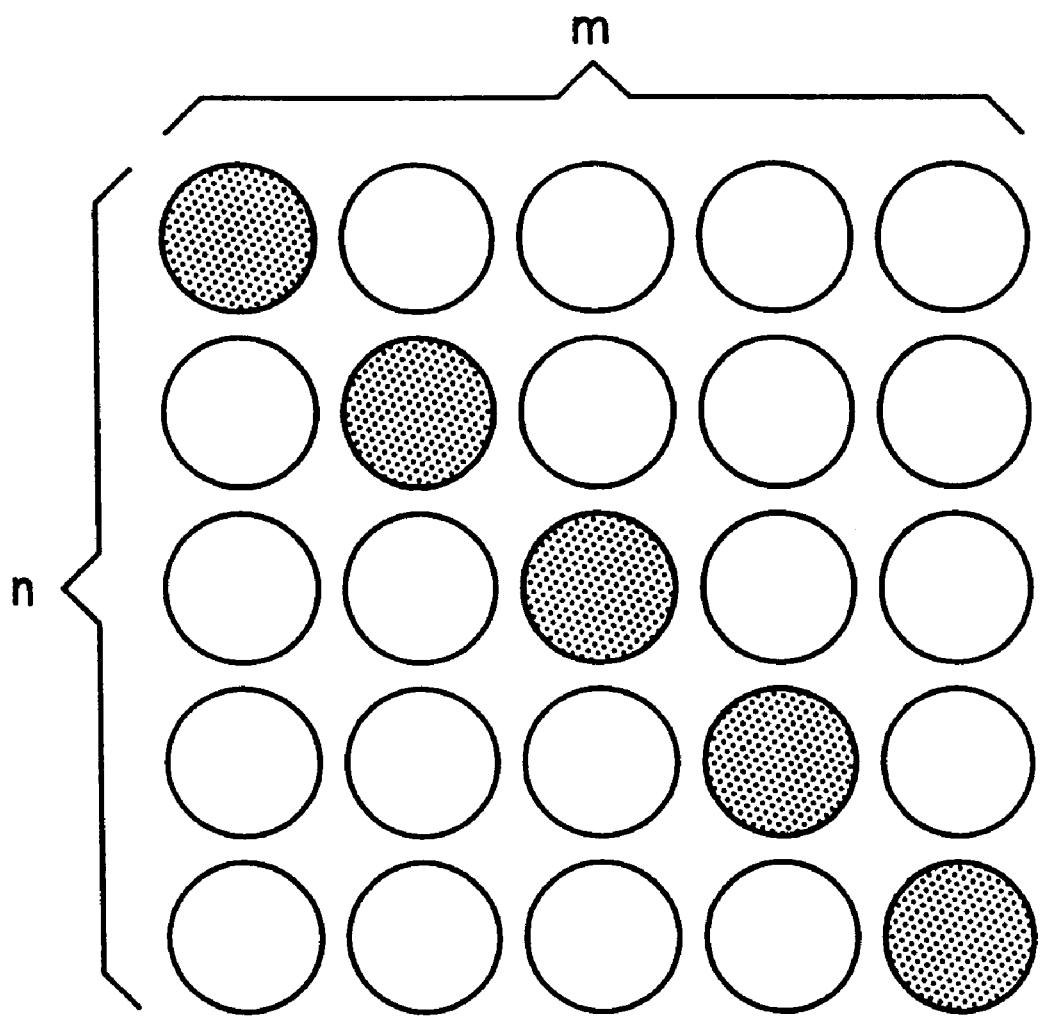
FIG. 22 shows another version of the specified pattern.

Both the example discussed above and its modified version use specified patterns which consist of square cells arranged in a 3×3 grid; however, the invention is not limited to this design. Any number of cells may be used. FIG. 22 shows an arrangement of n×m cells (here n=m, but they could also have different values).

As FIG. 23 shows, it would also be possible to arrange cells 47 in concentric circles. Each cell would then be fan-shaped or the shape of a fan with its inner portion removed. Dark marks 48*a* and uncolored marks 48*b* would then be arranged in some appropriate fashion in these cells 47. Since the overall pattern will be a circle, the processing to extract a hit mark in detection device 1 and extraction device 2 will use a search for a mark.

Figure 23A:
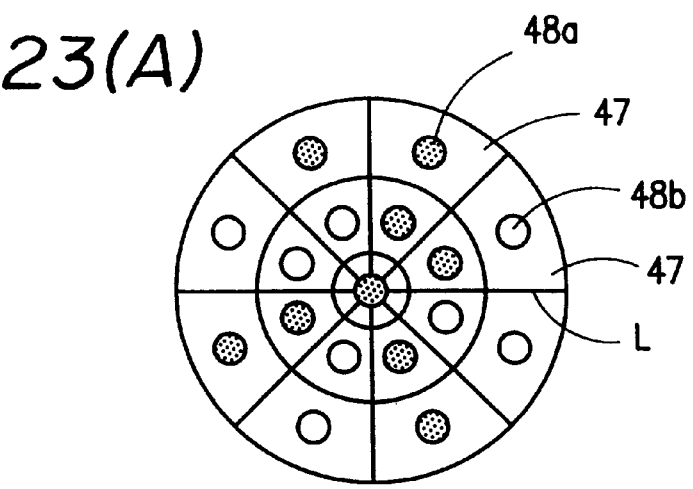
FIGS. 23(A)–23(C) show another version of the specified pattern.
Figure 23B:
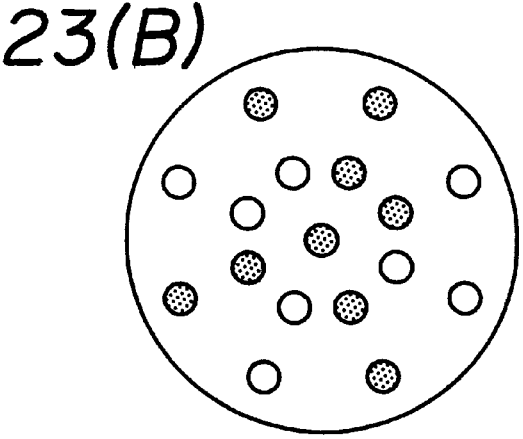
Figure 23C:
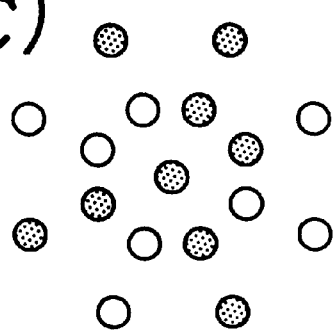

When this scheme is used, the probability of a shape resembling the specified pattern appearing on an ordinary document is extremely small, so the chance of a recognition error is minimized. Here too, it would be possible to use multivalued densities in each cell, or to color entire cells 47. In this version the specified pattern may be represented in a variety of ways: as a circular frame delineating the contour of the pattern, which is partitioned into cells by linear segments L, as shown in FIG. 23(A); or only the circular frame may be shown without lines to partition the cells, as in FIG. 23(B); or without even the circular frame, as shown in FIG. 23(C). When, as in this case, there is a large number of cells, it is not necessary to use every cell to render a judgment. A characteristic count can be extracted from a portion of the cells and a determination can be made from that count as to whether this is the specified pattern.

Figure 24A:
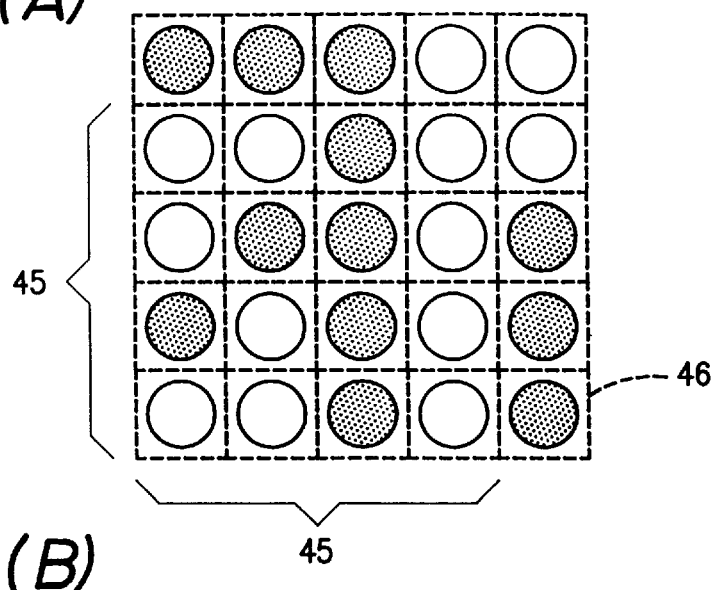
FIGS. 24(A)–24(C) show another version of the specified pattern.
Figure 24B:
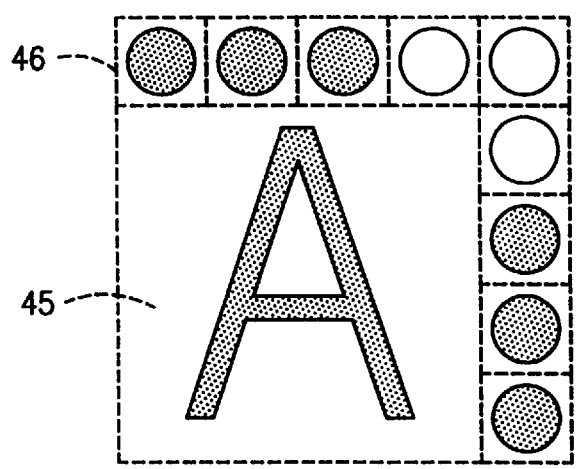
Figure 24C:
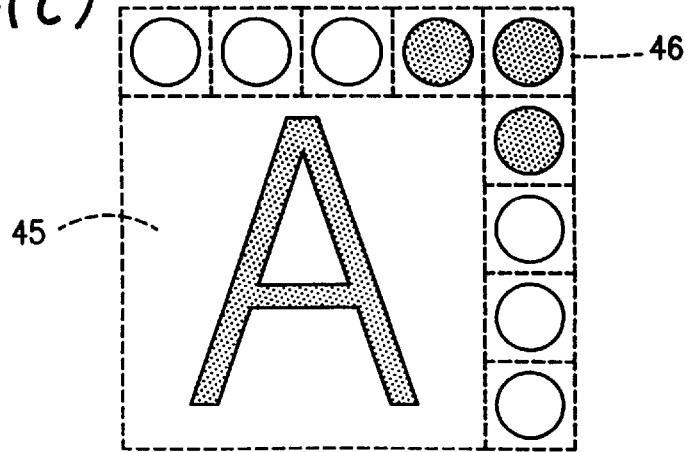

FIG. 24 shows three other examples of specified patterns which may be used with this invention. In FIG. 24(A), multiple patterns are provided. Area 45, which occupies a portion of a specified mark consisting of n×m cells, is a single unit; peripheral area 46, consisting of 9 cells, specifies the type of document. A commonly used design which does not consist of bit data is shown in FIGS. 24(B) and (C). Here an ordinary mark (in this example, the letter A) is used instead.

With this scheme, the goodness of fit is calculated for the pattern as a whole. If this value exceeds a given threshold value, we focus on area 46, which contains the bit data. The resolution of this area is increased and a characteristic count is extracted cell by cell. The patterns are then matched using fuzzy inference, which allows them to be discriminated rapidly and accurately. A pattern like this (one which contains both a mark and bit data, for example, an "A" with bit data above it and to its right) has only a small probability of occurring in an ordinary document (one whose reproduction is not prohibited), so the probability of mistaken identification is very small.

Figure 25A:
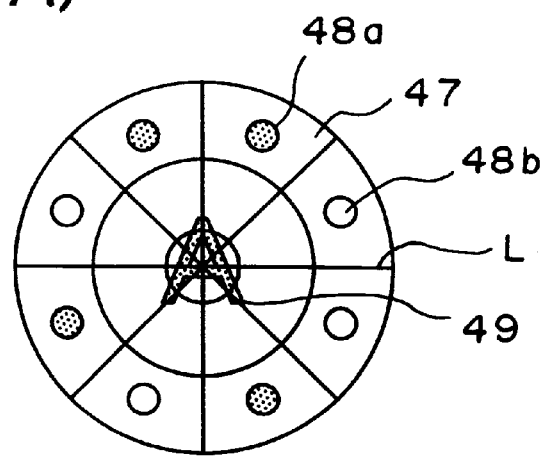
FIGS. 25(A)–25(C) shows another version of the specified pattern.
Figure 25B:
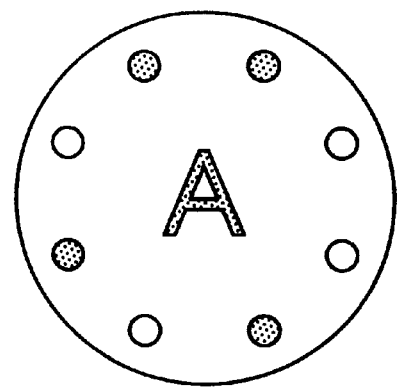
Figure 25C:
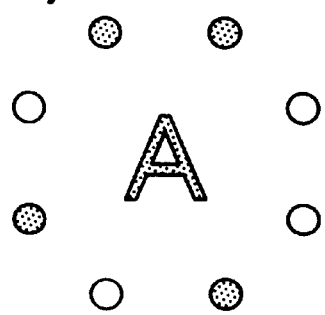

A pattern which combines a mark with bit data can also take one of the forms shown in FIG. 25. Cells 47 are formed by concentric circles. In these cells are marks 48*a* and 48*b*. In a specified location among these cells (here, in the center) is a mark 49.

The shape of the cells and the overall pattern is not limited to those described in the example discussed above or its modified versions. A combination of triangular cells could be used instead, or any arrangement in which at least a portion of the pattern contained coded data.

Figure 26:
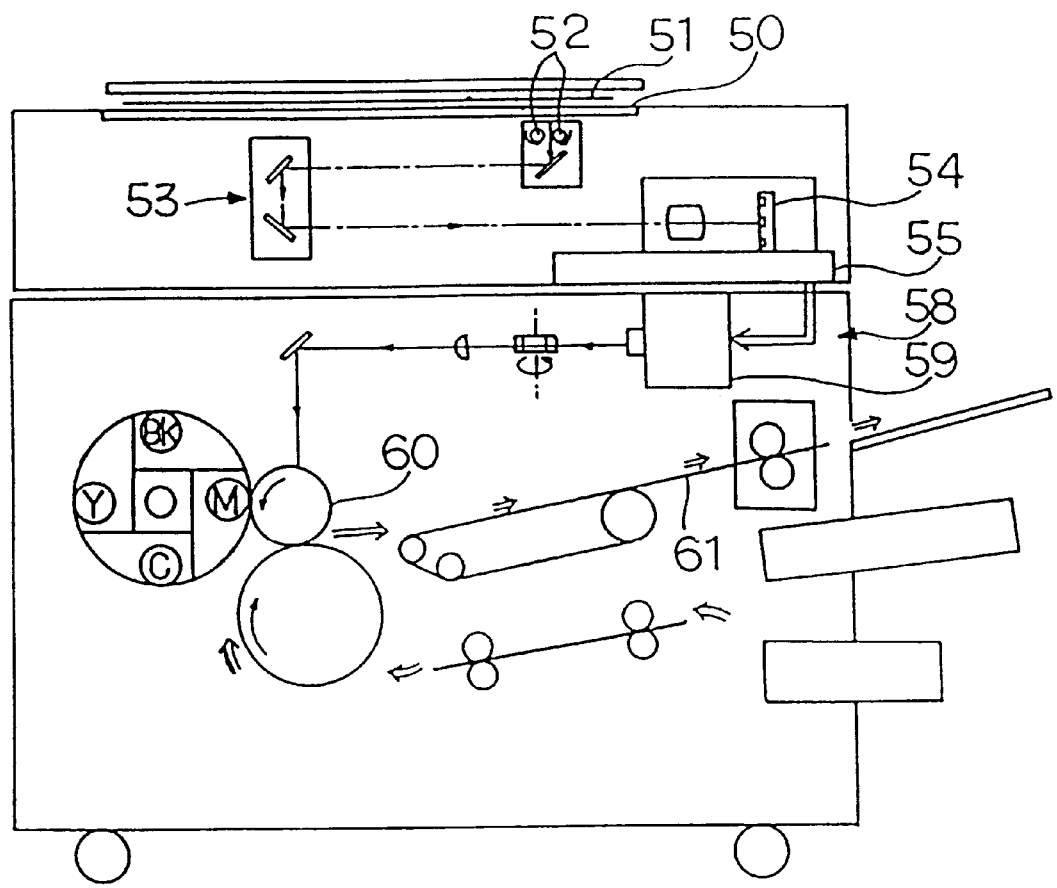
FIG. 26 shows an example of the copy machine with which this invention is concerned.
Figure 27:
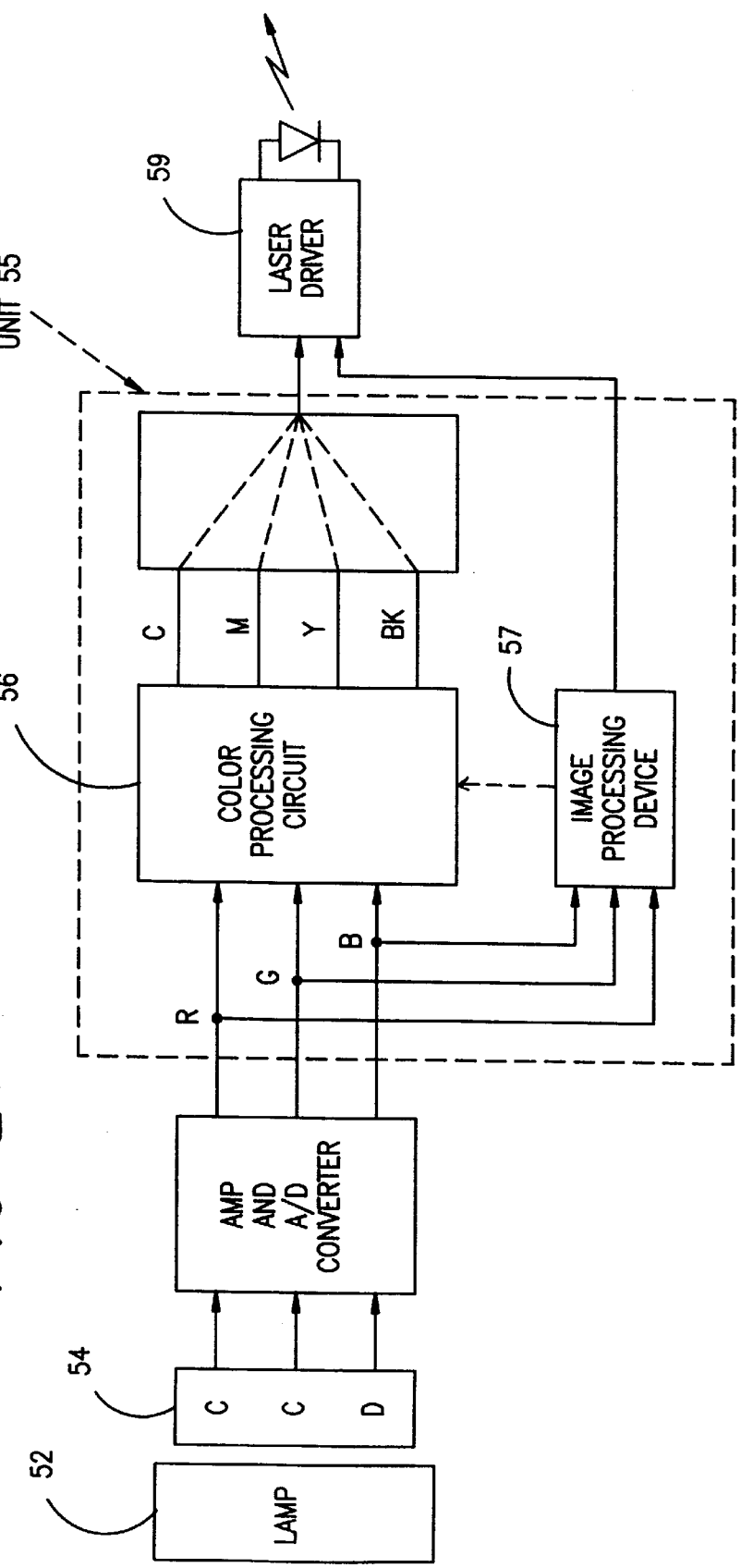
FIG. 27 shows an example of the copy machine with which this invention is concerned.

FIGS. 26 and 27 show examples in which the aforesaid device is built into a copy machine. As shown in the drawing, the light emitted by lamp 52 is reflected by document 51, which is loaded on glass 50. The reflected light passes through optical system 53 and enters COD 54, which is an image scanner. Here the image on the document is scanned. Lamp 52, as well as the flat mirror and other components which comprise optical system 53, moves at a specified speed as it scans the document. Line by line, CCD 54 scans the specified portion of document 51, and it transmits the image data (R/G/B) to signal processing unit 55.

Signal processing unit 55, which is pictured in FIG. 27, has an ordinary color processing circuit 56 and device 57, which is the image processing device discussed above as a feature of this invention. The aforesaid image data is transmitted in parallel to color processing circuit 56 and to image processing device 57. Color processing circuit 56 analyzes the colors into their various components, magenta (M), cyan (C), yellow (Y) and black (Bk), and outputs these data to printing device 58. The image is actually scanned four times. one of the aforesaid four components (M, C, Y, or Bk) resulting from the first scan is output to laser driver 59, which is positioned on the input side of printing device 58. This causes a laser beam to be projected onto a specified location on light-sensitive drum 60. When the fourth scan has been completed, the copying operation is performed on the copy paper, and the finished copy 61 is output. Since the actual mechanism which executes the copying operation is identical to that of existing copiers, we shall omit an explanation of its action.

While the aforesaid signal processing is being carried out by color processing circuit 56, image processing device 57 is performing its own processing in parallel to obtain the degree of resemblance between the pattern it finds in the image data it is scanning and the specified pattern. If document 51, which is still being scanned, is a bank note or other document which may not be copied, the device will generate a control signal to halt the output of the aforesaid laser driver or transmit a control signal to color processing circuit 56 to cause it to execute its various routines for situations when copying is prohibited, such as making the entire screen go black.

The judgment processing in this example is performed in real time during the first scan. This device, then, can be used in copiers which employ a single-scan method. Since only a portion, and not the entire face, of a bill is detected and matched against a specified pattern, none of the requisite memories need have a large capacity.

In the example discussed above, the device is installed in a copy machine; however, this invention is not limited to this application, but could be applied as well in a color scanner, a color printer, a fax machine, a device to transmit communications, or a variety of other devices.

The image processing device of this invention and the copy machine in which it is used have a lower cost than their predecessors because they require only a small-capacity memory. This improvement is a result of the fact that the specified patterns which are detected constitute only a portion of the entire image. Thus these patterns can be detected regardless of the size (i.e., the exterior dimensions) of the document which may not be copied (or printed). Detection is based on whether or not these specified patterns can be found. All processing from detection of possible specified patterns in the first scan to determining their degree of resemblance to a reference pattern can be performed in real time. The specified pattern will not be missed even in a single-scan copy machine, and the recognition rate will be high.

A given pattern to be detected will have at least a portion which contains coded data which were determined ahead of time. By printing or otherwise applying this specified pattern somewhere on the bank note, stock certificate, or other item which may not be copied, we can insure that a proscribed document will be detected accurately regardless of what type of document it is or what its shape or appearance may be. There is virtually no possibility that an ordinary document would have on it a shape identical to a specified pattern in at least a portion of which there are coded data. This minimizes the probability of false positives. Since the object to be detected (i.e., the pattern) is already determined, the image processing device can be given knowledge of this pattern. Then should any new document be issued which may not be copied, the same pattern can simply be imprinted on it, and it too will be detected. Because the specified pattern is the only item which needs to be detected, the invention can be applied to a wide variety of documents which may not be copied, and the processing can be performed at high speed.

If for every search the received image is gradated and potential matches are compared to the gradated image (or pattern), the image data with the specified pattern to be detected can be extracted quickly and accurately.

If the aforesaid specified pattern comprises a portion which does not consist of coded information and/or a portion which does, and one of a number of different patterns is incorporated in it, a complex shape or contour may be used to minimize the probability of a similar pattern being found on an ordinary document. Furthermore, because the types of shapes which can be represented are quite limited, the device requires only a small amount of fuzzy knowledge, and processing can be performed more rapidly.

If the density data for each cell are multivalued, various types of documents could be distinguished using a small number of cells. The device could then be used to determine the type of document loaded into the copier. If a fictitious mark whose diameter is less than the width of a cell is established in a specified location within a given cell, and the density of this mark is varied, or the sampling region used to obtain the density of the aforesaid cell is the region in a specified location in that cell which is within a circle whose diameter is less than the width of the cell, the device will be able to cope effectively with shifts of position.

By installing this image processing device in a copy machine, we can absolutely prevent the output of copies of documents whose reproduction is illegal, such as bank notes and negotiable securities. This entails refusing to copy the prohibited document while allowing other documents to be copied and output.

Second Embodiment

Herein we shall discuss an ideal second embodiment of the image processing scheme and device of this invention as well as a copy machine and other devices employing this scheme and device, with reference to the appended drawings. As in the first embodiment, FIG. 1 shows our first example of this second embodiment. As is shown, the image data read by the image sensor in the copy machine are input into pattern detection device 1, which detects the positioning marks. As these image data are scanned by an image sensor such as a CCD, they are transmitted successively, region by region, to device 1. The actual data which are sent are full color data for each of the red (R), green (G) and blue (B) components, with resolution of 400DPI.

Using masks of specified sizes, detection device 1 checks the area of this image via pattern matching for positioning marks. It specifies a reference position (the center of gravity for a triangle, the apex of a corner for a rectangle, and so on) for any pattern designated by these marks, which is a candidate for a match, and it transmits the relevant data to device 2, the device to extract a specified pattern.

Based on the position (i.e., reference position) data which it receives, extraction device 2, with the help of the control CPU, extracts a specified portion of the image which is read. Device 2 creates from these extracted data a pattern to be compared to a reference in the pattern matching process to be performed later. It sends this pattern to device 3, which performs the next stage of the processing, the comparison of two patterns.

Matching device 3 uses fuzzy inference to obtain the goodness of fit of the extracted pattern with respect to the reference pattern (i.e., the specified pattern), and it determines whether the extracted pattern is, in fact, the specified pattern. If it is, the device outputs a specified control signal.

In this example of a data processing scheme according to this invention, then, ordinary data read by a copy machine are used. On the first scan, the positioning marks are detected by device 1. A pattern which is a potential match (i.e., the dimensions of a region to be extracted) is calculated based on the location of these marks, and this pattern is extracted by device 2 on the second scan. The matching device performs the specified processing sequentially on the pattern in the extracted region. This pattern is then matched against a reference using fuzzy inference, and the device determines whether this is the specified pattern.

The actual pattern matching performed by device 3 uses a detailed image which is relatively close to the original. Before this takes place, however, the number of patterns to be matched is narrowed down by the search for positioning marks. The search for these small marks is simple and fast, and it allows the fuzzy inference processing to be performed on only a few candidates. The result is that the overall processing can be performed at high speed. While each process is being performed, the processing performed by the other devices, for example, the reading of the image or the search for positioning marks, is also in progress. Thus there is no need to halt the processing while a determination is being made, and all processing can be performed rapidly in real time.

Figure 28:
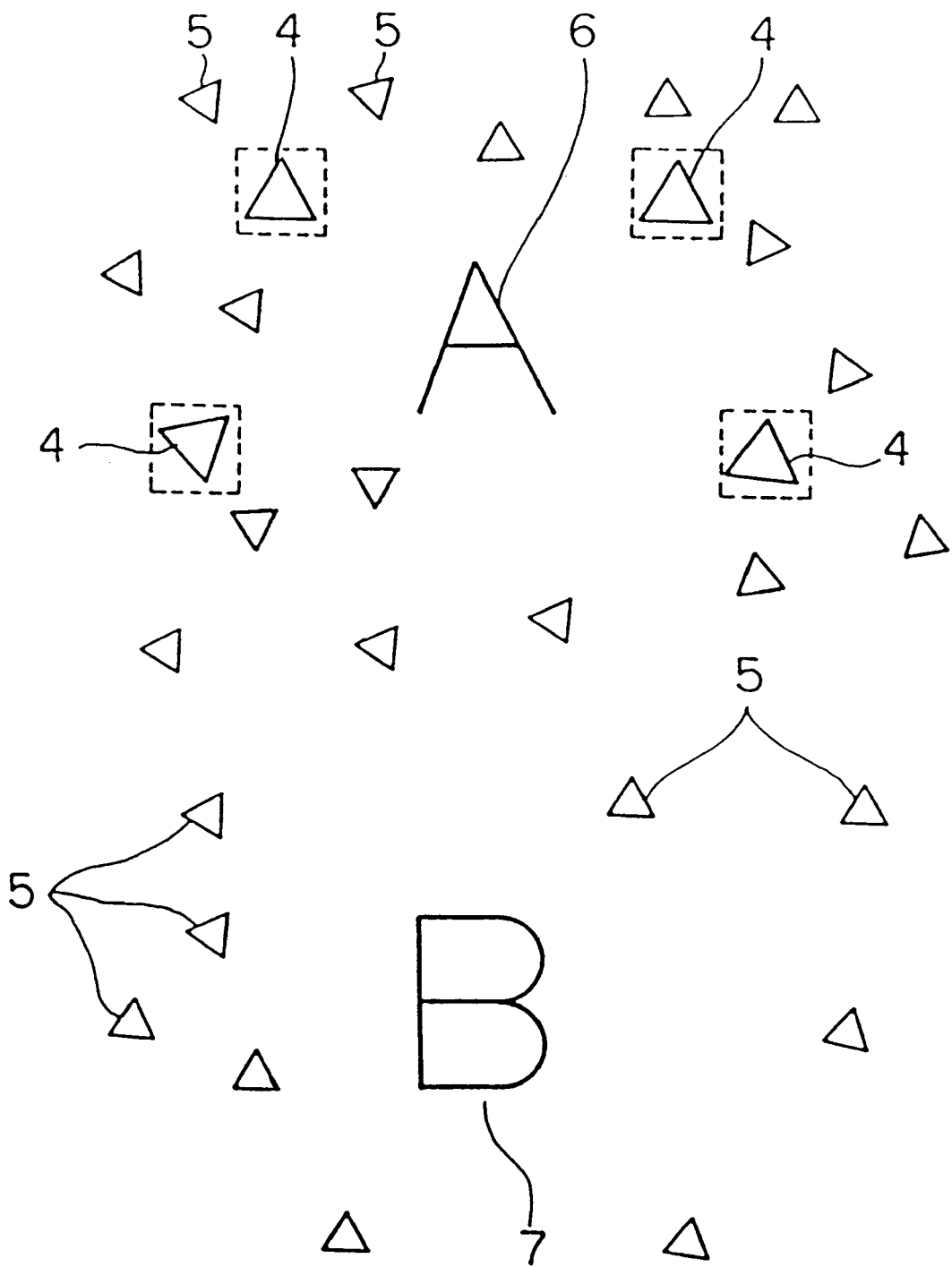
FIG. 28 shows an example of positioning marks, dummy marks and a specified pattern which might be used with this invention.

We shall next discuss an actual example of the image processing scheme described above. We begin by discussing the positioning marks used in this example. As is shown in FIG. 28, positioning marks 4, which are surrounded by squares consisting of broken lines, here consist of triangles. At least three (and in this case four) marks 4 are arranged in a given relationship. These four marks are placed on the apices of an asymmetrical quadrilateral (some shape other than a square).

In this way, when marks 4, arranged in their given relationship, are detected, the coordinates of their locations can be used to determine unmistakably the orientation and position of the document loaded in the copier as well as the location of specified pattern 6 with respect to marks 4. Positioning marks 4 can be detected in the recognition processing of the first scan. Based on these marks, the location of a pattern which is a candidate for matching can be specified accurately and swiftly, and the processing can proceed at high speed.

If the coordinate position of each mark 4 is specified, the marks can be made smaller (in comparison to guidelines). Although this will make them more difficult for an uninformed person to discern, the rate of recognition will remain high. Making the marks smaller will also allow a smaller window to be used for their detection, and it will allow the detection circuit to be simplified and constructed of cheaper components. Smaller marks will also contribute to processing speed.

In this example, numerous dummy marks 5 which resemble positioning marks 4 are arranged around their periphery. To be more specific, these dummy marks are triangular, as are the positioning marks; but the dummy triangles have shorter sides. Since there are so many similar marks, a person glancing at them would be unlikely to notice that some of them serve as positioning marks. It would also be difficult to determine which of these marks constitute the positioning marks. This makes it more difficult to tamper with the bill; and if a document which may not be copied is being processed, it will be detected reliably. In the example shown in the drawing, dummy marks 5 have all been made the same shape for the sake of convenience (they are slightly smaller triangles than positioning marks 4); however, if a number of different sizes of dummy marks 5 are arranged appropriately, it will be even more difficult to distinguish the real positioning marks 4.

When this arrangement is used, in the examples shown, pattern 6, the "A" surrounded by positioning marks 4, will be extracted and removed as a candidate for matching, while pattern 7, the "B" without positioning marks, will not. In this example the positioning marks 4 are enclosed in squares drawn in broken lines for the sake of the explanation; however, these squares would not be printed on an actual document.

Figure 29:
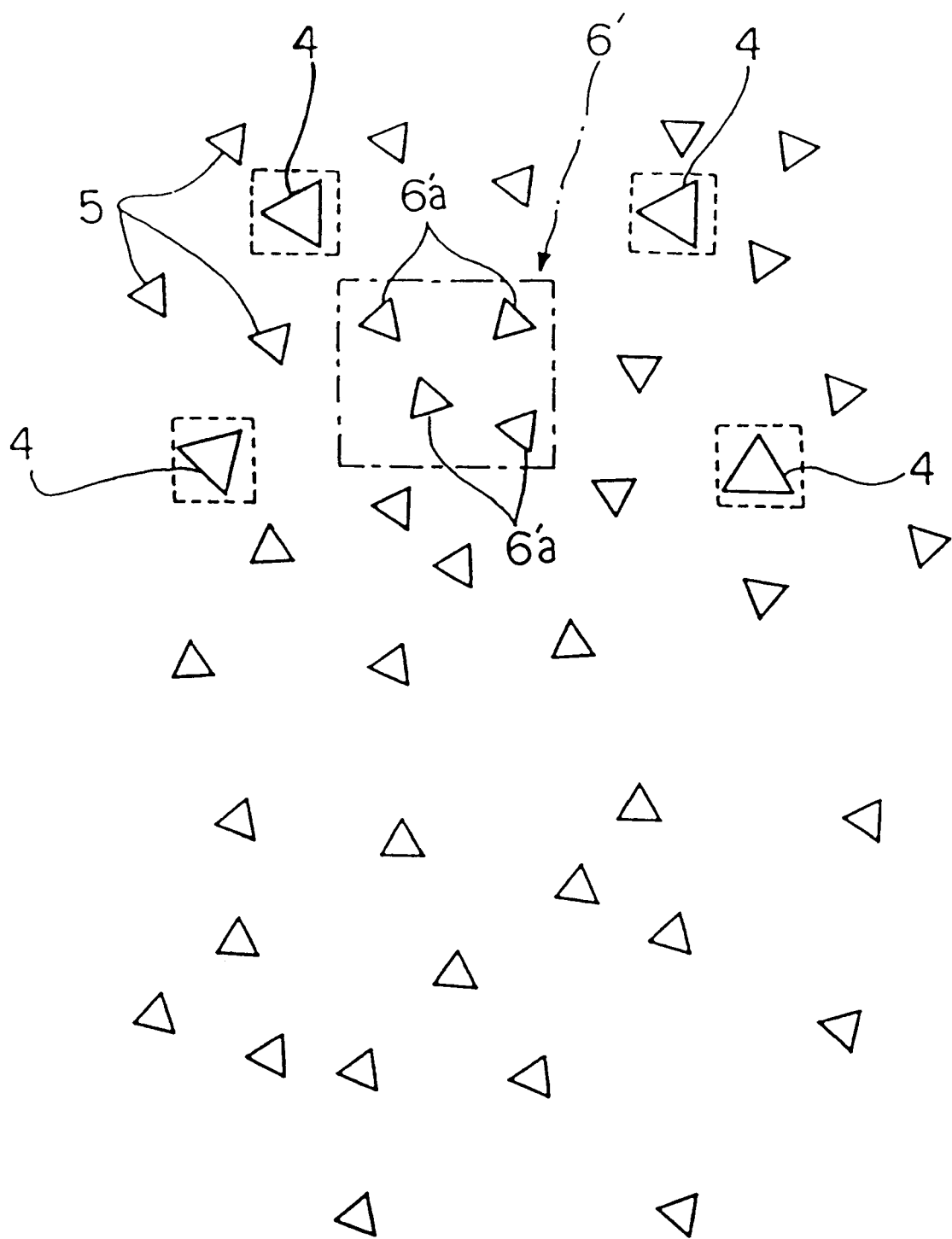
FIG. 29 shows another example of positioning marks, dummy marks and a specified pattern which might be used with this invention.

The specified pattern need not be limited to a letter or symbol, as shown in FIG. 28. It could, for example, as shown in FIG. 29, consist of a set of elements 6'a arranged in a specific relationship in region 6', which is surrounded by positioning marks 4.

If, as shown in the drawing, elements 6'a are given the same shape as dummy marks 5, it will be very difficult to determine where the positioning marks are, which marks constitute the specified pattern, and which marks are dummies which are unrelated to finding the pattern. This will minimize the probability of tampering.

Pattern elements 6'a need not be identical to dummy marks 5. They may be similar to marks 5, or they may be identical or similar to positioning marks 4. It would also be possible for the pattern elements to have a different shape unrelated to any of the other marks.

Figure 30:
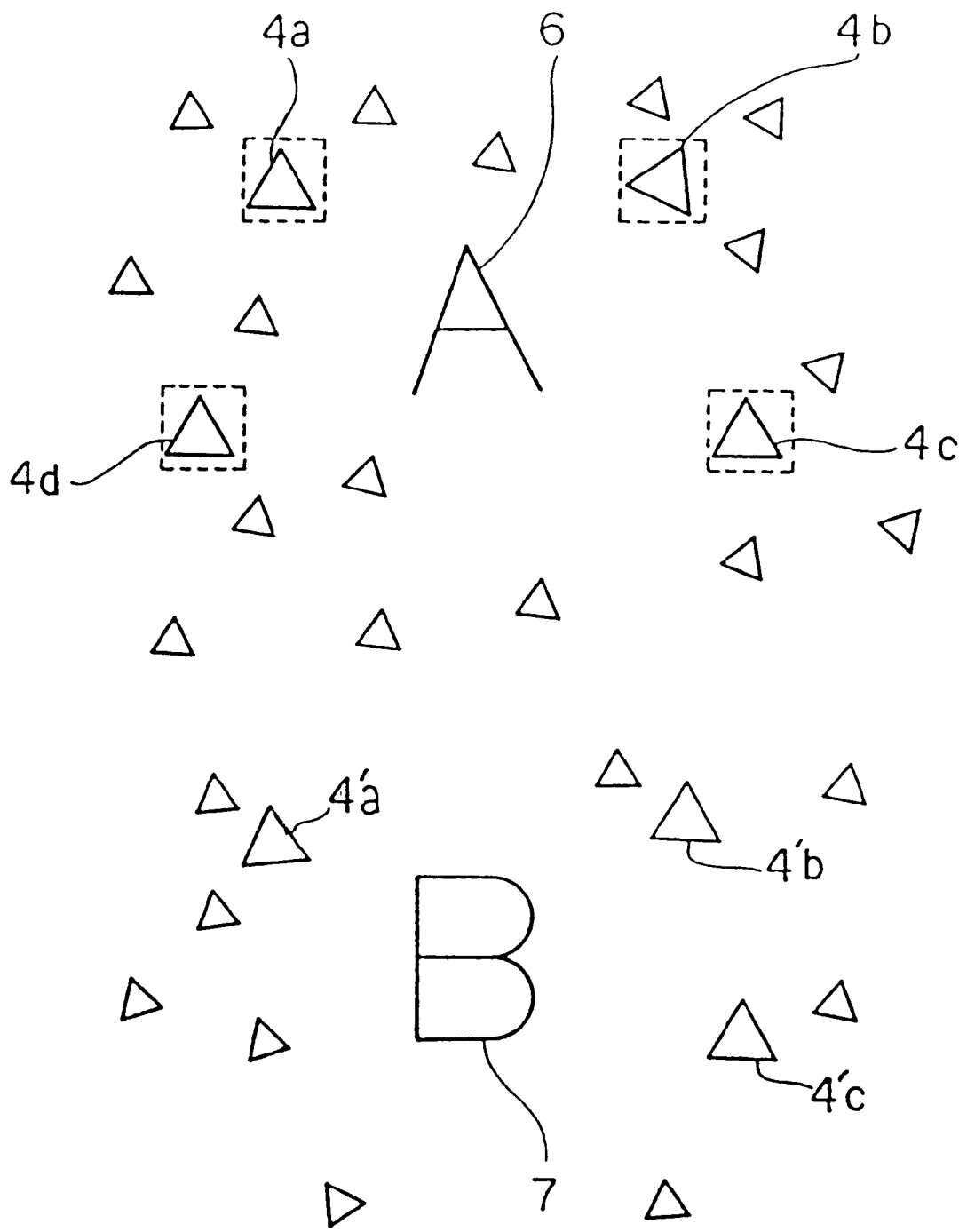
FIG. 30 shows another example of positioning marks, dummy marks and a specified pattern which might be used with this invention.

As is shown in FIG. 30, dummy marks 4'a through 4'c may be used which are identical to positioning marks 4a through 4d. In this example, when each positioning mark is found to coincide with its predicted coordinates and the positions of the marks relative to each other also correspond to those predicted, the marks are recognized as the real positioning marks, and the region they designate is extracted. If one of these marks is missing (in the example shown, the dummy mark corresponding to 4d), the marks will not be recognized as positioning marks, and pattern 7, the letter "B", will not be extracted. When dummy marks are used which are identical to the positioning marks, a person who attempts to make improper use of the document will find it extremely difficult to determine correctly the location of the positioning marks and/or the specified pattern.

In all the examples shown thus far, the specified patterns 6 and 6' are placed in the regions surrounded by positioning marks 4 and 4a through d; however, the invention is not limited to this condition. The specified pattern may be placed somewhere outside the marks, as long as it is in a given relationship relative to those marks.

If we use FIG. 30 as an example, we could call the letter "B" the specified pattern and define it (i.e., define the region containing the item to be extracted) as being a specified distance away from the longest side (4d–4c) of the trapezoid formed by marks 4a through 4d. Because the quadrilateral defined by marks 4a through d is asymmetrical, as discussed above, the region to be extracted and removed can be determined unmistakably, and it can be specified simply and precisely.

We shall now discuss in detail the actual configuration of each component of the device shown in FIG. 1, our first ideal example of the image processing device of this invention, in which the aforesaid scheme may be implemented. An example of pattern detection device 1 is shown as pattern detection device 1" in FIG. 31. The image data received (graded data (dark-light data) corresponding to RGB data) are converted to binary data at a given threshold by binary processing unit 23. The converted binary data are stored temporarily in multiple line memory 12. By setting an appropriate threshold for the conversion to binary, we can produce an image in which, for example, pixels occupied by positioning marks will appear black while those surrounding them (the background) are totally white.

The output of the said binary processing device 23 is sent to search unit 26 by way of line memory 12. Search unit 26 uses a mask of dimensions n×m (where n and m may have the same value or different values) to search the image data which it has received (after it is converted to binary data) for the specified pattern (here, the positioning marks). Specific details are given below.

Figure 31:
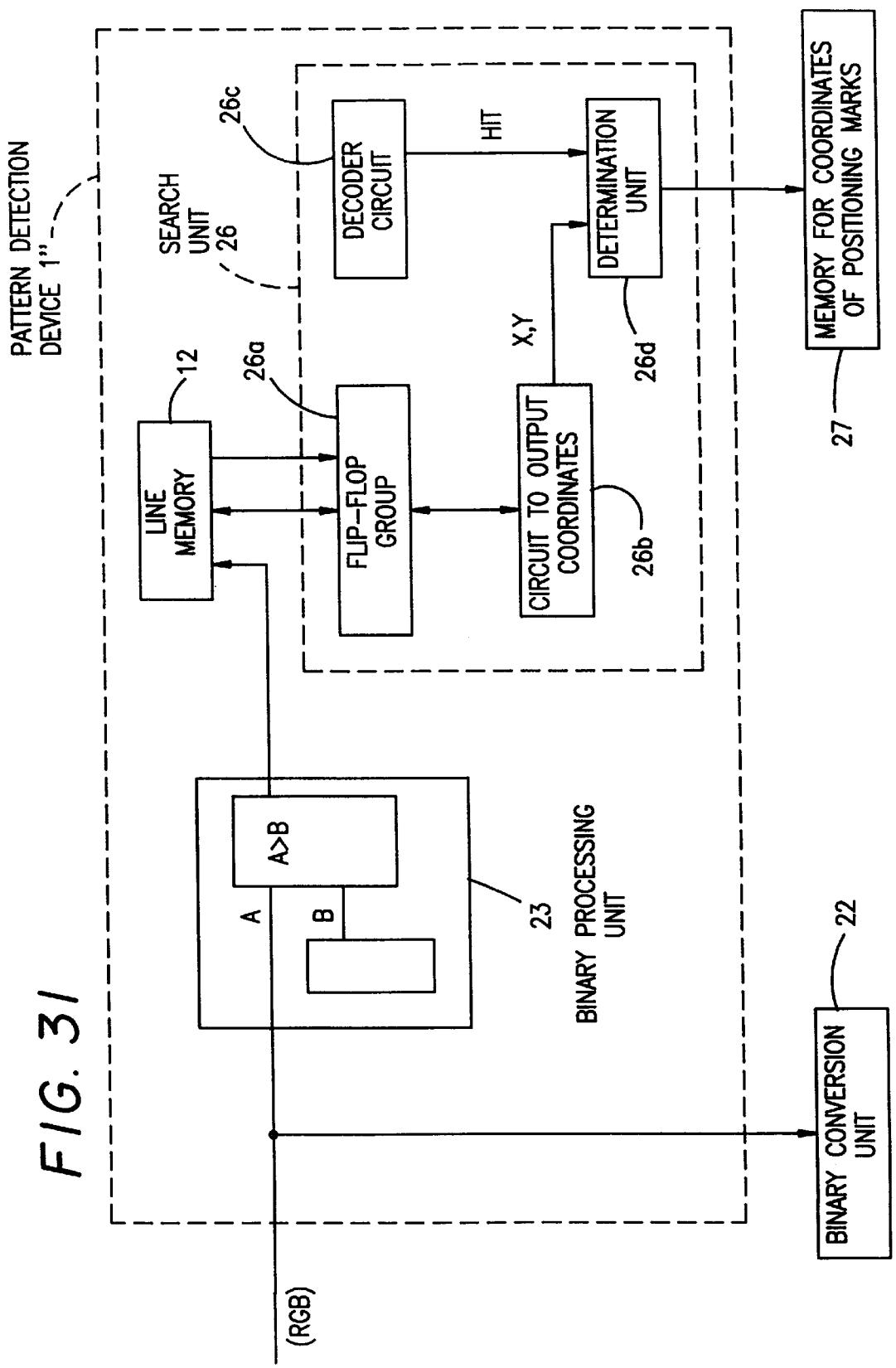
FIG. 31 is a block diagram of the internal structure of a device to detect the positioning marks.

Search unit 26, shown in FIG. 31, is composed of flip-flop group 26a; circuit to output coordinates 26b, which receives the output from flip-flop group 26a, obtains the coordinates of the hit points (in this example, the center coordinates of each cell (or pixel) of the mask) which indicate the positions of the specified pattern (here the positioning marks); decoder circuit 26c, which checks the mask for positioning marks; and determination unit 26d, which receives the output from decoder circuit 26c and, in the event that the positioning marks have been detected, obtains and outputs their center coordinates.

Figure 32:
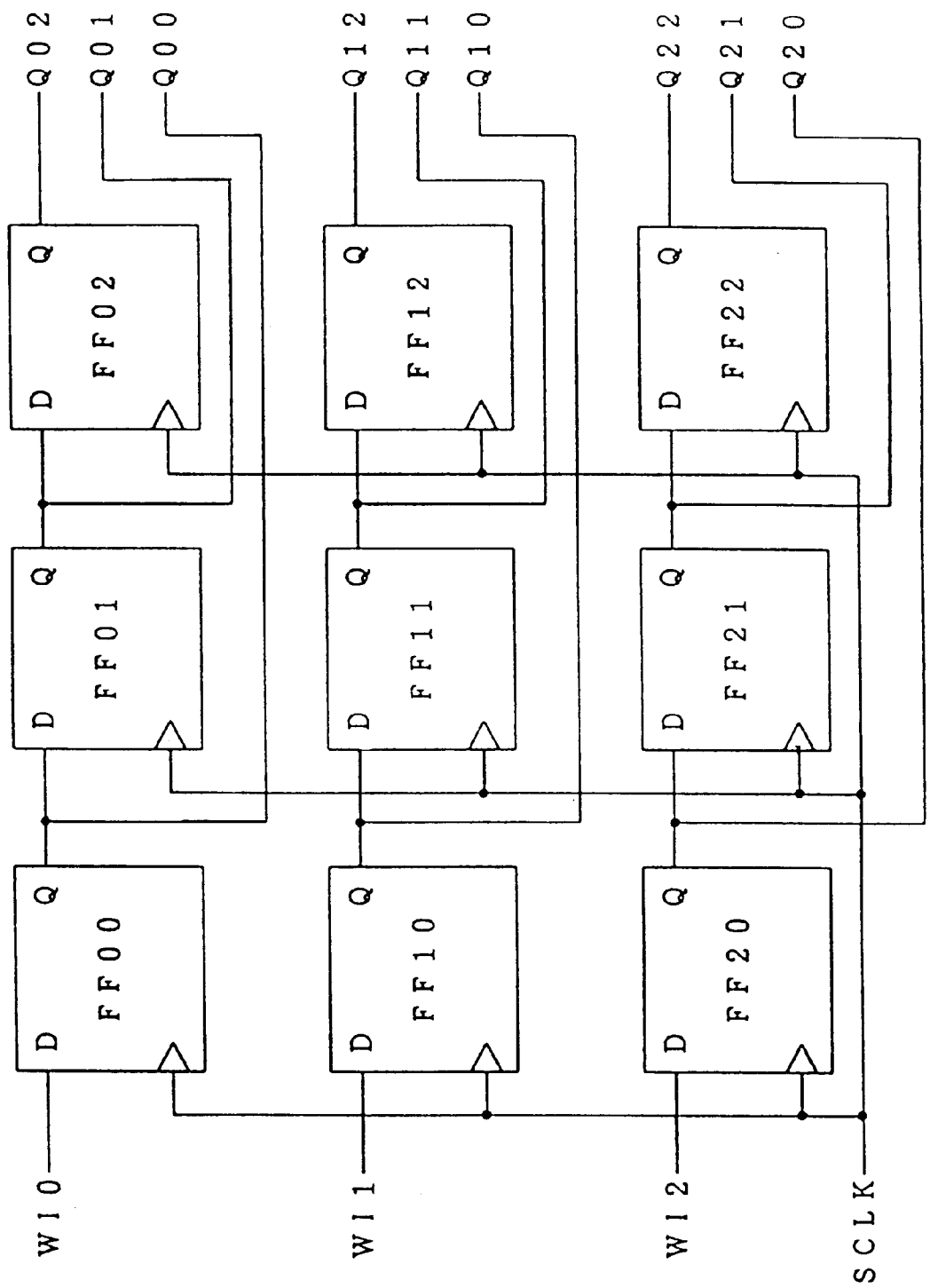
FIG. 32 is a block diagram of the internal structure of the flip-flop group in the detection device.

The actual arrangement of flip-flop group 26a is shown in FIG. 32. In this example, for the sake of convenience, the area being processed will consist of 3 pixels of scanning×3 pixels of feed, or 9 (3×3) flip-flops FF. The three pixels W10, W11 and W12, which are in line in the feed orientation, are taken from the image data stored in line memory 12, synchronized by means of the shift clock SCLK, and input to the first column of flip-flops, F00, F10 and F20. New pixel data are input to W10, W11 and W12 sequentially according to timing provided by the shift clock, and the data are transmitted to the next column of flip-flops. The pixel data which are input for the binary image, Q00, Q01, Q02, Q10, Q11, Q12, Q20, Q21 and Q22, are output through the output terminal Q on each flip-flop. For a black pixel, the output of the flip-flop will be "1".

When all scanning data up to the end of one line have been input, the device shifts down one line in the direction of feed and inputs data from the beginning of that line. In this way, the 3×3 pixel area (the mask) which is the domain of the search is moved over the surface of the document.

Figure 33:
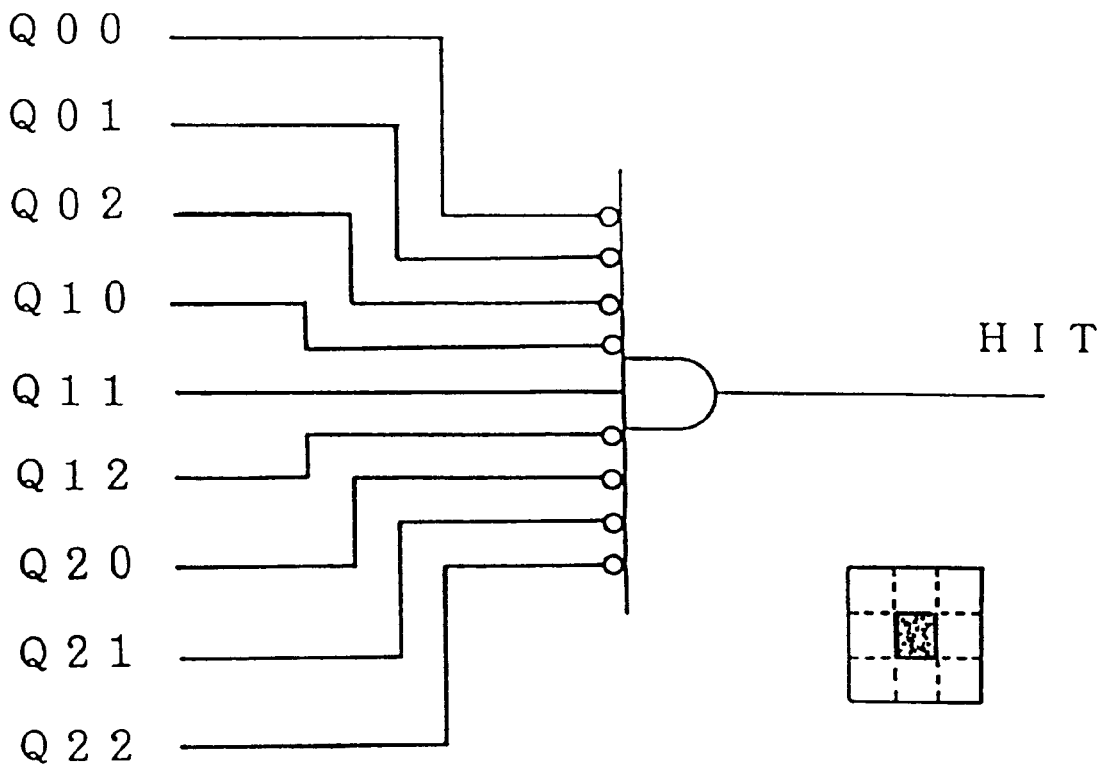
FIG. 33 is a block diagram of the internal structure of the decoder circuit in the detection device.

Each of the aforesaid outputs, Q00, Q01, Q02, Q10, Q11, Q12, Q20, Q21 and Q22, is input into decoder circuit 26c. Decoder circuit 26c is pictured in FIG. 33. If the pattern of 3×3 pixels which is output by flip-flop group 26a is a given pattern (such that the central pixel is black and the eight surrounding pixels white), the output of the corresponding AND element will go high. If the hit output from decoder circuit 26c goes high, we know that there is a positioning mark centered around flip-flop FF11.

Circuit 26b is connected to the addresses in multiple line memory 12. It outputs to flip-flop group 26a the addresses of images which must be input, and it outputs to determination unit 26d the coordinates (XY) of the pixels output by FF11, the central flip-flop in group 26a. The output of decoder circuit 26c and the XY coordinates of the positioning mark at that moment are input to determination unit 26d. If a hit output goes high, unit 26d stores its XY coordinates in memory 27, the memory for coordinates of positioning marks. In this example, we used nine flip-flops to search for a positioning mark using a mask of 3×3 pixels, and the states of the decoder circuit are those shown in the diagram. However, these conditions are chosen arbitrarily for the convenience of the explanation. The number of flip-flops used and the conditions for the decoder must be selected according to the shape of the pattern one wishes to detect and which portion of it one chooses to focus on.

As is shown is FIGS. 28 through 30, in this example we use dummy marks 5, which are slightly different in size from positioning marks 4. It is thus necessary that we be able to detect marks 4 without detecting dummy marks 5. The actual dot patterns forming marks 4 and 5 are pictured in FIGS. 34 (A) and (B) (Each cell S corresponds to one pixel). This being the case, flipflop group 26a would not consist of the 3×3 pixels shown in FIG. 32, but of 10×10 pixels corresponding to the cells S shown in FIG. 34. The decoder circuit for this purpose would have a one hundred-input AND element (or an equivalent combination of AND elements). The input terminals corresponding to the black pixels in FIG. 34 (A) would be non-inverting, but those corresponding to the white pixels would be inverting inputs. Then the hit output would go high only when the pattern shown in FIG. 34 (A) is found, and low in every other case (including the pattern in 8(B)). When the hit goes high, just as discussed earlier, the XY coordinates are output and stored.

When the positioning marks to be detected are triangles, as in this example, detection may depend on differences in angles. For example, decoder circuits 26c corresponding to a number of patterns with different angles (the portions for which input is inverted are composed of AND elements varied appropriately to correspond to the pattern), may be connected in parallel to the output of flip-flop group 26a. When one of the decoder circuits detects a given angle, we conclude that a positioning mark has been found.

If a positioning mark consists of a single pixel, the 3×3 pixel mask (or window) discussed above can be used just as it is. In this case there is a possibility that a printing irregularity might result in a spot the size of a pixel being printed somewhere that it does not belong. Even then, the scheme still entails the detection of a number of positioning marks in a given relationship to each other, so a spurious spot could immediately be distinguished before the region to extract is calculated. In practice, then, such a spot would pose no problems.

Figure 34A:
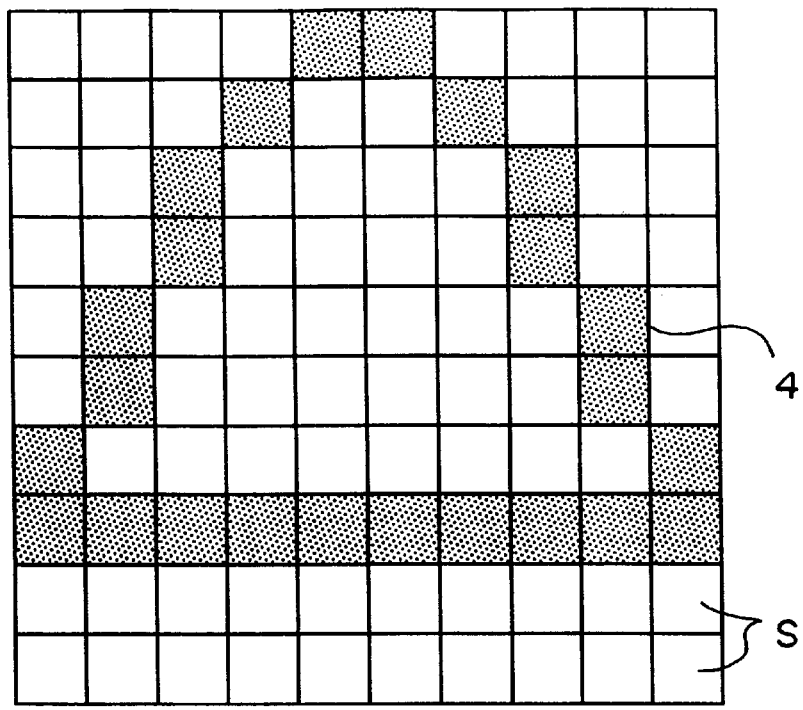
FIGS. 34(A)–34(B) give an example of dot patterns which might be used for positioning marks and dummy marks.
Figure 34B:
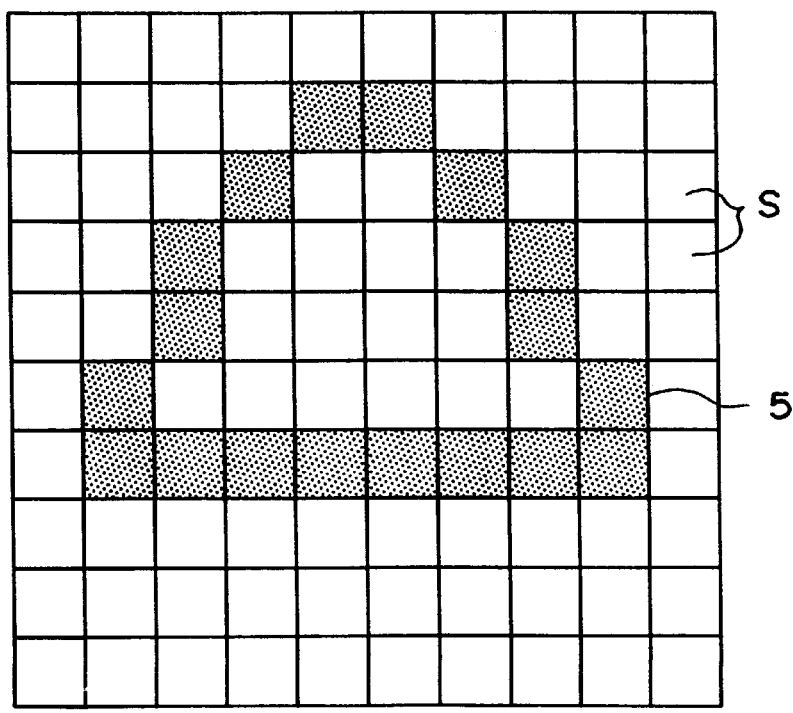

If we consider the example in FIG. 34, we can use a processing unit of a size sufficient to contain a single positioning mark (for example, 8×8 pixels). If we average an 8×8 pixel square and convert it to a binary value, the same square will be above the binary threshold value and so will go to black in FIG. 34(A), while it will be below the threshold and so will go to white in (B). If these units, after they are averaged and converted to binary values, are input to the flip-flops shown in FIG. 32, the circuits shown in FIGS. 32 and 33 can be employed without modification.

This scheme would require an averaging unit either before or after binary processing unit 23 in FIG. 31 to obtain the average value of a given number of pixels. The threshold value used to detect positioning marks as discussed above should ideally include both an upper and a lower limit. When the binary conversion is performed using a window comparator, the entire inside of the shape formed by the black pixels in FIG. 34(A), for example, will go to black, causing the pattern to exceed the upper limit and so be ruled out.

FIG. 35, showing device 2" is a block diagram of device 2, the device to extract the specified pattern. As can be seen in the drawing, the position coordinates of the positioning marks output by detection device 1" on the first scan are stored in coordinate memory 27. The data stored in memory 27 are sent to control CPU 38, which determines whether each set of position coordinates is in a given relationship to the others. If this is the case, i.e., if the real positioning marks have been found, it obtains (the coordinates of) a region to be extracted, based on these position coordinates.

Figure 36:
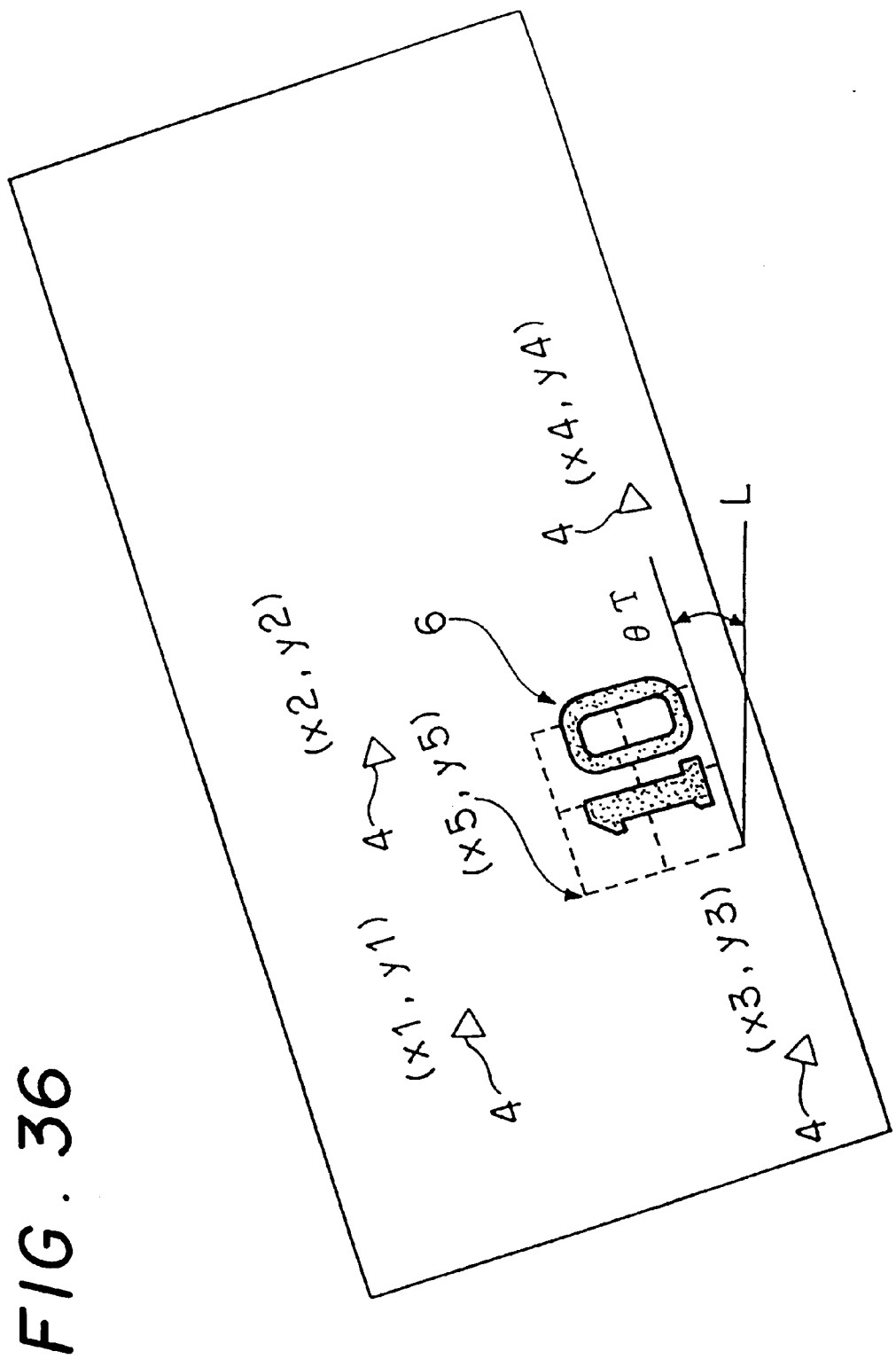
FIG. 36 illustrates the operation of the device to extract the specified pattern.

More specifically, as can be seen in FIG. 36, we use a reference line L, which is horizontal with respect to the glass of the copy machine, to obtain from the coordinates of the four positioning marks $(x_1, y_1), (x_2, y_2), (x_3, y_3)$ and $(x_4, y_4)$ the slope $\theta T$ of specified pattern 6, which is found in a given location relative to these marks, and the reference coordinates $(x_5, y_5)$ of the region to be extracted (here shown by dotted lines). The relevant processing is performed by control CPU 38, and the data concerning the extraction of the specified pattern are stored temporarily. Since the size of the region to be extracted (as well as its shape) is already known, determining the said reference coordinates and slope (which are temporarily stored) allows us to specify quite precisely the region to be extracted.

Device 2", the device to extract the specified pattern, is sent the original, non-binary RGB data (the dark-light data) by detection device 1". These image data are converted to binary data by conversion unit 39, and the resulting binary data are stored in memory 65. The threshold for the conversion to binary is not the same one used in the aforesaid binary processing unit 23 of detection device 1". This allows the positioning marks and the specified pattern, which is composed of various common colors, to be converted to binary values using optimal criteria for each.

Figure 37:
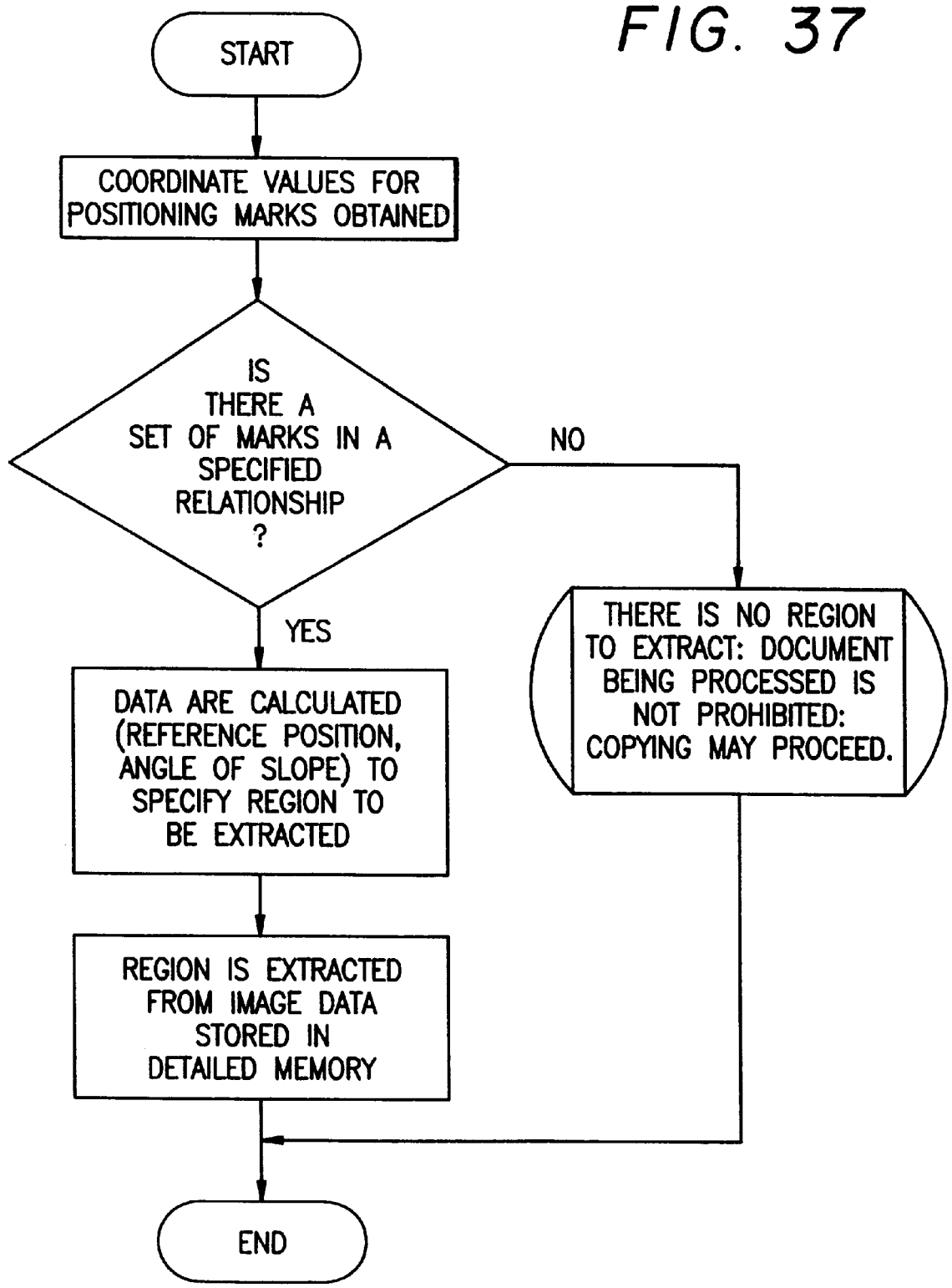
FIG. 37 is a flowchart of the functions performed by the control CPU which constitutes one portion of the device to extract the specified pattern.

In response to a control signal from CPU 38, the region designated by the said reference coordinates $(x_5, y_5)$ and the angle ET of the slope which are obtained (and shown by the dotted line in the figure) is extracted from the binary image data stored in memory 65. CPU 38 performs the specified characteristic count and sends it to pattern matching device 3". Some of the functions of control CPU 38 are contained in extraction device 2". A flowchart of the functions of participating components is shown in FIG. 37.

We shall now discuss pattern matching device 3". Based on the data stored in program ROM 38a, control CPU 38 specifies which of the image data stored in memory 65 must be read out, and it decides which region of the image data should be matched against the reference pattern. The relevant image data in this region are transmitted from memory 65 to inference unit 31 in response to a control signal from CPU 38. Inferences are processed using the fuzzy knowledge, which includes the rules and membership functions stored in memories 32 and 33. A judgment is then rendered as to the degree of resemblance between the received image data and the previously established specified pattern to be detected (See FIG. 12).

Figure 38A:
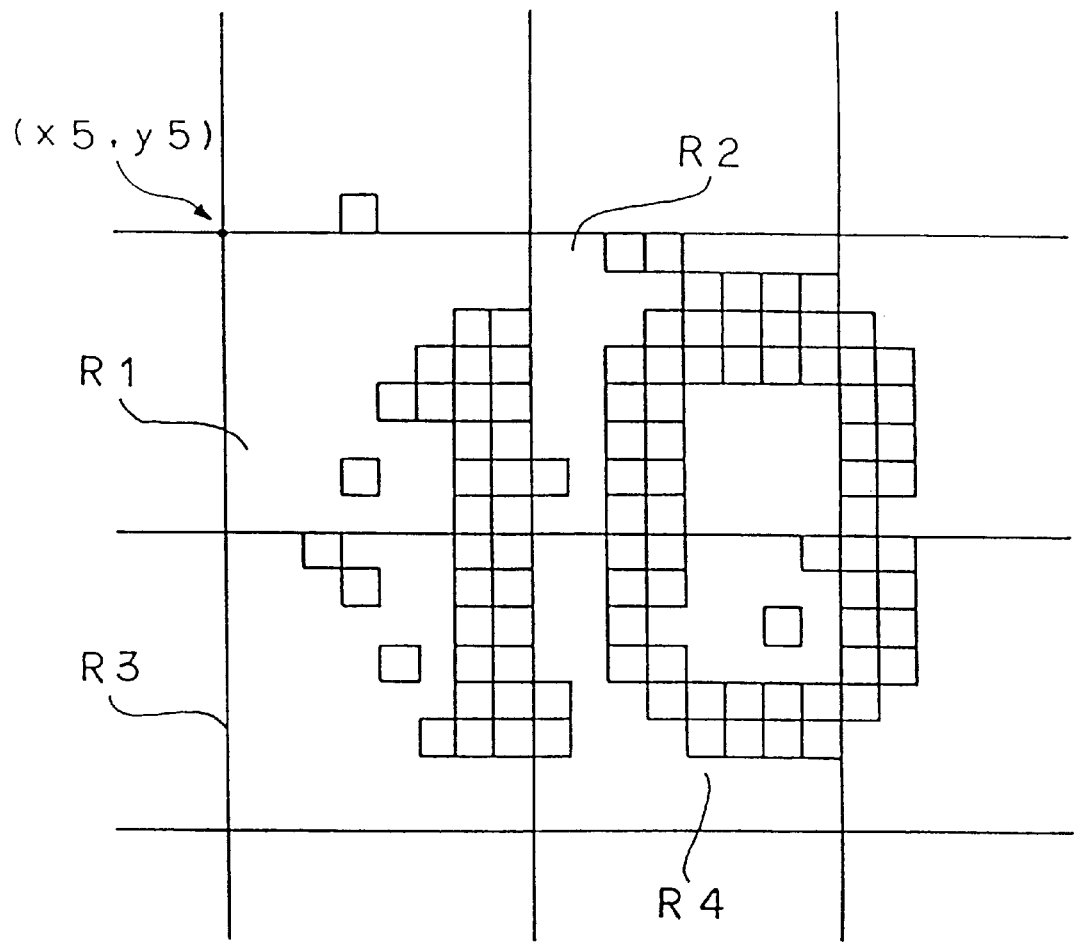
FIGS. 38(A)–38(B) illustrate the operation of the device to match the specified pattern against a reference pattern.
Figure 38B:
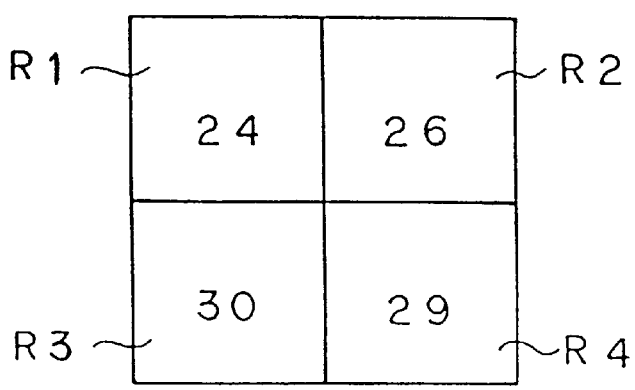
Figure 39A:
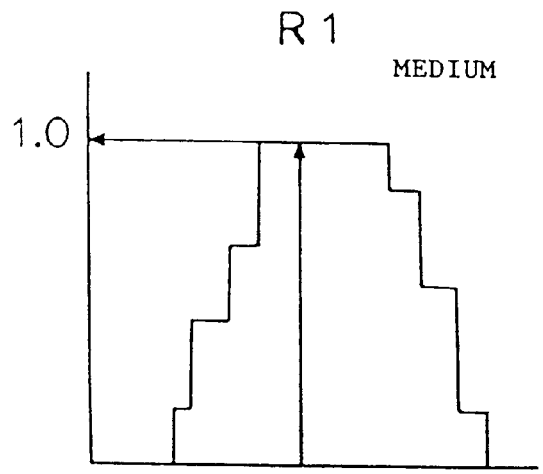
FIGS. 39(A)–39(D) show examples of the rules and membership functions stored in the rule memory and MF memory in the device to match the specified pattern against a reference pattern.
Figure 39B:
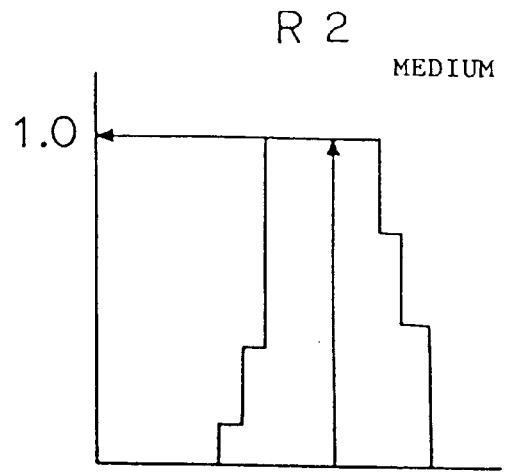
Figure 39C:
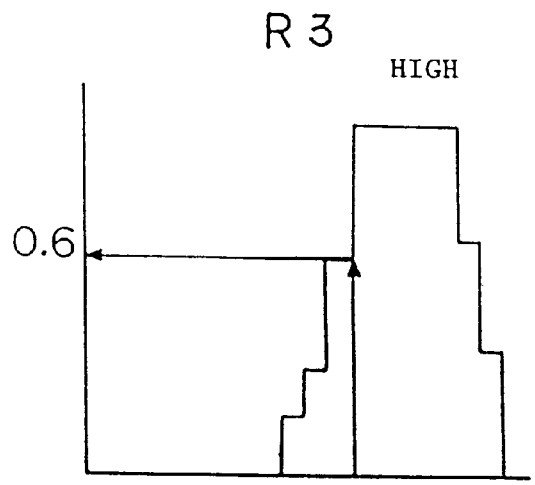
Figure 39D:
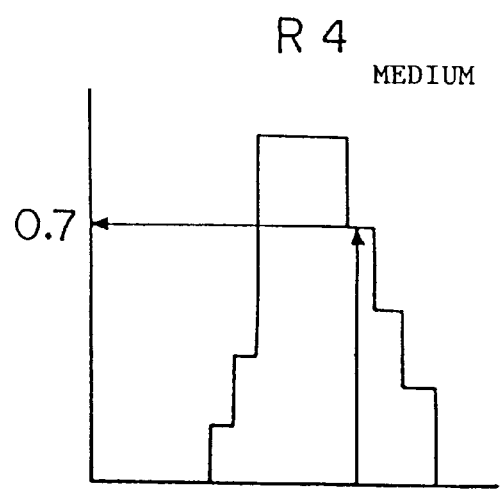

A specific example is given in FIG. 38. The number of dark pixels in each characteristic space in the image data which is extracted (in this example there are four) is counted to obtain a characteristic count. In this way we obtain a count of 24 pixels in space $R_1$, 26 in space $R_2$, 30 in space $R_3$ and 29 in space $R_4$. This count is performed by control CPU 38.

A fuzzy inference is performed using the characteristic count which was obtained, according to previously established rules and membership functions (see FIG. 39). The goodness of fit (i.e., the degree of resemblance) of the extracted image with respect to a reference pattern is determined and outputted. In this example, the goodness of fit is 0.6. Since this is greater than 0.5, which is the reference value for judgments, it is concluded that the image is identical to the reference pattern.

In this example the image is divided into spaces for the characteristic count by means of a lattice; however, the image could also be divided into concentric circles, rectangles, or any other desired shape. The characteristic count need not be limited to the number of dark pixels. It would be equally acceptable to count the number of connected or disconnected pixels, pixels arranged in a certain orientation, or some other feature.

As indicated above, the goodness of fit is obtained as a result of an inference based on a number of items of fuzzy knowledge. This goodness of fit is output to a PPC (the copy machine) by way of control CPU 38. If the goodness of fit exceeds a given threshold value, the copy machine will conclude that it is something which may not be copied, such as a bank note, and it will execute its specified processing to prevent counterfeiting (prohibiting the copying operation, outputting a totally black screen, etc.). The determination of whether this item is a prohibited document such as a bank note (i.e., whether it matches the specified pattern) could also be made by CPU 38, which would then output the result (a stop signal or the like).

As in the first embodiment, FIGS. 26 and 27 show an example in which the aforesaid device 57 is built into a copy machine. In this example discussed above, the positioning marks are detected on the first scan and the pattern is extracted and its degree of resemblance to the reference pattern calculated on the second scan. However, there is no inherent reason why the order of processing could not be changed, as there is no need to perform this processing on the first and second scan. Each process can be executed on whatever scan the user finds most convenient. If there are many kinds of documents which must be detected, a given specified pattern could be detected on the first and second scans and a different specified pattern could be detected on the third and fourth scans.

Similarly, the specified pattern need not be detected on the second scan. Particularly when the positioning marks are quite close to the specified pattern, they could be stored in a buffer memory (which would allow a smaller memory to be used). Then after the marks are detected on the first scan, the location of the pattern could be determined and the extraction processing executed.

In the example we have been discussing, both the positioning marks and the dummy marks are triangles which can be distinguished from each other by the fact that their sides are not of equal length. However, the invention is not limited to this case only. A variety of shapes would be equally acceptable. To give some examples, we could also use for the real marks and the dummies a combination of parallelograms with different slopes; isosceles triangles with different base angles; scalene triangles of the same height but having different slopes; or various polygons with different angles. In addition to varying the angles of the figures in this way, it would also be possible, as is done in the example, to vary the dimensions of the figures in an appropriate manner.

Figures 40A, 40B, 40C:
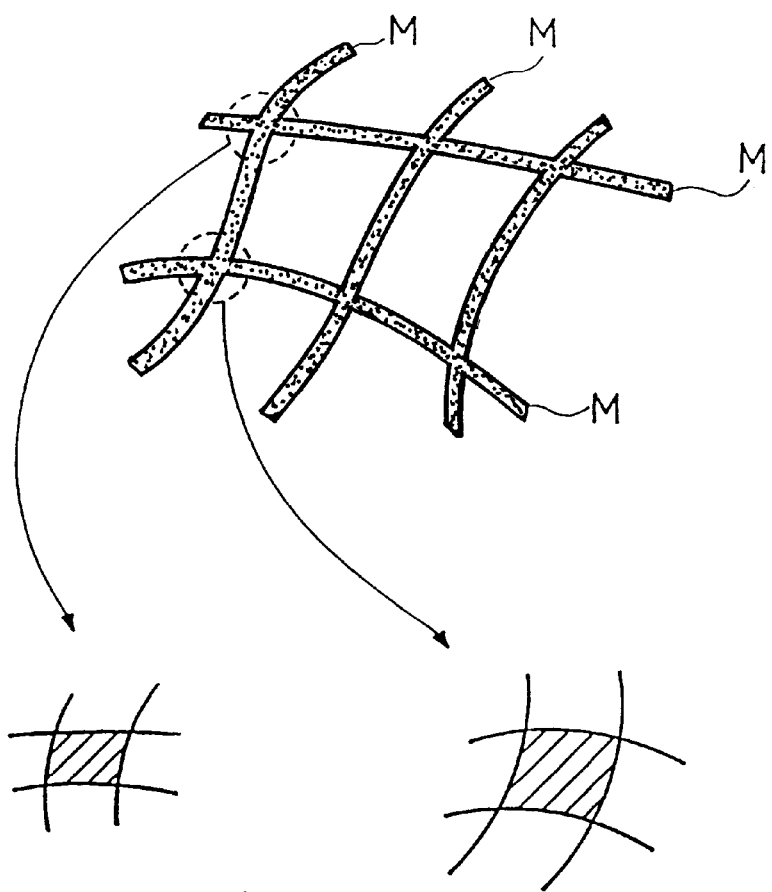
FIGS. 40(A)–40(C) show an example of a binary converter circuit used to detect positioning marks when the positioning marks and the dummy marks are distinguished by having different colors.

Another scheme to produce marks and dummies would be to use a number of intersecting wavy lines M of a given thickness to form different shapes (See FIG. 40). The positioning marks could then be distinguished by the differences in the shapes of the intersections. As can be seen in the blow-ups in FIG. 40(B) and (C), differences in the shape of the line cause the shape of the intersection (shown by hatching) to vary. We could, then, use these intersecting lines as positioning marks and detect an intersection of a given shape. With such a scheme, an uninformed person would be very likely to see the lines as simply a background pattern, which would optimally minimize the probability of tampering.

Dummy marks need not be used at all. To identify unmistakably the location of the specified pattern, the positioning marks should ideally be placed on the apices of an isosceles triangle or an asymmetrical polygon (which may be a triangle or a rectangle). However, they could also be placed on the apices of, for example, an equilateral triangle, a square, or some other regular polygon. In this case, we might choose as a specified pattern for the center of a regular polygon a symmetrical shape composed of lines lacking directionality in either the vertical or the horizontal plane. This would ensure that the pattern could be located unmistakably on the first scan.

In all of the examples discussed thus far, four positioning marks have been detected; however, three or five or more marks could also be used at the user's discretion. If the shape of the marks is given a distinguishing feature (say, directionality), it would be possible to use only one or two marks. Although in these examples the positioning marks are all identical, the invention is not limited to this case. It would be equally possible to select positioning marks which are different from or similar to each other. In this case, the decoder circuits corresponding to the various marks would be connected in parallel to the outputs of the flip-flop groups. Then when a mark is detected, its relative position vis-a-vis the other marks can by checked (the second step of the processing in FIG. 37) before the control CPU determines the coordinates for extraction. Not only the spatial relationship of each mark with the others, but also the relationship between type of mark and position can be checked.

Figure 41:
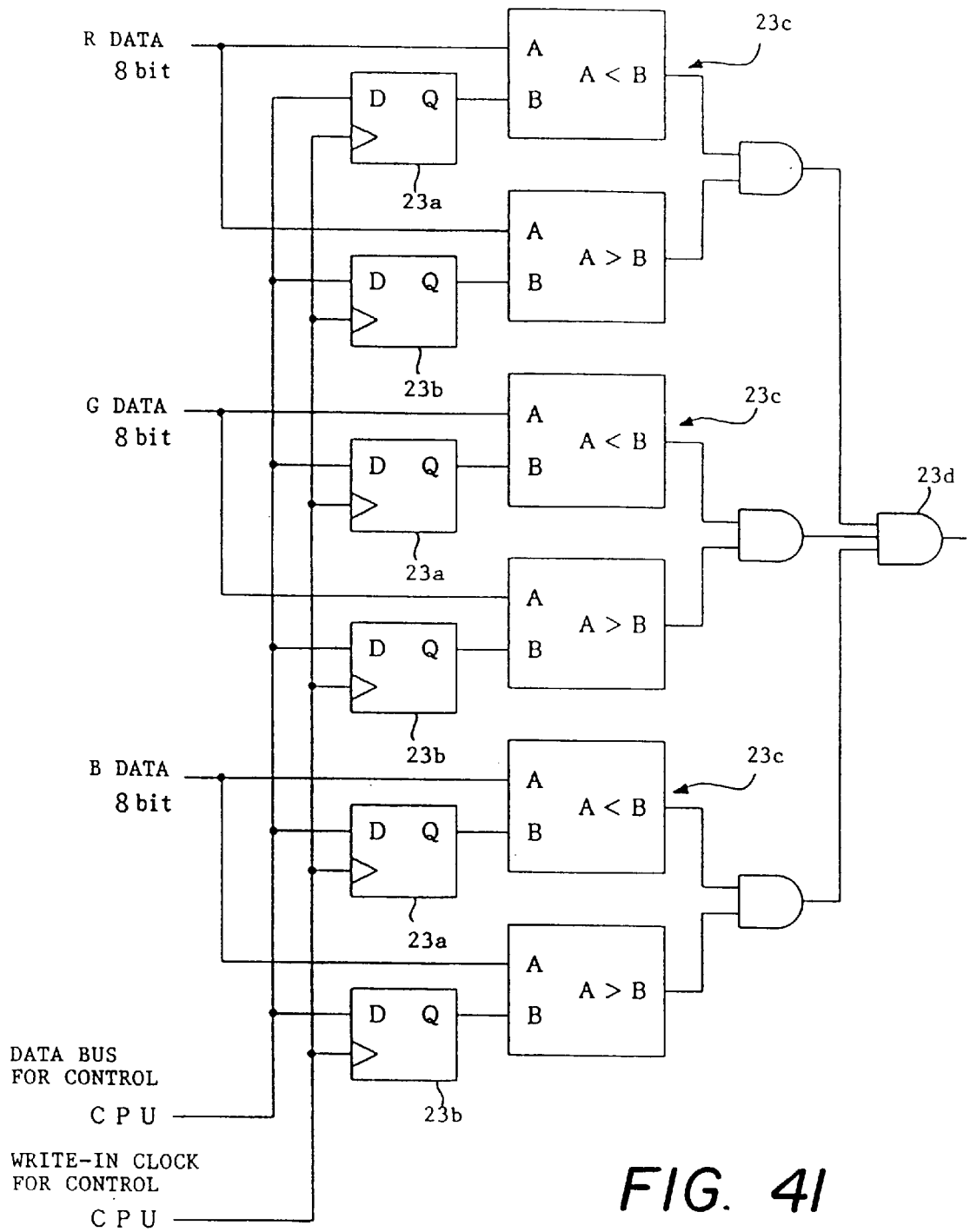
FIG. 41 shows another example of positioning marks and dummy marks.

Instead of varying their shapes, the real and dummy marks may also be distinguished from each other by varying their respective colors. In this case, we might, for example, use the binary circuit shown in FIG. 41 for binary processing unit 23 in detection device 1". In this circuit, threshold values for upper and lower limits are set for each of R, G and B by value setting units 23*a* and 23*b*. The RGB data which are received are input to window comparators 23*c*, which compare them with each threshold value. In this way pixels of a given density (or tone) can be extracted. If and only if a pixel of the desired color is obtained, the output of AND element 23*d*, which receives the last three inputs, will be "1".

As we mentioned earlier, the specified pattern could be a portion of the document which has a high characteristic count (in this case, too, the pattern can be located accurately and simply by detecting positioning marks); or it could be added separately to the document, just as the positioning marks are.

When a characteristic image is selected as the specified pattern, the image processing device must be given knowledge concerning this pattern. Then should any new document be issued which may not be copied, the same pattern can simply be imprinted on it, and it too will be detected. Because the specified pattern is the only item which needs to be detected, the invention can be applied to a wide variety of documents which may not be copied, and the processing can be performed at high speed.

Figure 42:
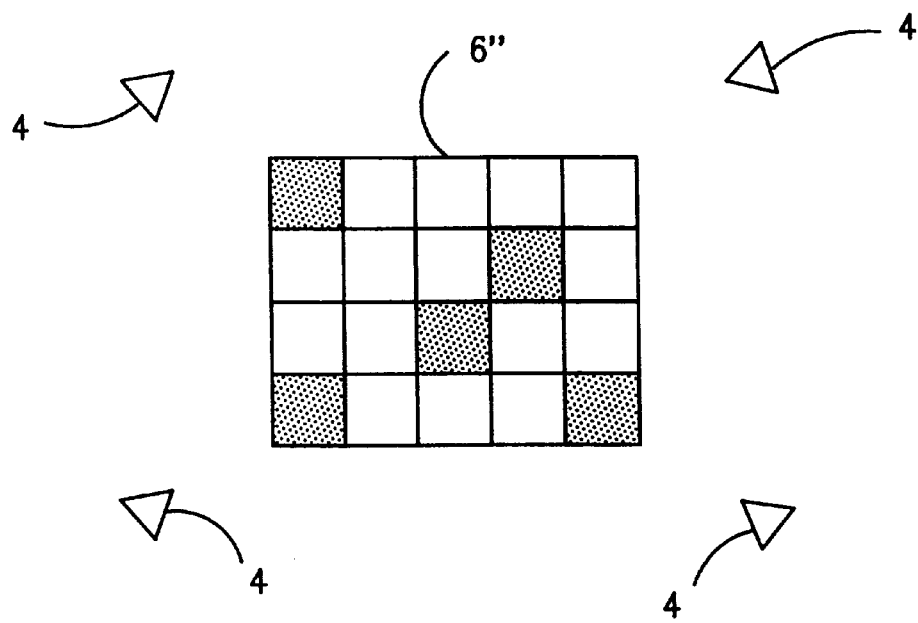
FIG. 42 shows another example of a specified pattern.

In the example discussed above, the judgment processing performed by pattern matching device 3" consisted of obtaining the degree of resemblance of an extracted pattern to a previously established reference pattern (i.e., the specified pattern). Other possible schemes include the one pictured in FIG. 42. Specified pattern 6" is composed of binary data expressed as black or white pixels in the extracted region determined by positioning marks 4. The pattern matching device obtains a value of 1 or 0 from the density of each cell constituting pattern 6". They are then decoded as a string of 1s and 0s in a specified order (in the example shown, the string is "0100000010 . . . "). It can then be determined whether the decoded values correspond to the data representing the reference code for the specified pattern, and, by the same token, whether this is in fact the specified pattern.

Figure 43:
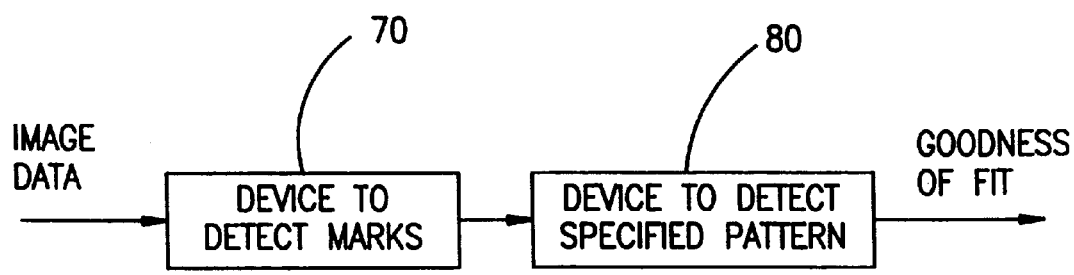
FIG. 43 shows the overall configuration of another ideal example of the image processing device of this invention.

FIG. 43 shows second ideal example of the image processing device of this invention. This example differs from the previous one in that the specified pattern in the image is detected directly from the image data which are received (without determining coordinate values by detecting positioning marks).

Figure 44:
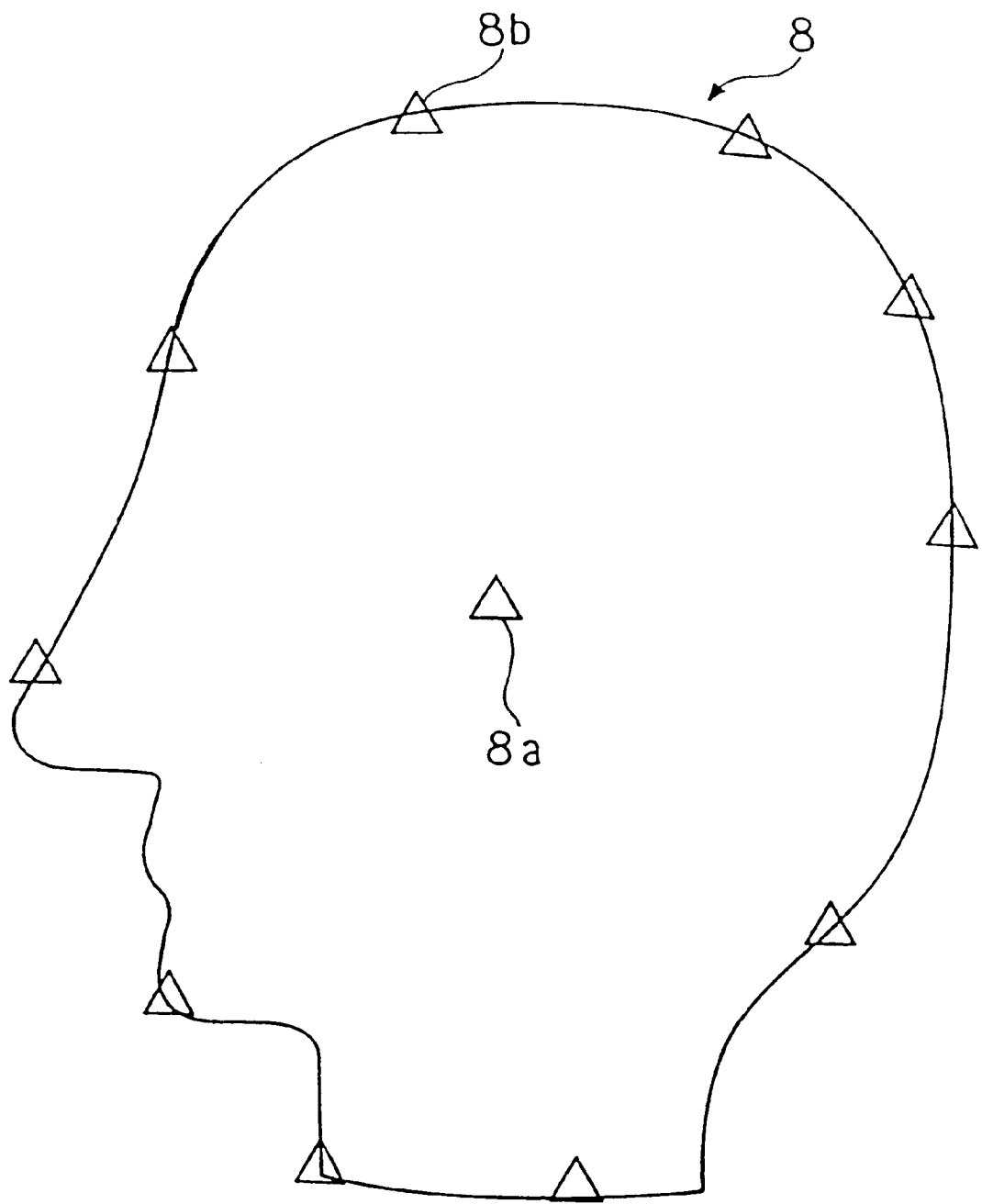
FIG. 44 shows an example of a specified pattern used in this second embodiment.

In this example, as shown in FIG. 44, specified pattern 8 consists of a number of marks 8a and 8b, which are triangles of identical shape, arranged in a specific relationship. More specifically, a given number of marks 8 (in this case, ten) are arranged in a shape (here the outline of a face in profile) with a single mark 8a in its center. Since in this example any pattern with the same number of marks 8 on its periphery constitutes the specified pattern, the actual placement of each mark 8 on the outline is arbitrary. Thus the placement shown is not the only one possible. As long as there are ten marks on the outline of the shape, it will be identified as the specified pattern.

The marks 8a and 8b constituting the specified pattern 8 used in this example are identical to the positioning marks 4 in the first example discussed earlier, and their shapes have the same characteristics.

One effect of the marks 4 discussed with respect to the first example is that because their coordinate positions can be specified, the marks themselves can be made quite small. This makes it harder for an uninformed person to discern, and there is no drop in the recognition rate. Making the marks smaller will also allow a smaller window to be used for their detection, and it will allow the detection circuit to be simplified and constructed of cheaper components. Smaller marks will also contribute to processing speed. Marks 8a and 8b in this second example achieve the same effects.

In the device pictured in FIG. 43, device 70 detects the said marks 8a and 8b among the image data which it receives and obtains their position coordinates. The coordinates of each mark which is detected are sent to device 80, which performs the next stage of the process, detecting the specified pattern. From the locations of marks 8a and 8b, device 80 determines whether the marks are in a given relationship with each other, like that shown in FIG. 44, and it outputs the goodness of fit.

In the image processing scheme according to this invention which is implemented using this device, the image of the document is read on the first of a number of scans and sent to detection device 70. This device makes a search for the aforesaid marks 8a and 8b. When it finds a mark, it obtains and stores the position coordinates of that mark.

When at least the data corresponding to the widest part of the outline of the shape have been read (the judgment processing (i.e., the processing to detect the specified pattern) can of course also be begun when all the image data have been read), detection device 80 is operated. From the position data for the marks which have been detected, this device checks whether the marks are in a given relationship in the image which is read, and in this way detects the specified pattern.

More specifically, a window of a specific size (N x N) is established. Using the position coordinates of the marks, each mass which is a part of the window is checked for a mark. Masses on the outline of the given shape are checked for a given number of marks (in FIG. 44, ten). If the requisite number is found, a determination is made that this is the specified pattern.

In view of the possibility of printing misregisters, smudges, or tampering, it is advisable to establish a fixed margin for the determination. That is, one would establish a zone of a fixed width on either side of the outline of the shape. Any mark found in this zone would be recognized as a component of the specified pattern. A given weighting can be used for the marks, so that a lower weight is assigned as the distance from the outline increases. This will increase the accuracy of detection by minimizing the number of marks overlooked or detected by mistake. It is also advisable to provide a margin with respect to the aforesaid number of marks (here, ten). Then even if a mark is not recognized because it has faded over time or a part of it is missing due to a detection error, the pattern will still be detected correctly.

In this example, then, the marks constituting the specified pattern on the document are detected and a determination is made, on the basis of the position coordinates of the marks, as to whether this is in fact the specified pattern. This being the case, all the data needed for a determination can be acquired on a single scan. The only check that is performed is the one to determine whether the position coordinates of the marks are in a given relationship (at a given distance) with respect to each other, so the processing can be performed at high speed.

It is not necessary that a window, as described above, be used to detect the specified pattern. If the processing are executed via software, we could assume that a given mark is central mark 8a, then detect all the marks at a given distance from that mark (within a fixed margin, if desired) to obtain the applicable number of marks. If this number falls within a fixed range, we determine that the specified pattern has been found.

We shall now explain the actual configuration of devices 70 and 80 in the image processing device in FIG. 43, the second ideal example in which the said image processing scheme may be implemented. We shall first discuss device 70, the device to detect the marks. The shape and other features of the marks 8a and 8b used in this example are identical to those of marks 4 in the example. Device 70 can thus be configured much as device 1, the device to detect the positioning marks in the example.

Figure 45:
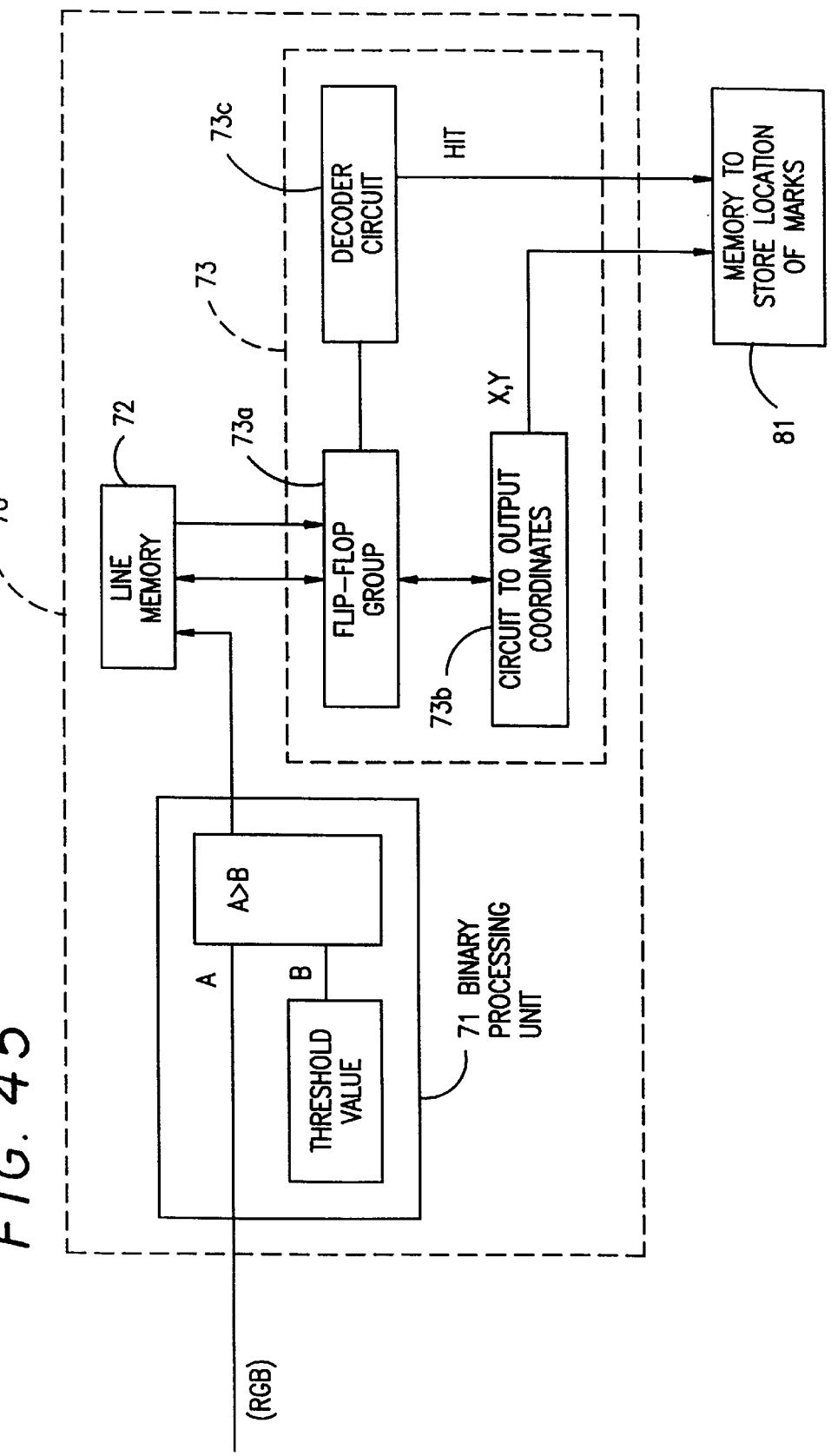
FIG. 45 is a block diagram of the internal structure of the device to detect the marks.

As can be seen in FIG. 45, the image data which are received (i.e., tonal or light-dark data corresponding to RGB data) are converted into binary data at a given threshold value by binary processing unit 71. The newly converted binary image is stored temporarily in multiple line memory 72. By setting an appropriate threshold for the conversion to binary, we can produce an image in which, for example, a pixel where a mark 8a or 8b is found is appears black while the surrounding area (the background) is totally white.

The output of the said binary processing unit 71 is sent to search unit 73 by way of line memory 72. Search unit 73 uses a mask of dimensions n×m (where n and m may have the same value or different values) to search the image data which it has received (after it is converted to binary data) for marks 8a and 8b, small circles of a given diameter. A detailed explanation is given below.

Search unit 73, shown in FIG. 45, is composed of flip-flop group 73a; circuit 73b, which receives the output from flip-flop group 73a, obtains the coordinates of the hit points (representative points in each cell (or pixel) constituting the mask, in this example, the center coordinates) which indicate the positions of marks 8a and 8b; and decoder circuit 73c, which checks the mask for marks 8a and 8b. The outputs of coordinate detection circuit 73b and decoder circuit 73c are connected to memory 81, the memory to store the locations of marks, in detection device 80. When the output hit in decoder 73c goes high (indicating the presence of a mark), the (X, Y) coordinates output by circuit 73b are stored in location memory 81.

The basic configuration of the said flip-flop group 73a, as shown in FIG. 32, is an area of 3 pixels of scanning×3 pixels of feed, or 9 (3×3) flip-flops FF. In practice, the size of marks 8a and 8b and the number of marks used are selected as appropriate. If marks 8a and 8b are like that shown in FIG. 34(A), it would be appropriate to use a 10×10 flip-flip group. The decoder circuit corresponding to these flip-flops could be composed of a one hundred-input AND element (or an equivalent combination of AND elements). If the marks are of the size shown in FIG. 34(B), an 8×8 flip-flop group would be preferable. A suitable decoder circuit for these flip-flops would be composed of a 64-input AND element (or combination of AND elements).

Image data stored in line memory 72 are supplied sequentially at a specified timing to a given flip-flop in flip-flop group 73. Since the relevant operation is identical to that of flip-flop group 26a, we shall omit further discussion.

The output of every flip-flop in the flip-flop group is input to decoder circuit 73c. Decoder circuit 73c is based on the AND element shown in FIG. 33. The circuit has as many inputs as there are flip-flops. With reference to FIG. 34, the pixels which are to become black are input just as they are; those that are to become white have inverted input. Once this is done, the output of an AND element will go high only when a circle of a given radius r is found. If an output hit of decoder circuit 73c goes high, this indicates that marks 8a and 8b, which constitute the specified pattern, have been found centered around the central flip-flop. To allow for misregisters, printing irregularities and blurring resulting from long use, it is advisable that the output of each pixel not be connected directly to the input of an AND element, but rather, several neighboring pixels (two works well) be connected to the input of a single AND element. With this scheme, marks 8a and 8b will always be detected reliably, because "high" will be input to the AND element even when one pixel is not functioning.

Circuit 73b is connected to the addresses in multiple line memory 72. It outputs to flip-flop group 73a the addresses of images which must be input, and it outputs to the coordinates (XY) of the pixels output by the central flip-flop in group 73a.

Figures 46A, 46B:
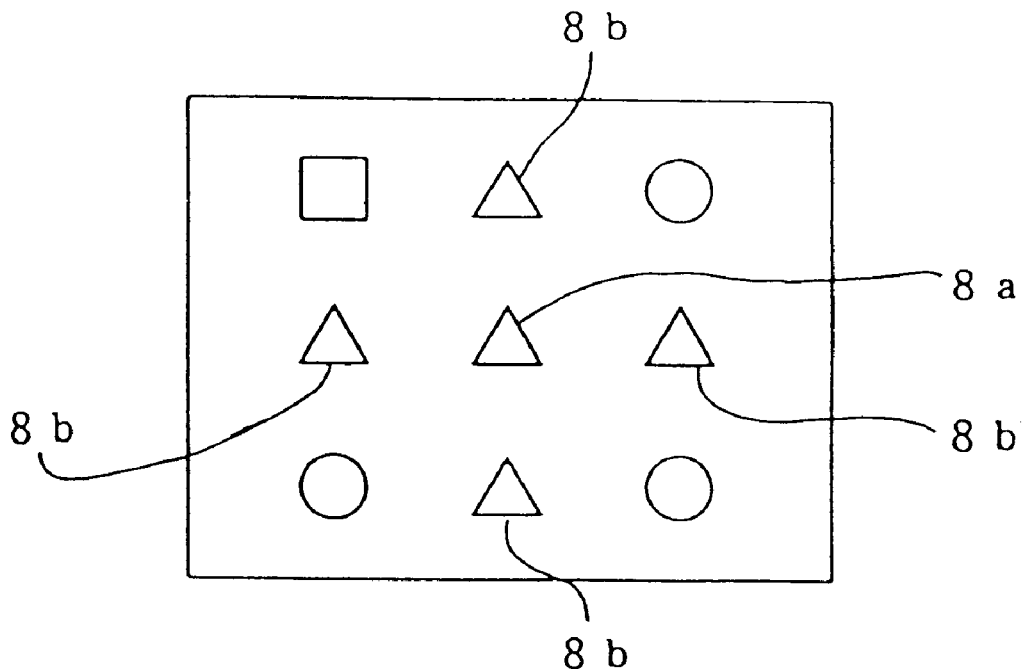
FIGS. 46(A)–46(B) illustrates the operation of the device to detect the marks.

Let us assume that this scheme is being used and image data corresponding to FIG. 46(A) is received. Marks 8a and 8b will be detected by search unit 73, and their coordinate values will be stored in location memory 81. For the circles and squares, however, the output of decoder circuit 73 will go low; so their coordinate values will not be stored in memory 81. FIG. 46(A) shows how the locations of marks 8a and 8b, which constitute the specified pattern, are stored in location memory 81 as "1". The said circles and squares, then, can be used as a dummy pattern. Since triangles of a different size will not be detected either, they too can function as a dummy pattern. If such a dummy pattern is arranged in an appropriate fashion along the outline of the given shape or along some other outline, it will be more difficult for an uninformed person to determine the locations of the marks constituting the specified pattern. This will greatly reduce the probability of tampering.

Figure 47:
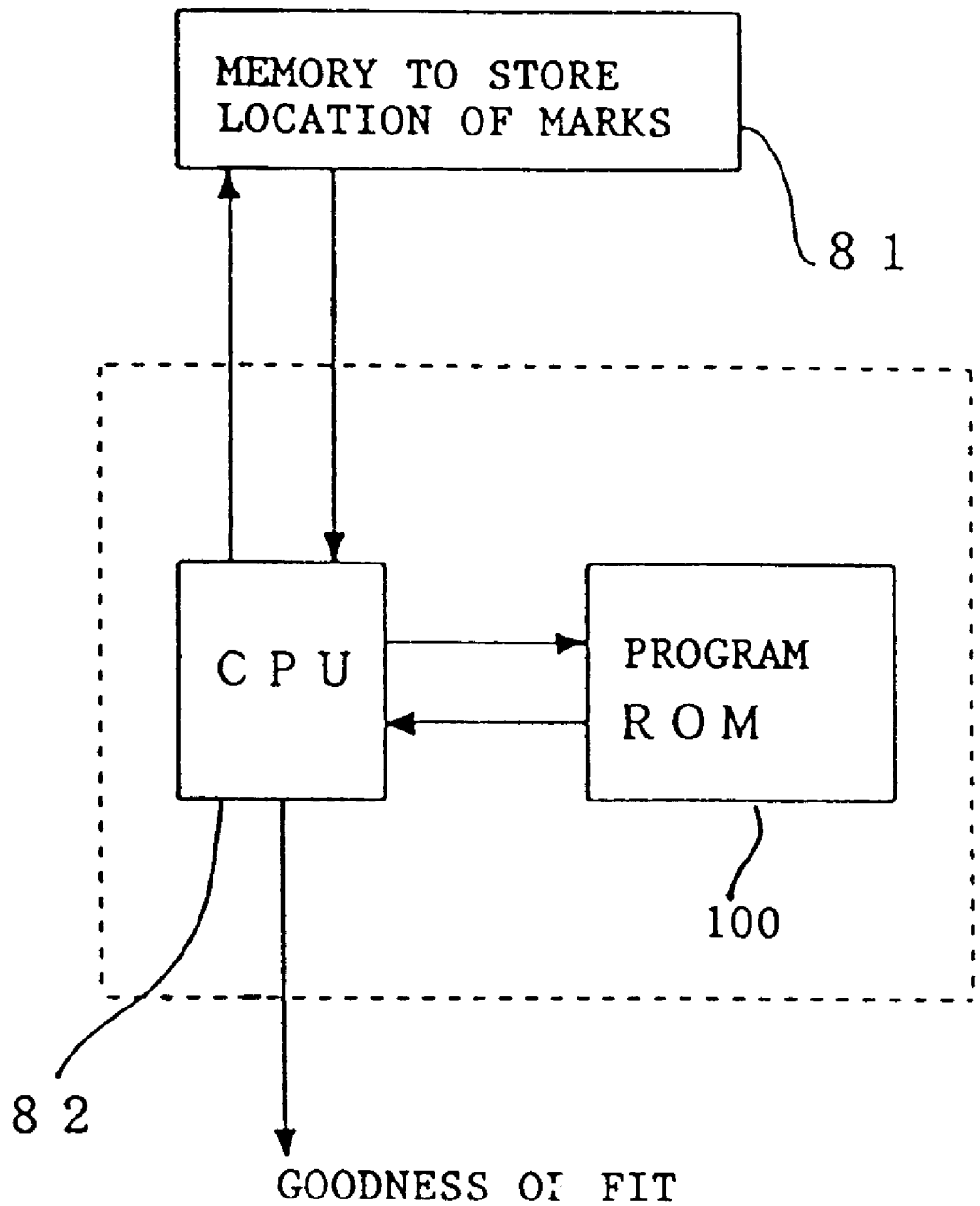
FIG. 47 is a block diagram of the internal structure of the device to detect the specified pattern.

We shall now discuss device 80, the device which detects the specified pattern as shown in FIG. 47. Detection device 80 consists of the aforesaid memory 81, which stores the location of the marks, and device (here, CPU) 82, which, on the basis of the data stored in memory 81, determines whether marks 8a and 8b, detected in the previous stage of processing, constitute the specified pattern. In response to a control signal from the program ROM 100, CPU 82 executes the processing shown in FIG. 48.

In this example the determination processing employs a 15×15 window as shown in FIG. 49. A determination as to whether the specified pattern has been found is made from the location of the marks in this window. Each mass in the window corresponds in size to a single mark. In this example, to cope with printing misregisters, detection errors and the like, a mass at a given distance from central mass C (a distance which corresponds to the outline of a given shape) is given a coefficient (or a weight) of 1; a mass one unit removed from this location is given a coefficient of 0.8, and a mass two units removed is given a coefficient of 0.5.

CPU 82 reads out the data stored in location memory 81 and checks the masses in the window which correspond to the postion coordinates of the marks. In this way every mass is checked for a mark. However, it is first determined whether there is a mark in central mass C (ST 1). If there is not, the specified pattern (whose center corresponds to the center of the window) cannot be in this window, so we shift the window in the direction of scanning (ST 8).

If there is a mark in the central mass C in the window, the marks in masses with coefficient 1, meaning that if there is a specified pattern, they are on its outline, are counted; the marks in masses with coefficient 0.8, meaning that they are one mass to the side, are counted; and the marks in masses with coefficient 0.5, which are two masses to the side, are counted (ST 2 through ST 4).

A total is obtained for all the marks counted as described above which have coefficients between 1.0 and 0.5, and it is determined whether this total falls in a given range (ST 5). If we assume, for example, that the specified pattern has ten marks along its outline, like that shown in FIG. 44, we can obtain this range by adding and subtracting a fixed margin (the same value or different values may be used) to 10.

If, in the determination in Step 5, the value falls outside the given range, it is concluded that the specified pattern has not been found, and we jump to Step 8, move the window over, and proceed with the determination with respect to the next image. If the value does fall in the given range, the average value (the goodness of fit) of the said coefficients is calculated, and this goodness of fit (or degree of resemblance) is output (ST 6 and 7).

Figure 50:
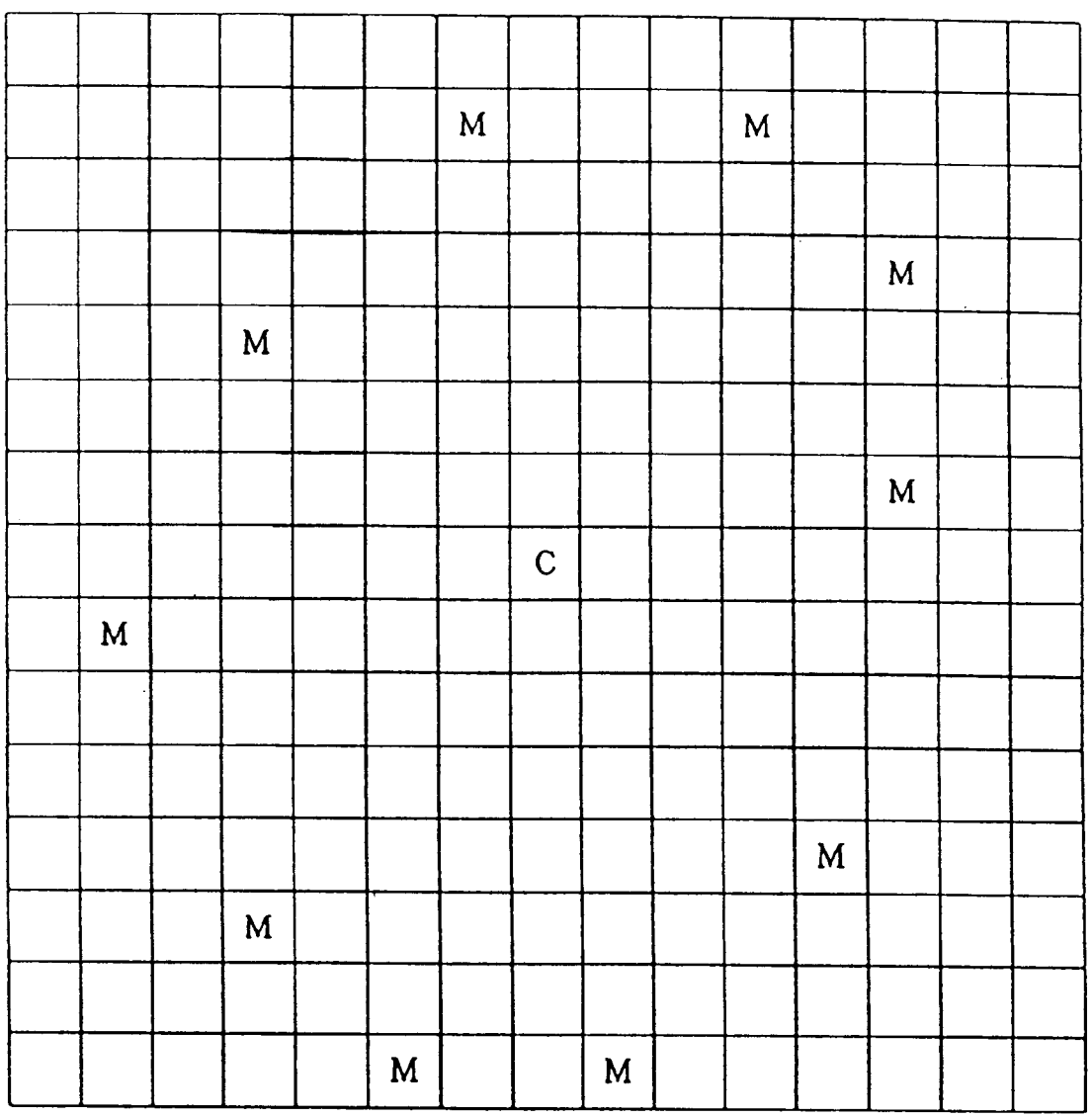
FIG. 50 illustrates the operation of the device to detect the specified pattern.
Figure 51:
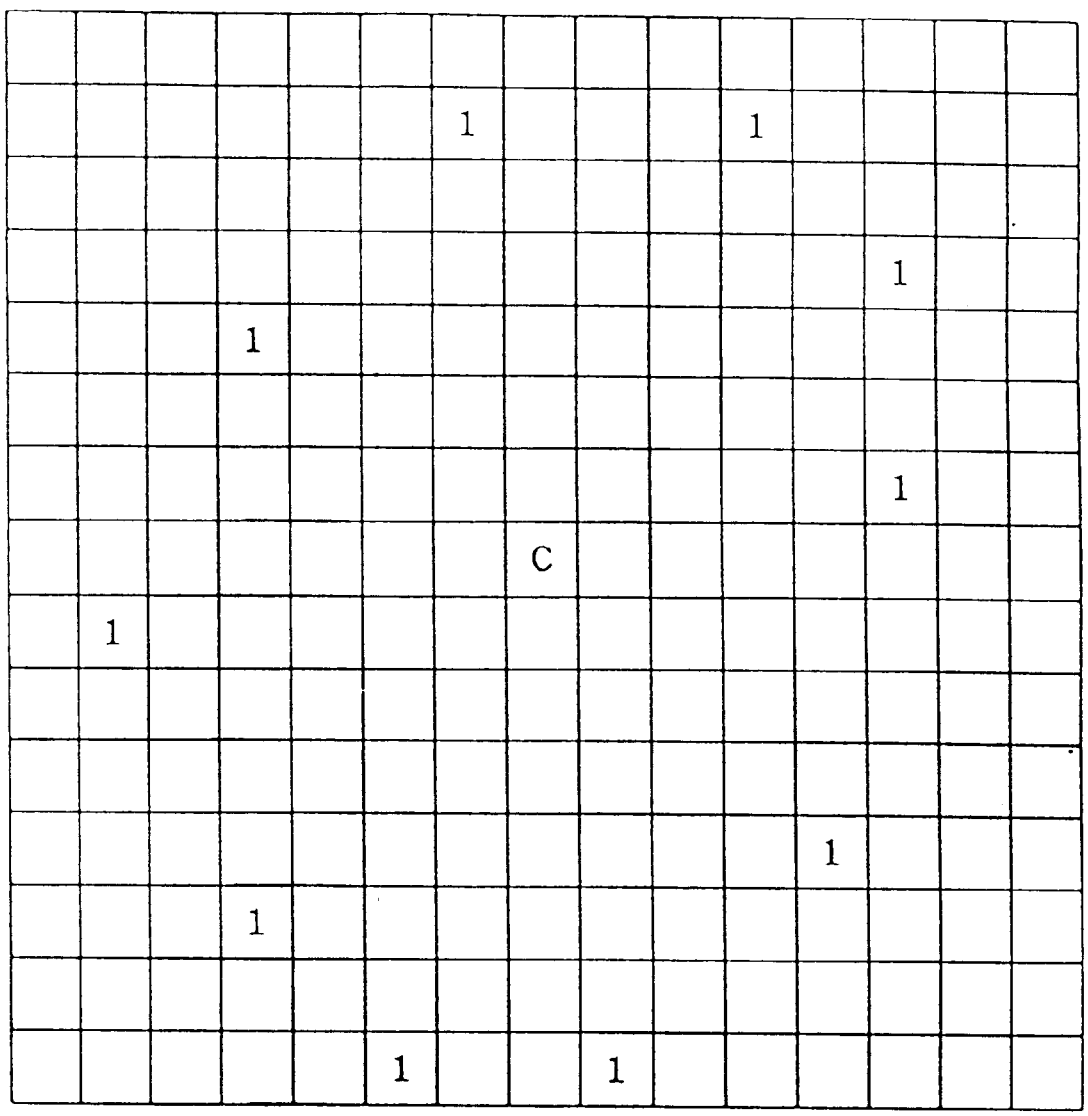
FIG. 51 illustrates the operation of the device to detect the specified pattern.

As an example, let us assume that there is in the image a pattern identical to that shown in FIG. 44. The position coordinates for every mark are stored in location memory 81. If we develop these coordinates in a window, we get the window shown in FIG. 50. Central mark 8a is in the central mass C of the said window, and there are ten marks along the periphery (the positions of the marks are indicated by Ms). Since the coefficient of each mass where there is a mark is 1, the total in Step 2 will be 10, and the total in Steps 3 and 4 will be 0. The grand total will be 10, which is within the given range, so an average value for the coefficients will be obtained. Since in this case every value is 1, the average will also be 1 (indicating a goodness of fit of 1, or 100%). If one of the marks is defaced and becomes illegible, the grand total will be 9. Since this is in the given range, an average value will be calculated for the coefficients. The remaining nine marks all have a coefficient of 1, so the average value will be 1.

Figure 52:
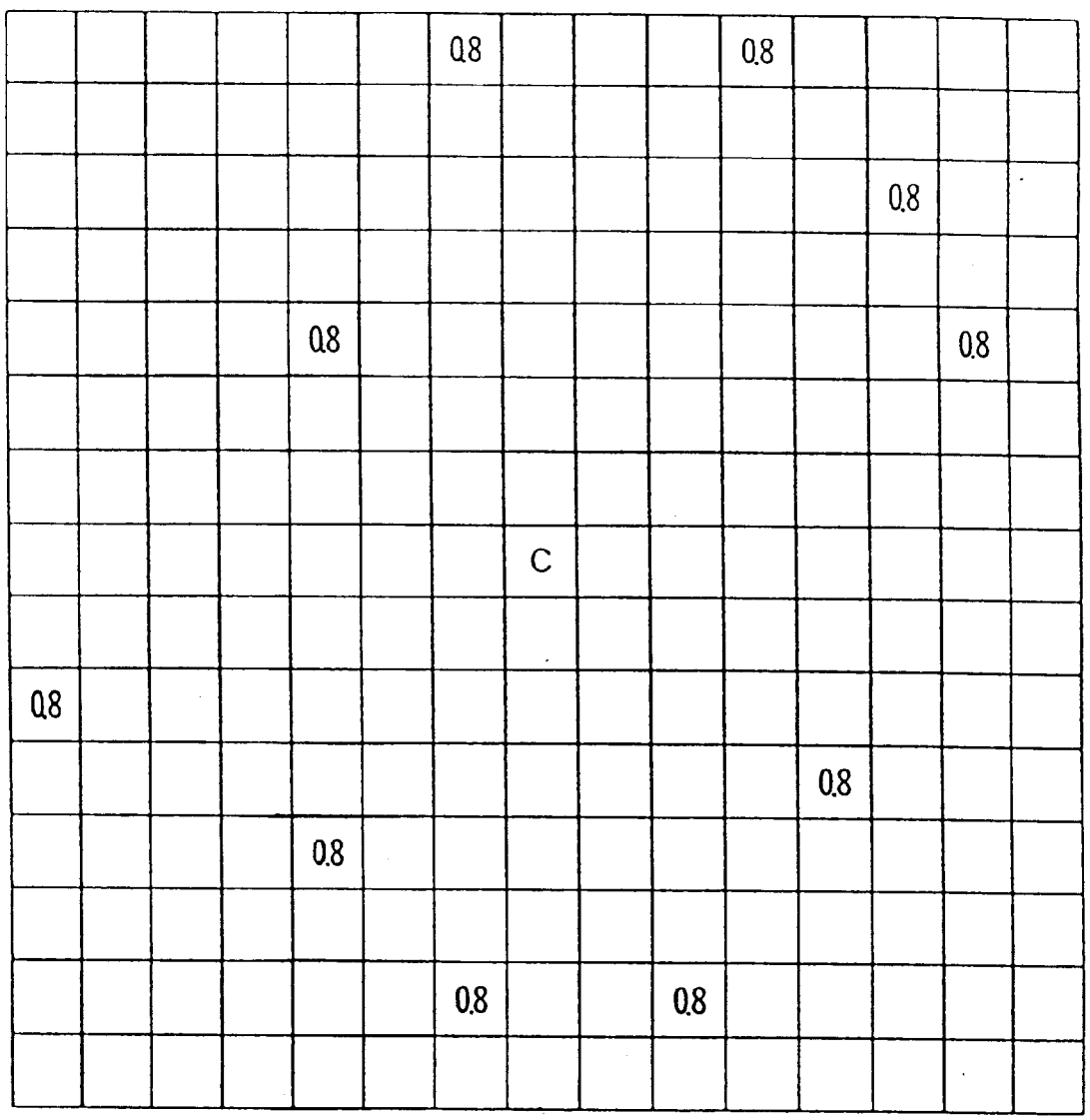
FIG. 52 illustrates the operation of the device to detect the specified pattern.

In FIG. 52, all the marks are in locations with a coefficient of 0.8. Since the total value for marks counted is 10, when we move to the processing to obtain an average value for the coefficients, we find that (0.8×10)/10 yields 0.8.

Only marks with coefficients in the range between 1 and 0.5 will be considered. Marks which are identical to marks $8a$ and $8b$, which constitute the specified pattern, yet which are not in this range (i.e., which have a coefficient of 0) will not be counted and will have no effect on the calculation of goodness of fit. Marks of the same shape as $8a$ and $8b$ found in locations with a coefficient of 0 constitute a dummy pattern. They make it more difficult for an uninformed person to determine which marks constitute the real pattern; and, in effect, they make it harder to tamper with the document.

When the goodness of fit has been output, we move to Step 8 and shift the window by one mass in the direction of scanning. A determination is made as to whether shifting the window in the direction of scanning has caused it to exceed its own endpoint (ST 9). If it has not, we return to Step 1 and check the new window for the specified pattern (i.e., we determine the goodness of fit on the basis of the marks constituting the pattern).

If it is determined in Step 9 that the window has exceeded its own endpoint, we move back to the original position in the direction of scanning, and shift the window in the direction of feed. If the shift does not cause the window to exceed its endpoint in the direction of feed, we return to Step 1 and execute the processing to detect the specified pattern on the newly established window. In this way every region of the document which has been read will be checked.

The goodness of fit output in Step 7 is transmitted to the copy machine or other device just as in the example we discussed. If the goodness of fit exceeds a given value, the copier processing will be suspended. In this example, the marks constituting the specified pattern on the document are detected, and a determination is made as to whether this is the specified pattern based on the position coordinates of these marks. Thus all the data needed for a determination can be acquired on a single scan. With this scheme, the data can be processed at high speed. The pattern is not matched against a reference, so the determination processing (i.e., the calculation of goodness of fit) can also be executed at high speed.

Figure 53:
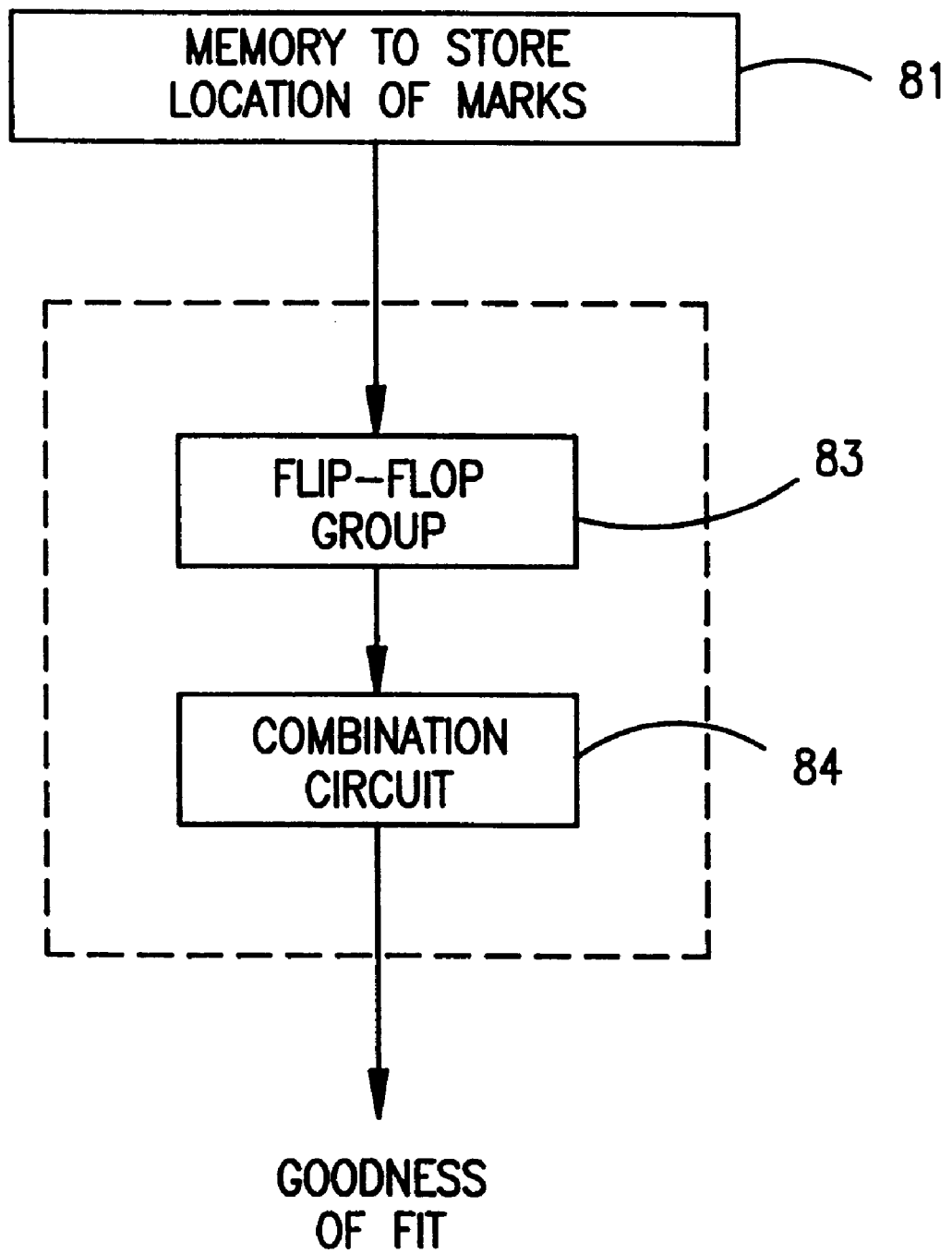
FIG. 53 is a block diagram of the internal structure of the device to detect the specified pattern.

In the examples discussed herein, the processing to detect the specified pattern is executed via software. However, the invention is not confined to this case, and nothing would prevent the processing to be executed by hardware. One example of the circuitry which might be used in this case is shown in FIG. 53.

Flip-flop group 83 consists of 15×15 flip-flops which correspond to the aforesaid window. For each mark stored in location memory 81, the flip-flop for its location is set to "1". If the data are set appropriately by memory 81 in flip-flop group 83, the window can be shifted via Steps 8 through 11 in FIG. 48.

Figure 54:
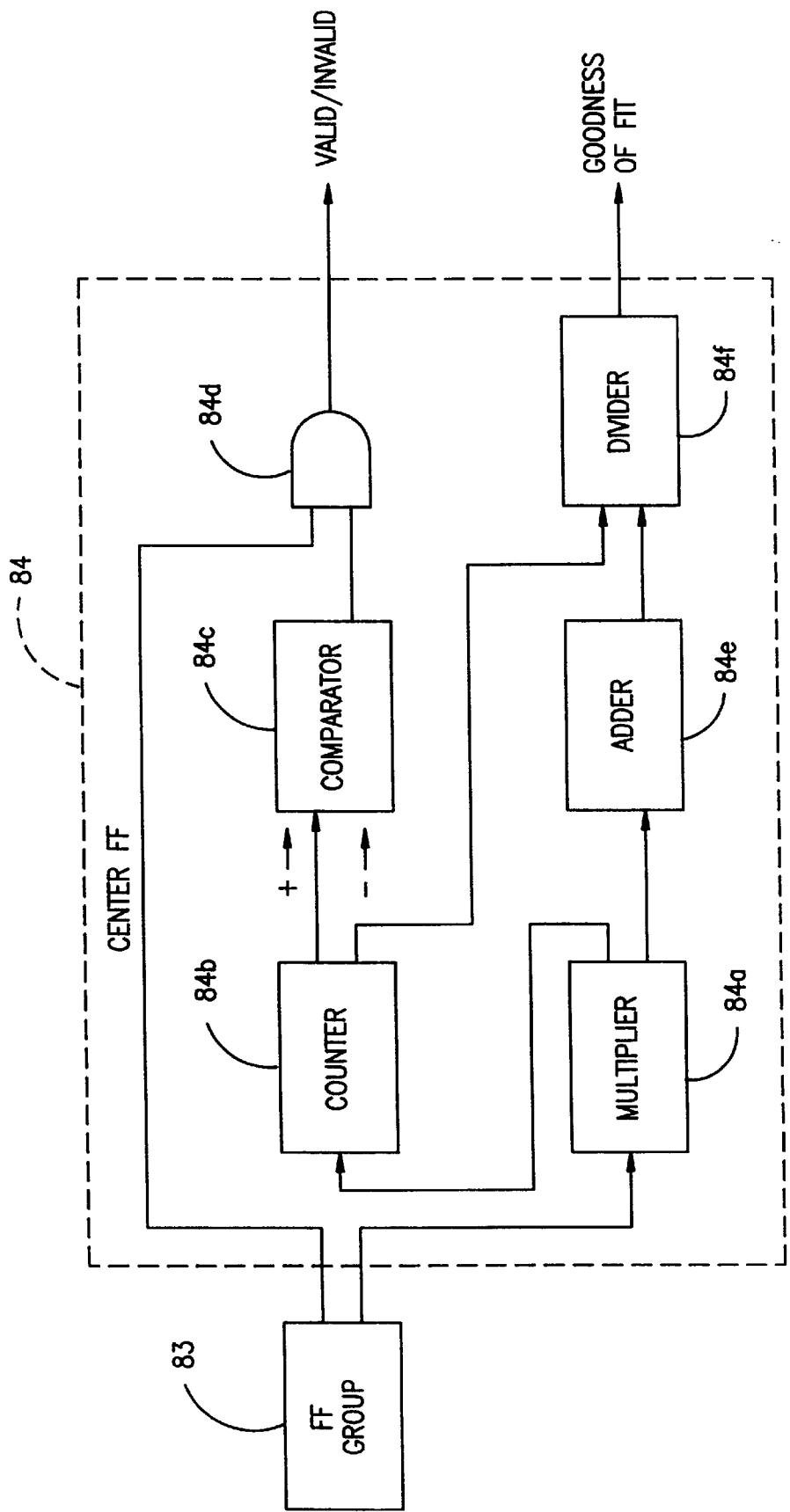
FIG. 54 shows the internal structure of the combination circuit.

The output of flip-flop group 83 (the output of each flip-flop) is sent to combination circuit 84. Circuit 84 multiplies the output of each flip-flop by its respective coefficient in FIG. 49. By obtaining the average value of the result, it produces a value for goodness of fit. An example of how the circuits might be arranged is shown in FIG. 54.

The output of each flip-flop in flip-flop group 83 is sent to multiplier 84a. Multiplier 84a is connected to the output of each flip-flop. It multiplies that output by a given coefficient, which will have one of the values shown in FIG. 49, either "0", "0.5", "0.8", or "1". The output of the central flip-flop will be multiplied by 0.

Each output of multiplier 84a is input to counter 84b, which counts the outputs of multiplier 84a which are not zero (0.5, 0.8, or 1). In this way, if the specified pattern is found in the window composed of flip-flop group 83, the total number of marks 8b on its periphery or within a given distance of it can be obtained (through the processing in Steps 2 through 4 in FIG. 48).

The output of counter 84b is connected to comparator 84c, a window comparator. The upper and lower limit values, which serve as reference values, demarcate a range within which the aforesaid number of marks 8b must fall. If the output of counter 84b, which is the total number of marks 8b, falls within the reference range (i.e., the range between the upper and lower limit values), the output of the comparator will be 1 (H); if it does not, the output will be 0 (L).

The output of comparator 84c is supplied to one of the input terminals of AND element 84d. The output of the central flip-flop in flip-flop group 83 (the flipflop which corresponds to portion C in FIG. 49) is connected to the other input terminal of AND element 84d. If the central flip-flop is set to "1" (meaning that there is a mark 8a in the center) and the output of counter 84b (i.e., the total number of marks) is within the given range, the output of AND element 84d will be 1 (H); in all other cases, it will be 0 (L). AND element 84d processes the determinations in Steps 1 and 5 of the flowchart shown in FIG. 48. An output of 1 from element 84d indicates that the hit is valid (it is possible that the specified pattern has been found); an output of 0 indicates that it is invalid (the specified pattern is not there).

The output of the said multiplier 84a is connected to adder 84e. Each output of multiplier 84a is added and a grand total is obtained. The output of adder 84e is connected to one of the input terminals of divider 84f; the output of the said counter 84b is connected to the other input terminal. Divider 84f executes the division of the output of adder 84e by the output of counter 84b and outputs the result of its calculation. In this way the divider obtains an average value for the coefficients of t he locations where marks 8b, the objects of the search, have been found, and thereby obtains the goodness of fit. This is the processing in Steps 6 and 7 of the flowchart in FIG. 48.

As disc used above , along with the goodness of fit, the valid/invalid flag which is the output of AND element 84d is output. When the goodness of fit is greater than a given reference value and the "valid" flag is output, the copy machine recognizes that the specified pattern has been found and executes its given program in response to this situation.

In the example we have been discussing, multiplier 84a is connected to the output of every flip-flop. However, one could also use a multiplier which did not multiply by coefficients which are zero. That is, the outputs of flip-flops corresponding to locations with coefficient 0 would not be connected to the multiplier. Also, in this example the output of multiplier 84a is connected to counter 84b; but the output of, for example, flip-flop group 83 could also be connected. In this case, only the outputs of flip-flops for locations with coefficients of 0.5, 0.8 or 1 would be connected to counter 84b. Then a flip-flop for a location with a mark would supply a "1" to counter 84b, while one for a location without a mark would supply a "0". An adder could be used to obtain the total number of flip-flops outputting a "1".

Figure 48:
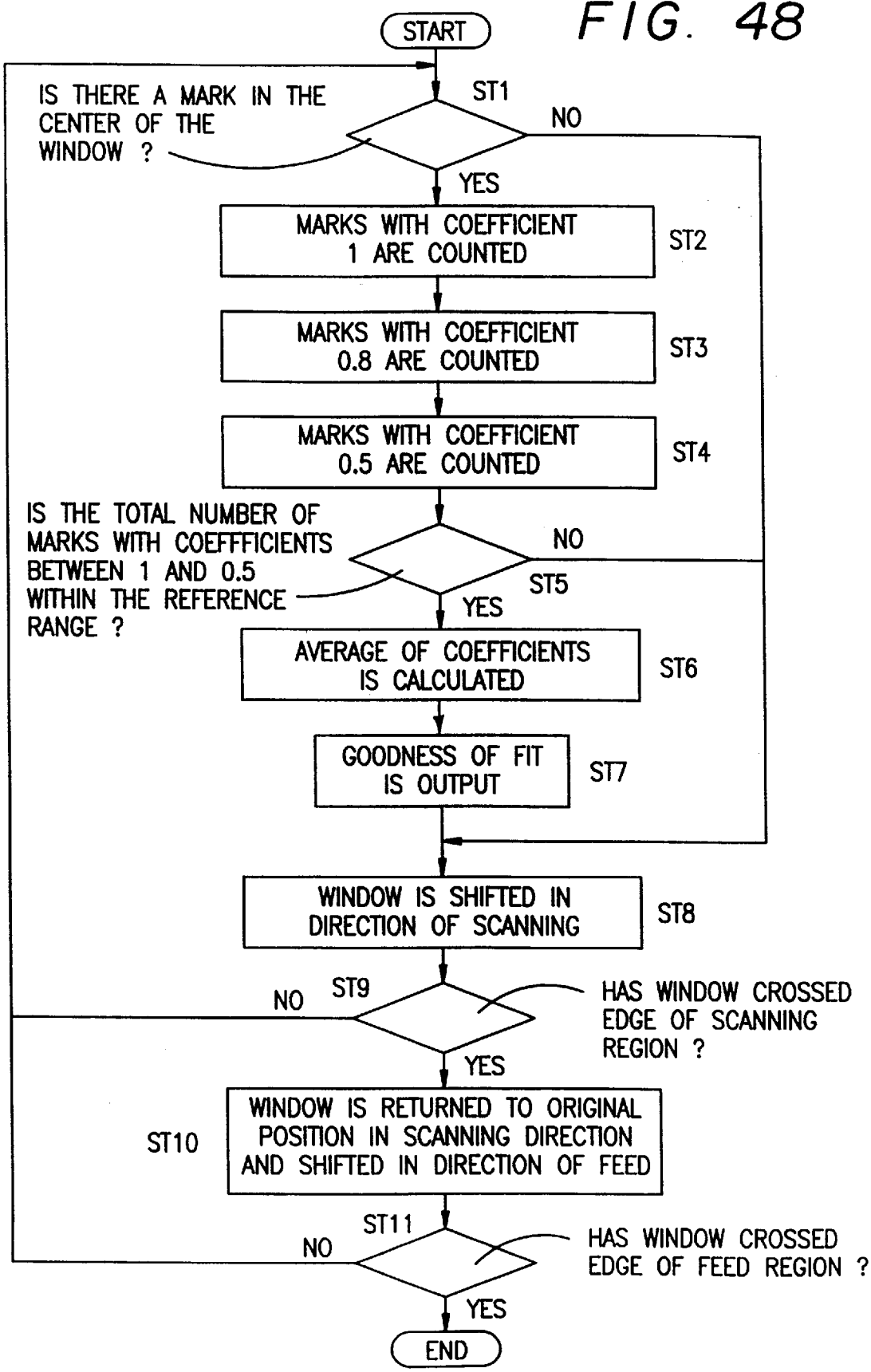
FIG. 48 is a flowchart of the functions performed by the CPU.

The flowchart in FIG. 48 shows an example of the processing function being handled by the aforesaid CPU 82. However, when the processing is executed via software, it will need to be compatible with that executed by the said hardware. The marks which have been detected can be used as a reference to execute the processing, as shown below.

The position coordinates of the marks which have been detected are stored in location memory 81. From these coordinate data, we can obtain the distance between any two marks. We choose one of the marks stored in location memory 81 and assume it is central mark 8a. We detect all the marks at a given distance from this mark (a given margin may also be provided) and obtain the number of marks which we have found. If the total is within a given range, we may determine that the specified pattern has been found. If, having used this device, we are able to predict that the number of marks which will be detected is small, we will be able to execute the relevant determination processing using a small number of circuits, which will contribute to high-speed processing.

In the example we have been discussing, the specified pattern consists of a central mark 8a and a number of identical marks 8b arrayed around this central mark at a given distance from it. However, the invention is not limited to this configuration only; a central mark 8a need not be used. In this case, the processing in Step 1 of the flowchart in FIG. 48 and AND element 84d in FIG. 54 would be omitted. The device would then be used in basically the same way as the other ideal examples discussed above. We would, however, be unable to execute via software the said determination processing using a mark as a reference. For this reason it is preferable to have the specified pattern consist of a central mark 8a and a set of marks 8b arranged around it.

Figure 55:
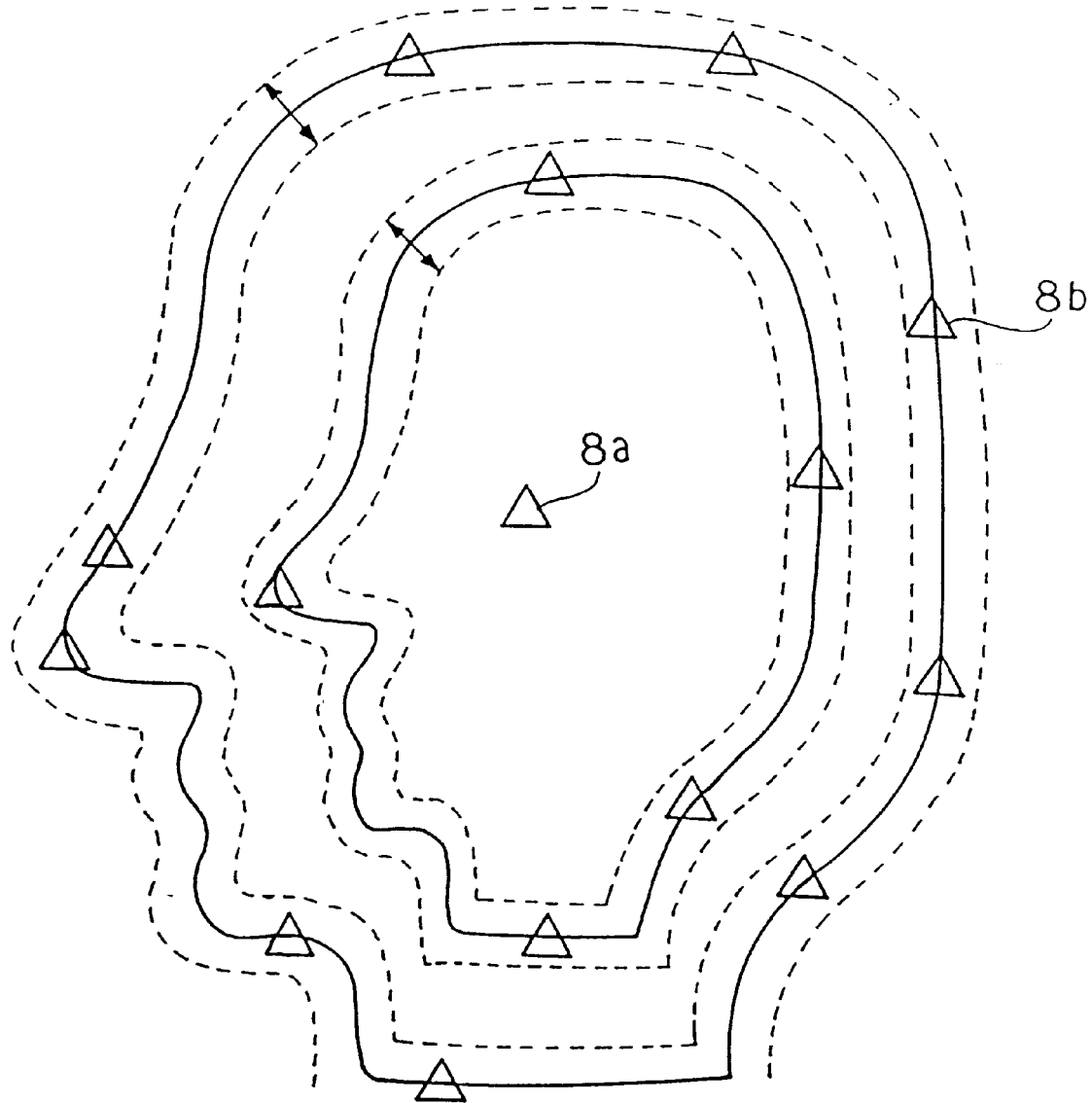
FIG. 55 shows another example of a specified pattern.

In the examples and modifications thereof discussed herein, there is a single layer of marks 8b along the outline of the shape. However, the invention is not limited to this case only. A pattern could also be used (See FIG. 55) in which a number of marks 8b of a given shape are arranged on the outlines of several shapes of varying sizes.

In these examples, too, the determination of whether the specified pattern has been found is based on the number of marks 8b on the outline. The angular position (i.e., the location) of each mark could also be used as an additional criterion.

Figure 56:
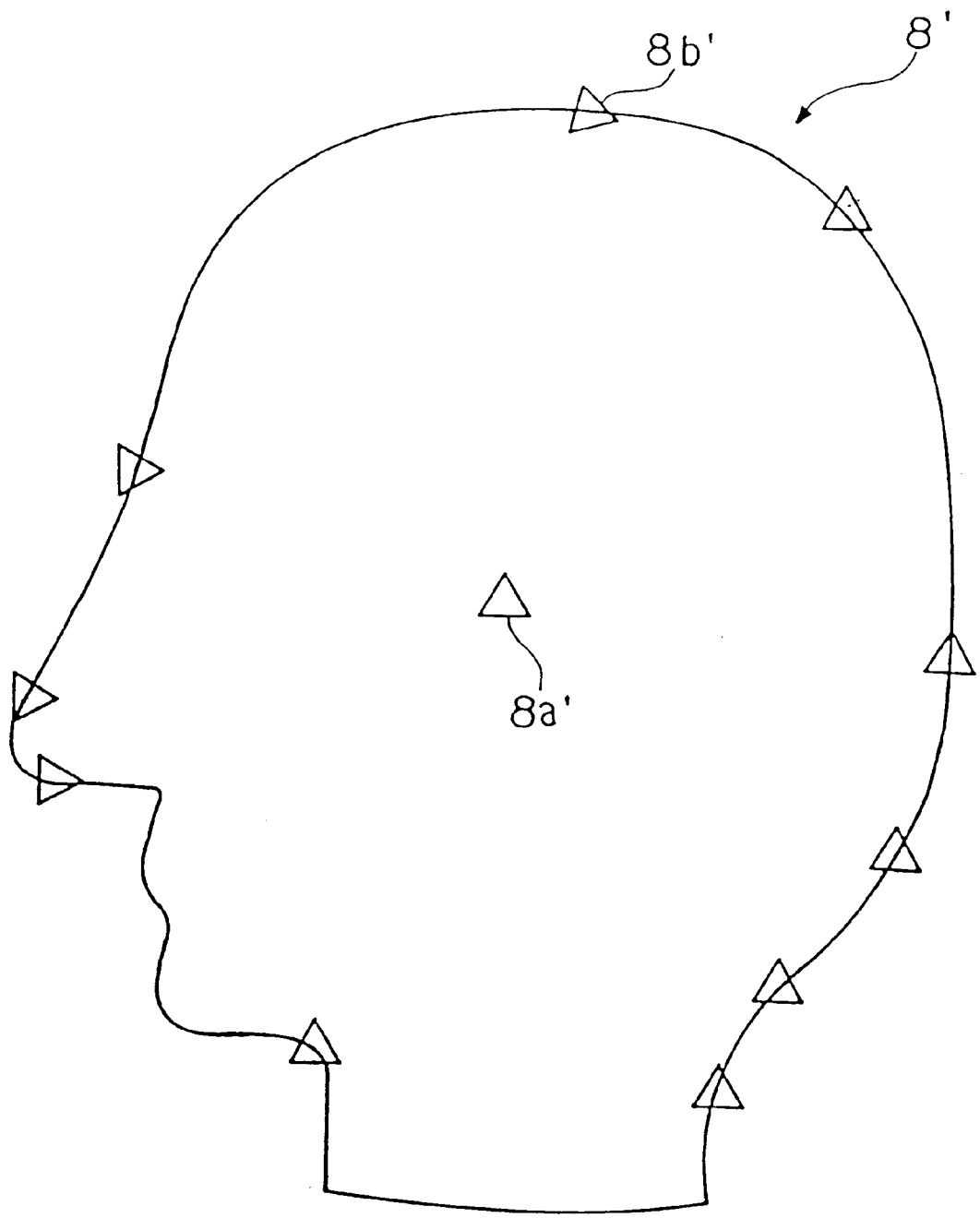
FIG. 56 shows another example of a specified pattern.

The second example discussed above would detect pattern 8 in FIG. 44, which has ten marks 8b, and pattern 8' in FIG. 56, which also has ten marks 8b', as the same pattern. If the position of each mark is added as a criterion, however, they will be recognized as different. The pattern in FIG. 44 would be determined to the specified pattern, and that in FIG. 56 would not. Since the determination processing would make use of angular data, there would be little chance of false recognition lowering the processing speed, and the rate of recognition would improve.

Figure 57:
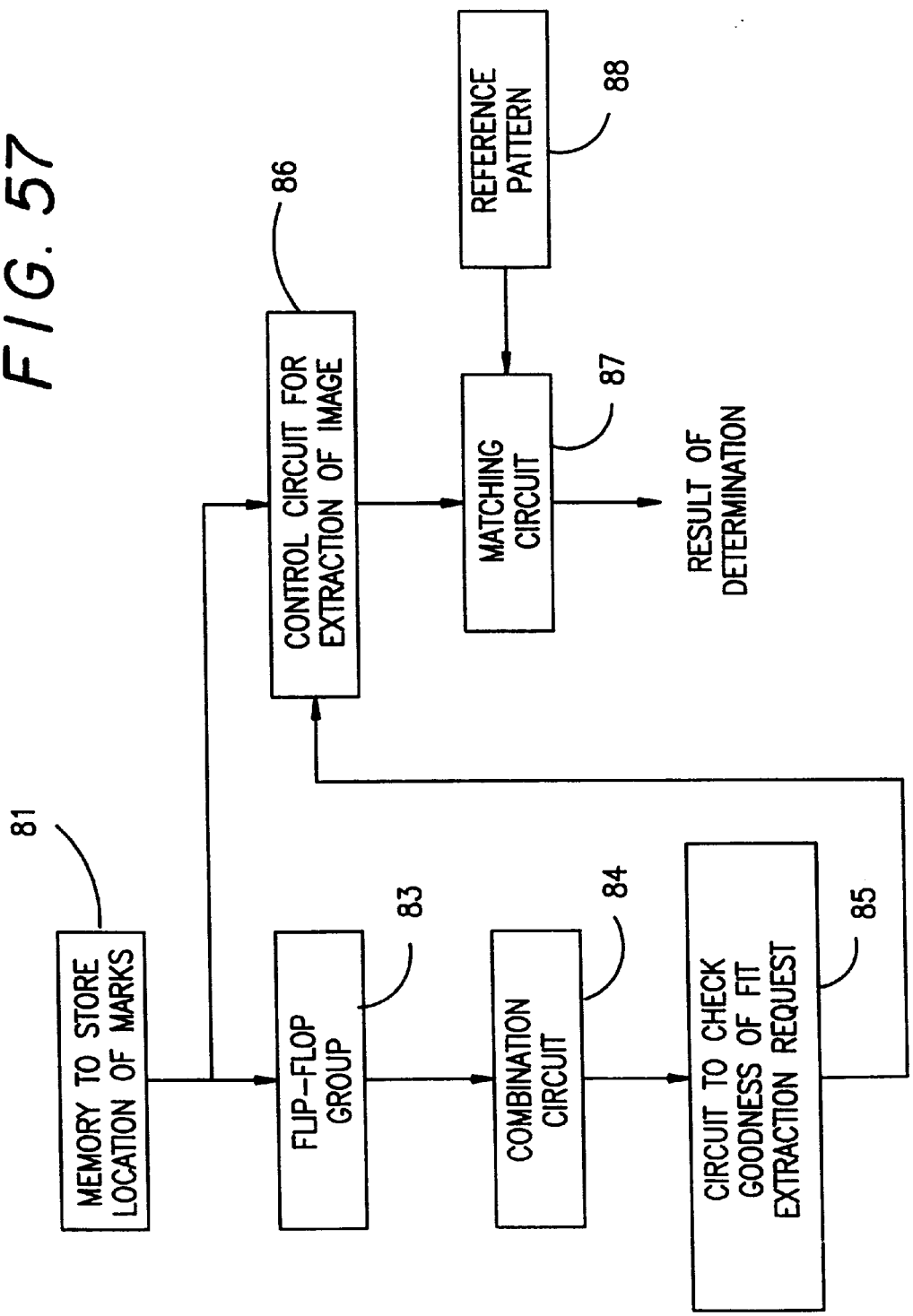
FIG. 57 is a block diagram of another internal structure for the device to detect the specified pattern.

The device to process such a function can be the circuit disclosed in FIG. 57. The location of marks can be recognized by the same way as discussed in the second example, but some part of the recognition circuit for the specified pattern is different in this example.

In this example, to guarantee that determinations can be processed at high speed, they are made (i.e., the goodness of fit is calculated) without using angular position as a criterion, just as in the first example. If in the determination processing the goodness of fit is found to be high, the portion of the image containing the pattern is extracted and matched against the reference pattern repeatedly after being rotated slightly. In this way the portion of the image can be extracted easily, and the number of times the pattern needs to be rotated and matched can be kept to a minimum. The processing can be executed at high speed.

As a specific example of how such a device might be configured, we shall discuss a design realized through hardware. As can be seen in the drawing, location memory 81, flip-flop group 83 and combination circuit 84, which serves as the device to calculate goodness of fit, are all taken without modification from the device in the prior example. The output of combination circuit 84 (i.e., the goodness of fit) is sent to circuit 85 (which could be an ordinary comparator), which checks the goodness of fit. This circuit determines whether the goodness of fit exceeds a given reference value. If it does, the circuit sends a "request extraction" signal to control circuit 86, which will extract the appropriate portion of the image.

When control circuit 86 receives an extraction request, it accesses from location memory 81 the position data concerning the given area where the mark has been found and having the same center point, and it sends them to matching circuit 87.

Matching circuit 87 compares the locations of the marks stored in memory unit 88, which stores the reference pattern, with the detected pattern transmitted by control circuit 86, and it determines whether they coincide. It then rotates the detected pattern repeatedly over a given angle until it has completed a 360° rotation. If at any angle the images match, the device determines that it has found the specified pattern. If they do not match at any angle, it concludes that it has not found the specified pattern. In either case, it outputs the result. The goodness of fit synchronously calculated by combination circuit 84 could also be output at this time. The matching device consists of the said control circuit 86, which extracts the image, and matching circuit 87.

In the scheme employed by this example, a mark is detected and the location of that mark is stored. These processes are the same as those used in the second example discussed earlier. The specified pattern, which consists of a number of marks arranged in a given relationship, is detected from the locations of the marks which are detected. First, it is determined whether this pattern has the same number of marks at a given radius as the specified pattern. This is its goodness of fit. The processing executed to calculate goodness of fit is the same as that used in the second example. If the resulting goodness of fit is high, the portion of the image containing the pattern is extracted and it is matched against a reference after being repeatedly rotated. If the specified pattern is detected, this is communicated to the copy machine, and it executes its given processing to prevent the copying operation from proceeding.

In all the examples and modifications thereof discussed herein, there is a single pattern to be detected. However, the invention is not limited to this case. The image processing device could also use a number of specified patterns and be able to distinguish which one it had detected. This would allow data representing coded information to be added to the pattern.

Figure 58:
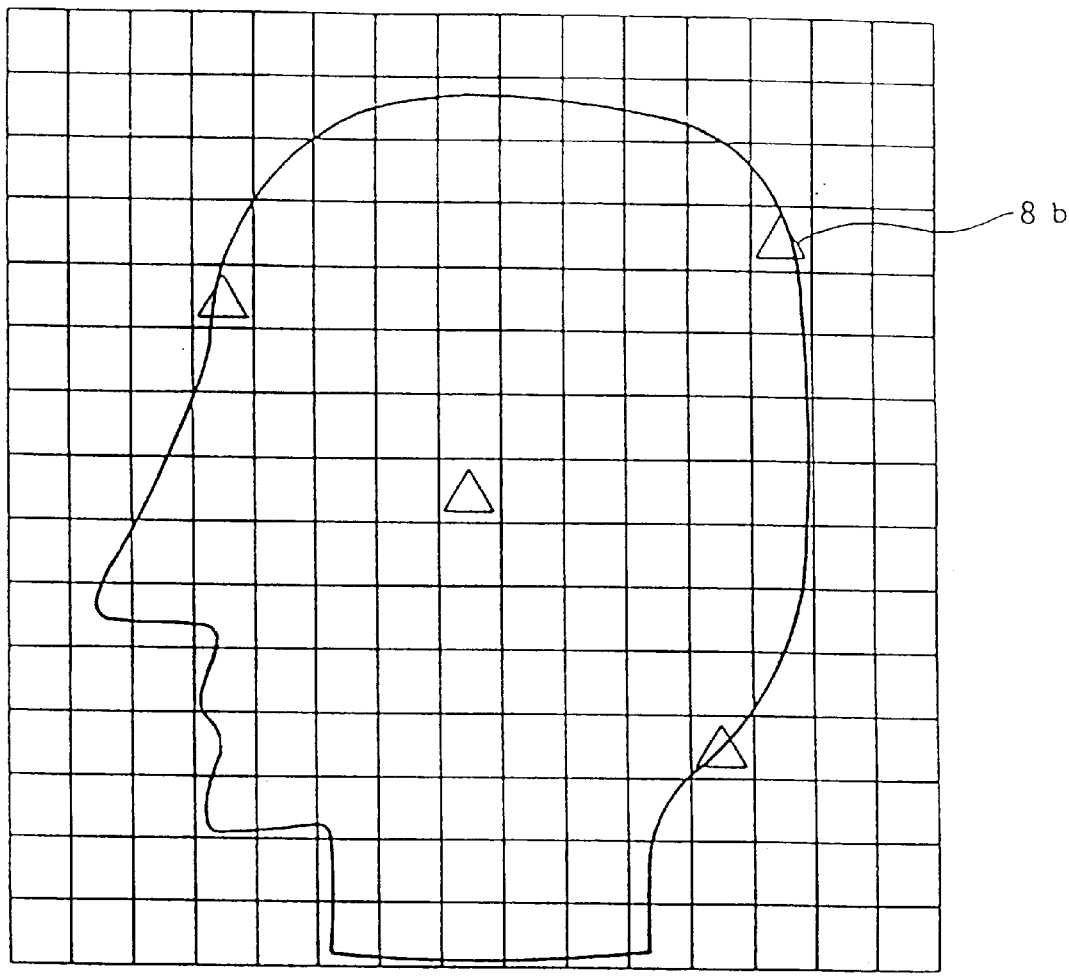
FIG. 58 shows an example of how code data can be incorporated in the specified pattern.
Figure 59:
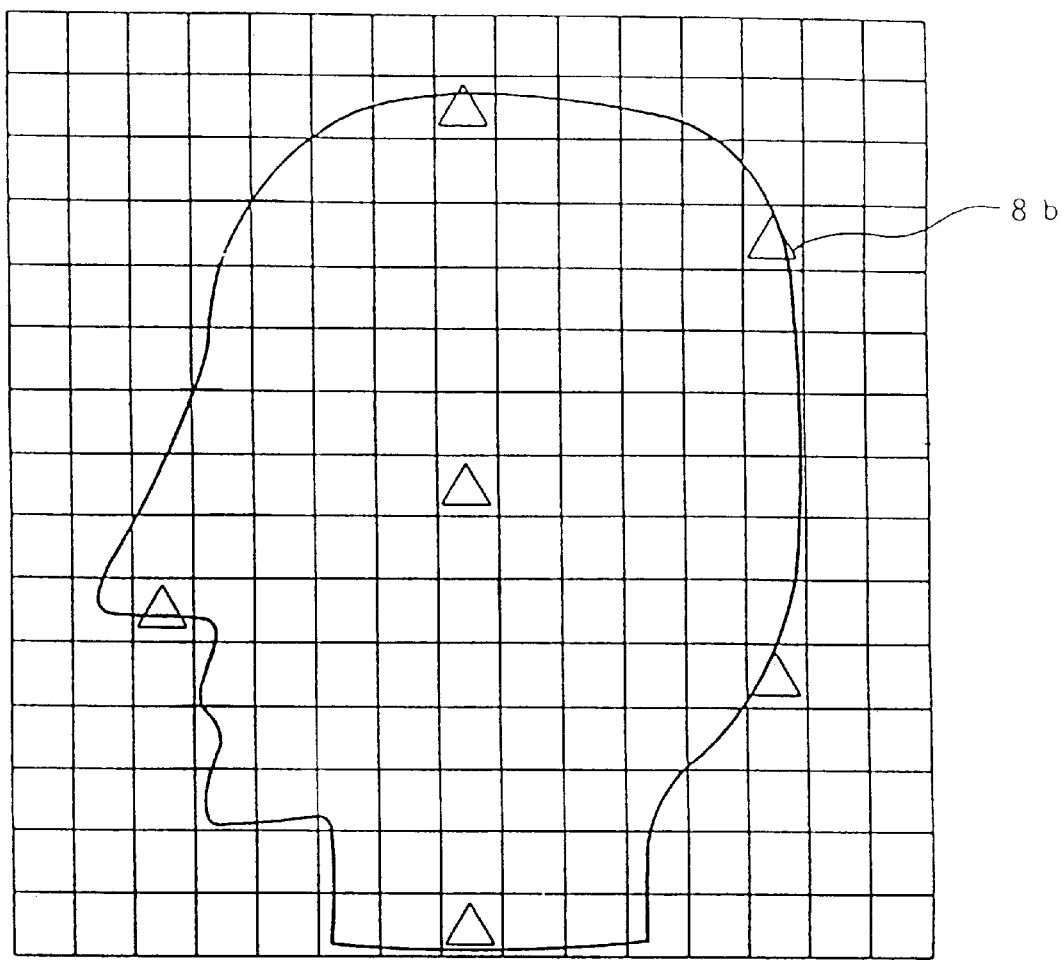
FIG. 59 shows an example of how code data can be incorporated in the specified pattern.

For example, several different patterns (differing in the number of marks 8b placed on the outline of the shape) like those shown in FIGS. 58 through 60 could be established. By adding coded data to the patterns, we can cause each of them to convey a different meaning.

If a number of these specified patterns are used, they can be placed in various locations on a single document. Then if all the patterns or at least a given number of them are found on a document, the operation of the copy machine or other device can be prohibited. When multiple checks are performed in this way, there will be a lower probability of recognition errors. If one of the patterns has become hard to detect because it has become abraded or soiled through long use, the document can still be detected via the remaining patterns. When a single pattern is used, copying will be prevented if a pattern identical to one of the specified patterns happens to be found among the density data (in the characteristic count) from an ordinary document. By requiring the matching of a number of specified patterns, we can reduce the chance that the copying of an ordinary document which should be allowed is prevented.

The aforesaid coded data can be made to correspond to the type of bank note or stock certificate, or in the case of a bank note, to the denomination. Then when this system is operating and the copying procedure with respect to a prohibited document has been completed, the type of pattern detected and the fact that a stop command is issued can be stored, so that we can determine what type of documents are placed for copying in this device, or more specifically in the copier in which this device is installed. Various other schemes using coded data can also be offered.

Figure 61:
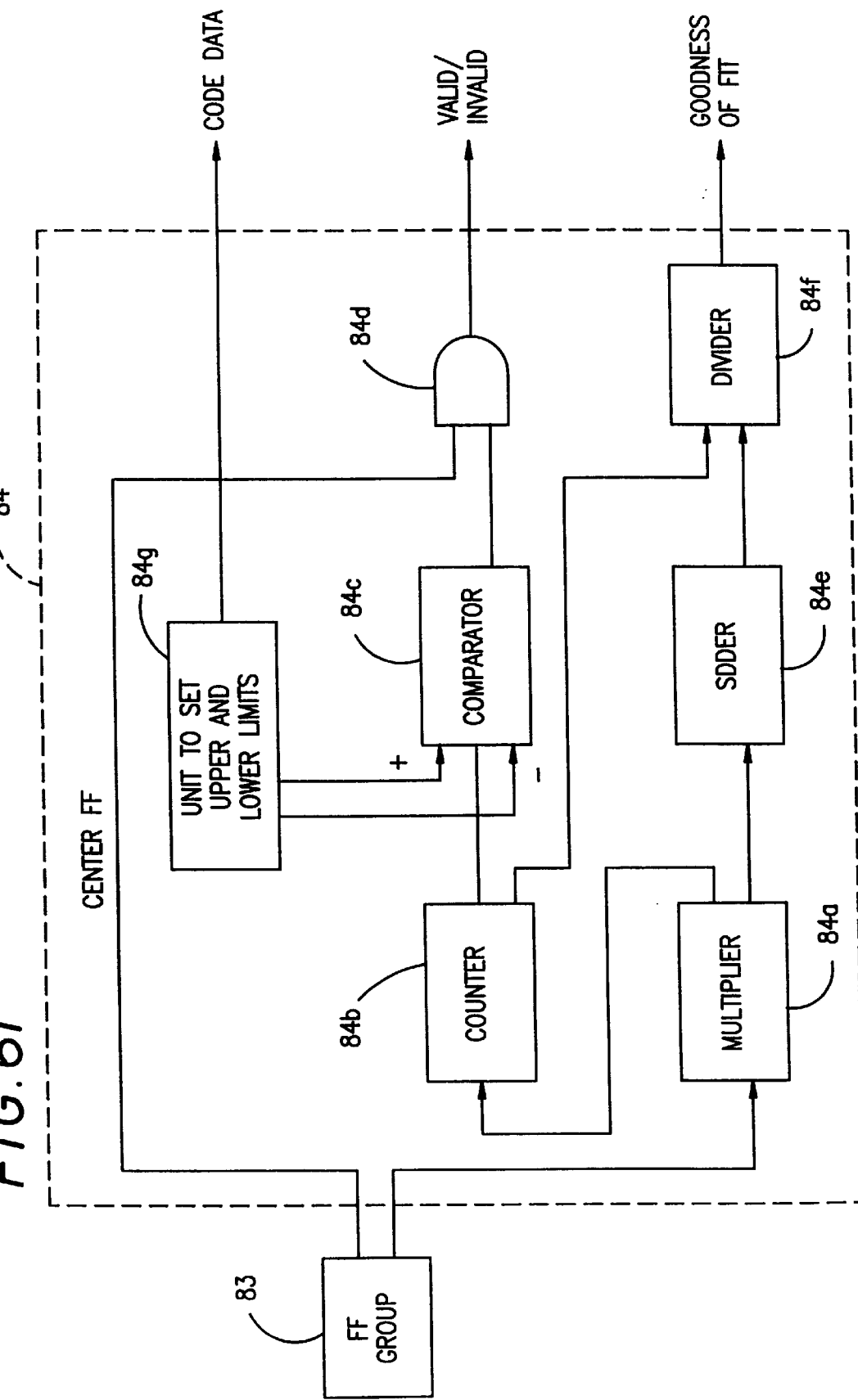
FIG. 61 shows a block diagram of the essential internal structure of a device to detect a specified pattern which can detect the patterns with code data shown in FIGS. 35 through 37.

A specific example of this sort of device to detect a specified pattern is shown in FIG. 61. Since the marks are detected in the same way as in the second example we discussed, the mark detection device of that example could also be used here without modification. In this example we have modified one part of the device to detect t he specified pattern. We shall discuss only the modified portion. As can be seen in FIG. 61, value setting unit 84g, which sets upper and lower limit values, has been added to combination circuit 84d.

Value setting unit 84g sets as reference values in comparator 84c upper and lower limit values for each of patterns (A) through (C) in FIGS. 58 through 60. Pattern (A) in FIG. 58 has three marks 5b; pattern (B) in FIG. 59 has five; and pattern (C) in FIG. 60 has seven. Upper and lower limit values are set by adding or subtracting a given margin to the number of marks each pattern should have. In this example, we have used a margin of ±1. Code is output along with the limit value data indicating for which pattern reference values are being set. Another possible configuration for the circuits is that shown in FIG. 54. Since the same numbering is used, we shall omit a discussion of the function of each component.

In the image processing scheme used by this example, the marks are detected and their locations are stored. The processing used up to this point is identical to that of the aforesaid second example. Next, the flip-flops in flip-flop group 83 which correspond to the locations of all the marks t hat are detected are set. multiplier 84a multiplies the output of each flip-flop by a given coefficient, and counter 84b counts the values which are not zero. The outputs of multiplier 84a are added together by adder 84e to obtain the total of the coefficients, and this total is input into divider 84f just as in the second example.

In this scheme, the upper and lower limit values which were established previously for the number of marks in each specified pattern are obtained successively from value setting unit 84g. For each pattern, the goodness of fit is determined and a judgment of valid or invalid is rendered. A margin of, say, ±1 can be added to the actual number of marks. When, for example, specified pattern (B) is detected, the output of counter 84b will be "5". Value setting unit 84g provided the upper and lower limits of "4" and "2" to comparator 84c for pattern (A). The output of comparator 84c will be "0" (L), and AND element 84d will output an "invalid" flag. At the same time, value setting unit 84g will output code indicating that (A) is the pattern in question. In this way we can know that the pattern we detected is not specified pattern (A).

Next, value setting unit 84g sets "6" and "4" in comparator 84c as the upper and lower limits for pattern (A). The output of comparator 84c will be "1" (H), and AND element 84d will output a "valid" flag. At the same time, value setting unit 84g will output code indicating that (B) is the pattern in question. Specified pattern (B), then is valid, and its goodness of fit is output by divider 84f. If the goodness of fit is high, it is determined that this is indeed specified pattern (B).

Value setting unit 84g sets upper and lower limit values of "8" and "6" in comparator 84c for pattern (C). The output of comparator 84c will be "0" (L), and AND element 84d will output an "invalid" flag. At the same time, value setting unit 84g will output code indicating that (C) is the pattern in question. In this way we understand that this is not specified pattern (C). This scheme, then, allows us to know which specified pattern has been detected. In response, the specified processing is executed.

Figure 62:
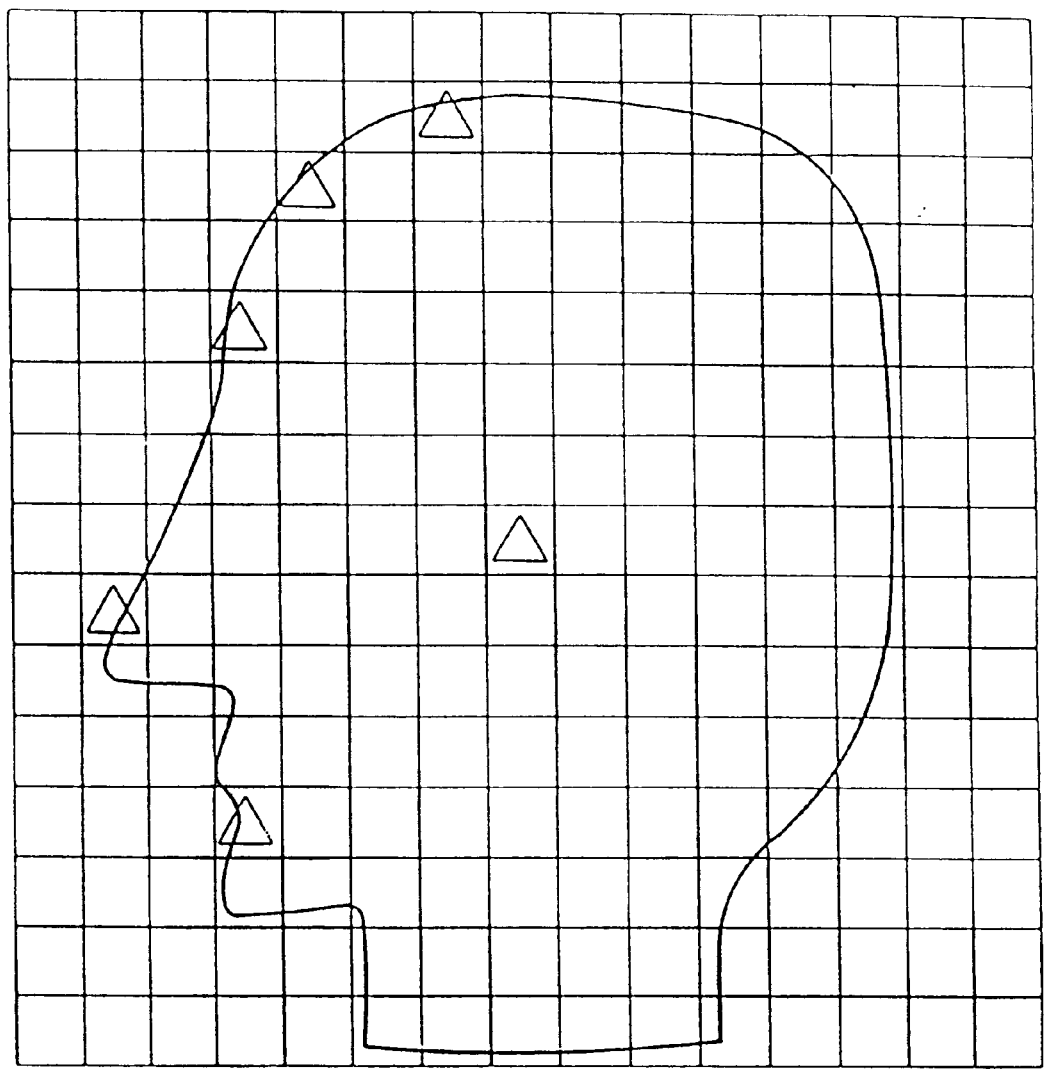
FIG. 62 shows another example of how code data can be incorporated in the specified pattern.
Figure 63:
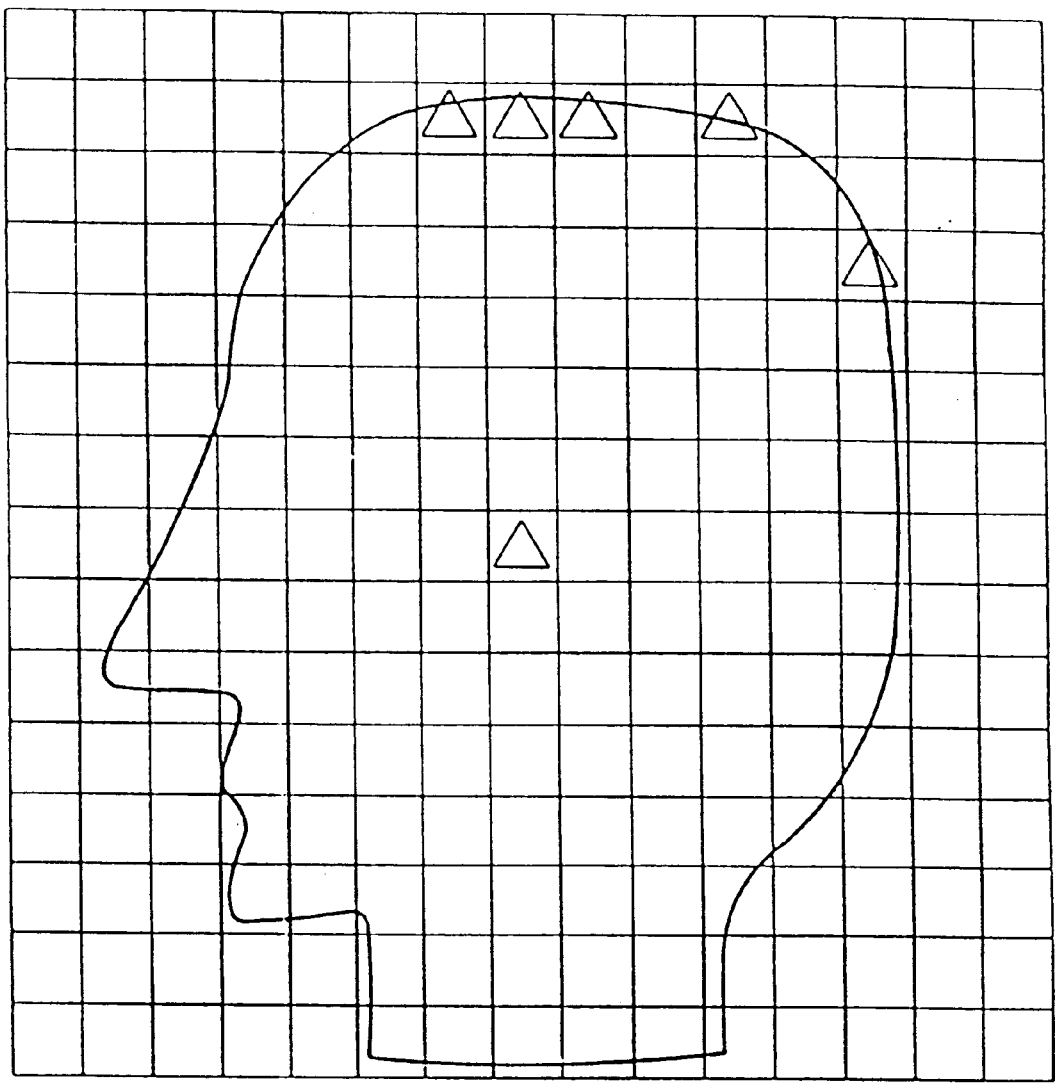
FIG. 63 shows another example of how code data can be incorporated in the specified pattern.
Figure 64:
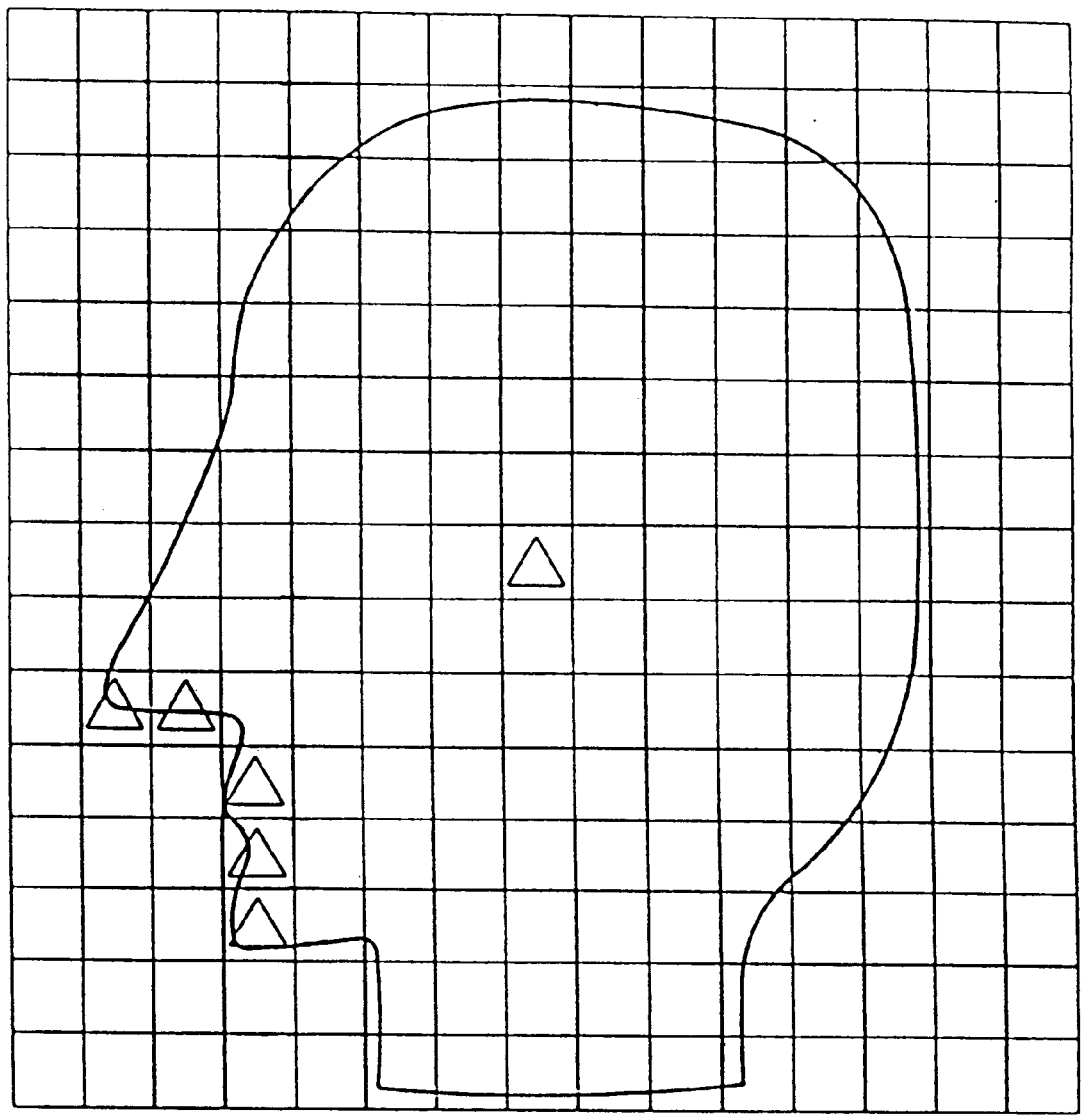
FIG. 64 shows another example of how code data can be incorporated in the specified pattern.

Other examples of patterns with coded information are patterns A, B and C in FIGS. 62, 63 and 64, respectively. All have the same number of marks 8b, but the placement of the marks and hence their relationship with each other varies. These patterns can be specified and detected by the scheme shown in FIG. 57, which uses rotational angle as a criterion.

Figure 65:
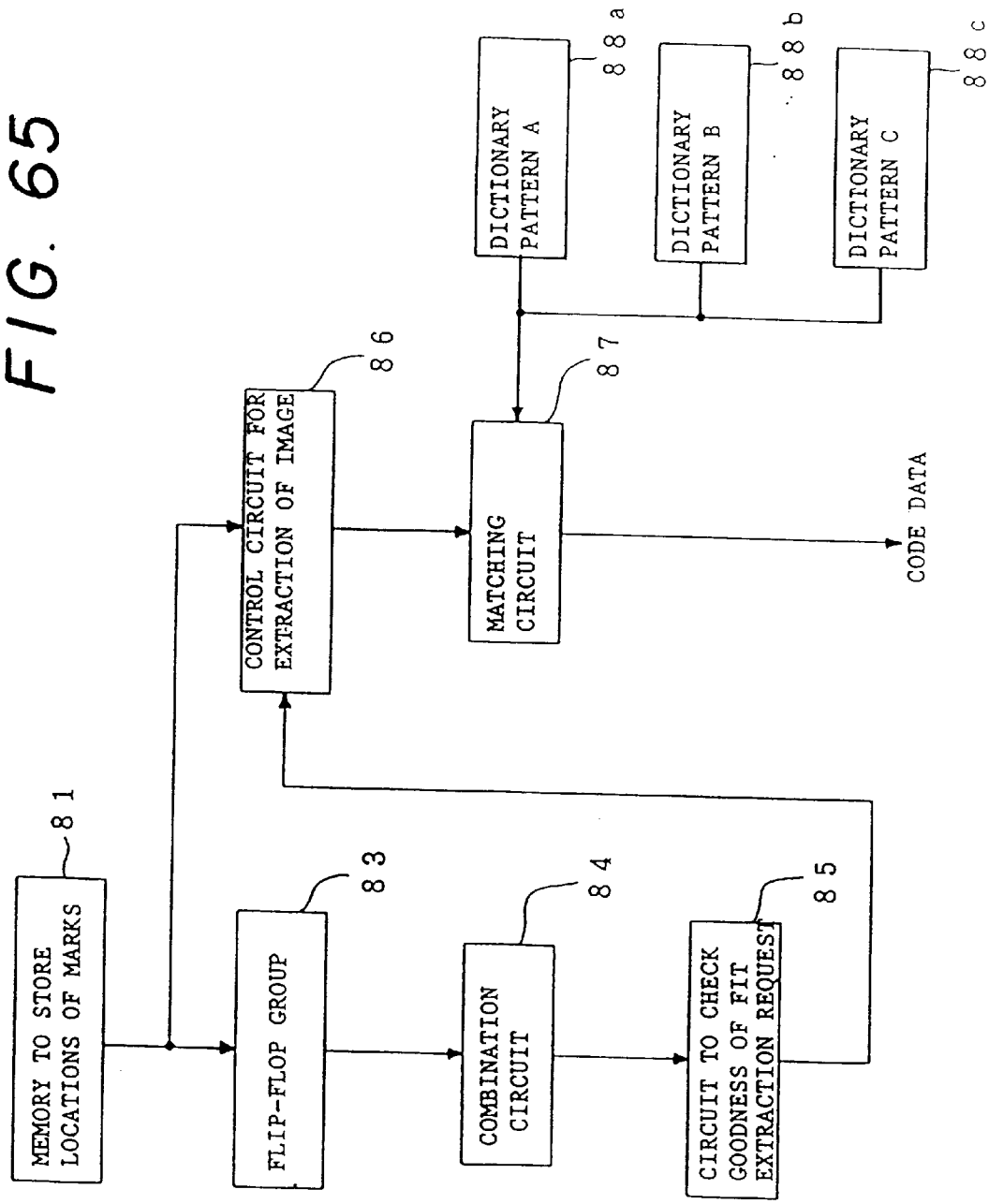
FIG. 65 is a block diagram of the essential internal structure of a device to detect a specified pattern which can detect the patterns with code data shown in FIGS. 39 through 41.

A specific design for a device to detect several specified patterns containing coded information is shown in FIG. 65. (Although it is not shown in the drawing, the device to detect the marks used in the previous examples can be employed here without modification.) The configuration here is basically the same as that in FIG. 57. The marks are detected by device 2", and their locations are stored in location memory 81. Based on the data representing these locations, every flip-flop in flip-flop group 83 is set to a specific value. The output of these flip-flops is sent to combination circuit 84, and the goodness of fit is obtained. The goodness of fit which is calculated is sent to circuit 85. If it exceeds a given reference value, a "request extraction" signal is sent to control circuit 86.

When control circuit 86 receives the request for extraction, it accesses the location data for the mark in the specified area stored in location memory 81 which has the same center point, and it sends these data to matching circuit 87.

Matching circuit 87 compares the pattern transmitted by control circuit 86 with a specified reference pattern. Reference patterns for each of patterns (A) through (C) are stored in dictionaries 88a through 88c, respectively. Matching circuit 87 successively compares each of the three reference patterns in 88a through 88c with a single pattern which is detected, and determines whether it matches any of them. The extracted pattern is also rotated in fixed angular increments over 360°. If at any angle the extracted pattern matches a reference, the code for that reference pattern is output.

If a match is not found at any angle, it is concluded that this is not the specified pattern, and this result is output. The goodness of fit calculated synchronously by combination circuit 84 can also be output at this time.

The image processing scheme used in this example is basically identical to the one described above in which code is added to a specified pattern by varying the number of marks. The aspect in which they differ is how they determine which specified pattern has been found. In this scheme, it is determined whether the pattern has the same number of marks at a given radius as the specified pattern. This is its goodness of fit. If the resulting goodness of fit is high, the portion of the image containing the pattern is extracted and matched against a reference while being gradually rotated. Several reference patterns corresponding to the various specified patterns are used in this matching process. The extracted pattern is compared to each of the references, and if a match is found, the code for that reference pattern is output. In this way we can understand which specified pattern has been detected. The specified processing is executed in response to the detection of the proscribed document.

All of the examples discussed above (in which the specified pattern is composed of a number of identical marks) are suitable for use in the copy machine pictured in FIGS. 26 and 27.

In the examples discussed above, the device is installed in a copy machine; however, this invention is not limited to this application, but could be applied as well in a color scanner, a color printer, a fax machine, a device to transmit communications, or a variety of other devices.

To give an example, a scanner employing this invention might have the configuration pictured in FIG. 66. The scanner comprises three main components: input unit 90, control unit 91 and output unit 92. Input unit 90 scans the light from a light source over a document. The light reflected (or transmitted) by the document is detected by a photo-electric converter element such as a CCD, a photomultiplier, or a photodiode. This light is converted to an electrical signal which is transmitted to control unit 91. Control unit 91 amplifies the electrical signal from the input unit and executes various kinds of image processing, such as the correction of specified tones or contour enhancement, and transmits the corrected signal to output unit 92. Output unit 92 transforms the data as needed, based on the signal it has received from control unit 91, and outputs them to the specified output device. When the scanner and printer are separate devices and the scanner does no more than read the document, the data will need to be sent from scanner to printer. It will thus be necessary that the image data which the scanner has read be stored temporarily in a memory device (an output device). Whatever processing is required to write the data will be executed. If the output device is a printer or the like (which is installed in the same device), the signal must be converted from an electrical to an optical signal, and the processing must be executed to convert the signal in order to write it on a paper medium (a photosensitive material). Since commonly available devices are used as the actual components, we shall omit a detailed discussion of them here.

With this invention, an image processing device 93 is provided. The signals representing the image data which are received from the said input unit 90 are input into image processing device 93 as well as into control unit 91. Image processing device 93 can employ the processing devices in any of the examples discussed above, as well as the various devices to detect the specified pattern shown in the modified versions thereof. Image processing device 93 executes the given processing (which is discussed above) required to detect a specified pattern in the image data which it receives. If it does detect this pattern, it sends a "prohibit output" signal to control unit 91. In response to this signal, control unit 91 halts the signal output to output unit 92. This "prohibit output" signal could also be sent to input unit 90 or output unit 92.

FIG. 67 shows how this signal processing device could be used in a printer. The image data (in the form of electrical signals) are sent to input unit 94 either directly from the scanner or through a medium such as a storage device. Control unit 95 executes the processing necessary to convert the image (i.e., it converts the data to the form required by the output mechanism). Output unit 96 executes the processing required to convert the signal from electrical to optical, and the image data are reproduced on a photosensitive material.

If the scanner described above does not have an image processing device 93 with a device to halt its operation when a specified pattern has been detected, the image data will be read even if the document is one which should not be read.

The output signal from control unit 95 is sent to image processing device 97 (which is equivalent to the aforesaid image processing device 93), which executes the specified image processing and performs the processing necessary to detect the specified pattern. If the specified pattern is detected, an "output prohibited" signal is sent to control unit 95, and the output of data from unit 95 to output unit 96 comes to a halt. An "operation prohibited" signal could also be sent directly to output unit 96 to cause that unit to halt its operation.

As described above, the image processing scheme and device of this invention and the copy machine in which they are employed do not depend on the overall size (i.e., the outline) in order to recognize a document which may not be copied (or printed). They focus on a specified pattern imprinted on a portion of the document and detect whether that pattern is present. Thus this scheme requires only a small memory capacity, allowing it to be realized at a low cost. The location of the specified pattern can be detected accurately on a single scan. The pattern can be extracted and the determination processing executed on subsequent scans or simultaneously with the same scan.

If dummy marks which are identical or similar to the real ones are provided in the vicinity of the positioning marks, it will be difficult for an uninformed person to distinguish which are the real positioning marks. This will minimize the probability of tampering. If the specified pattern is composed of marks which are identical or similar to the positioning marks, it will be even more difficult to tamper with the document. The same specified pattern can be used for a variety of documents. Since the device is provided with knowledge concerning this pattern, it will be able to detect any of the various documents which contain it. Then should any new document be issued which may not be copied, the same pattern can simply be imprinted on it, and it too will be detected. Since this scheme requires the storage of only a small amount of knowledge, a small memory capacity will suffice. Since only a small number of patterns need be processed, the processing can be executed at high speed.

If at least three positioning marks are arranged in specified positions, and the shape they form is an isosceles triangle or an asymmetrical polygon, the location of the pattern can be obtained simply, accurately and unmistakably from the locations of the marks. This will allow the determination of whether this is the specified pattern to be performed at high speed.

If the device to detect the positioning marks consists of a device to convert to binary values the image data it receives and a device to search the binary data using a mask divided into n×m units, a simple circuit (hardware) can be used for detection, and the processing can be executed at high speed. Since only a few positioning marks are needed, a compact and uncomplicated device can be realized even if hardware is used.

If the matching device calculates the degree of resemblance, or more specifically, if it obtains the degree of resemblance by means of fuzzy inference, the pattern will be recognized correctly even when the actual pattern on the document does not mesh with the reference pattern because it is shifted slightly due to a misregister or other printing irregularity. By the same token, the use of fuzzy inference (fuzzy pattern matching) will prevent the accuracy of positioning (and the recognition rate) from dropping when the distance between the positioning marks and the pattern varies slightly.

If the said matching device divides the extracted region into N cells and decodes each cell according to the density which it has been determined to have; and if it then determines whether the said decoded data match previously obtained reference data which represent the pattern to be detected, then the matching device can consist of a comparator which outputs a signal when a match has been found. The design of this device can be kept simple, and the determination processing can be executed at high speed.

If positioning marks are not used, and the specified pattern consists of a number of identical marks arranged in a given relationship, then in addition to the effects described above, the processing executed by the device to detect the marks can be virtually the same as the said processing used to detect the positioning marks. Marks can be used which are identical to the said positioning marks.

By installing this image processing device in a copy machine, we can absolutely prevent the output of copies of documents whose reproduction is illegal, such as bank notes and negotiable securities. (This entails refusing to copy the prohibited document while allowing other documents to be copied and output.) In addition, we can halt the reading or printing of proscribed documents.

What is claimed is:

1. An image processing method to identify whether an input image data contains specified image data which is illegal to reproduce, comprising the steps of:
   - detecting a plurality of specified marks having an identical shape in said input image data by comparing said input image data with a specified reference mark which has been previously determined;
   - recognizing an arrangement of said detected plurality of specified marks in said input image data; and
   - judging whether a specified pattern comprising said plurality of specified identical shape marks arranged in a given relationship is contained in said input image data based on said recognized arrangement of said detected plurality of specified identical shape marks.

2. An image processing method according to claim 1, wherein said arrangement is recognized by recognizing a distance between each of said detected specified marks.

3. An image processing method to identify whether an input image data contains specified image data which is illegal to reproduce, comprising the steps of:
   - detecting a plurality of specified marks having an identical shape in said input image data by comparing said input image data with a specified reference mark which has been previously determined;
   - recognizing a total number and an arrangement of said detected plurality of specified marks, wherein said total number and said arrangement are recognized on an outline of a previously determined pattern; and
   - judging whether a specified pattern comprising said plurality of specified identical shape marks arranged in a given relationship is contained in said input image data based on said total number and said arrangement of said detected plurality of specified identical shape marks.

4. An image processing method to identify whether an input image data contains specified image data which is illegal to reproduce, comprising the steps of:
   - detecting a plurality of specified marks having an identical shape in said input image data by comparing said input image data with a specified reference mark which has been previously determined;
   - storing locations of said detected specified marks in a memory;
   - recognizing a total number and an arrangement of said stored locations of said detected plurality of specified marks, wherein said total number and said arrangement are recognized on an outline of a previously determined pattern; and
   - judging whether a specified pattern comprising said plurality of specified identical shape marks arranged in a given relationship is contained in said input image data based on said total number and said arrangement of said detected plurality of specified identical shape marks.

5. An image processing device to identify whether an input image data contains a specified image data which is illegal to reproduce, comprising:
   - a specified mark detector to detect a plurality of specified marks having an identical shape in said input image data by comparing said input image data with a specified reference mark which has been previously determined;
   - a recognizing device to recognize an arrangement of said detected plurality of specified marks in said input image data; and
   - a judging device to judge whether a specified pattern comprising said plurality of specified identical shape marks arranged in a given relationship is contained in said input image data based on said recognized arrangement of said detected plurality of specified identical shape marks.

6. An image processing device according to claim 5, wherein said recognizing device recognizes the arrangement by recognizing a distance between each of said detected specified marks.

7. An image processing device to identify whether an input image data contains a specified image data which is illegal to reproduce, comprising:
   - a specified mark detector to detect a plurality of specified marks having an identical shape in said input image data by comparing said input image data with a specified reference mark which has been previously determined;
   - a recognizing device to recognize a total number and an arrangement of said detected plurality of specified marks wherein said total number and said arrangement are recognized on an outline of a previously determined pattern; and
   - a judging device to judge whether a specified pattern comprising said plurality of specified identical shape marks arranged in a given relationship, is contained in said input image data based on said total number and said arrangement of said detected plurality of specified identical shape marks.

8. An image processing device to identify whether an input image data contains a specified image data which is illegal to reproduce, comprising:
   - a specified mark detector to detect a plurality of specified marks having an identical shape in said input image data by comparing said input image data with a specified reference mark which has been previously determined;
   - a memory to store locations of said detected specified marks;
   - a recognizing device to recognize a total number and an arrangement of said stored locations of said detected plurality of specified marks wherein said total number and said arrangement are recognized on an outline of a previously determined pattern; and a judging device to judge whether a specified pattern comprising said plurality of specified identical shape marks arranged in a given relationship, is contained in said input image data based on said total number and said arrangement of said detected plurality of specified identical shape marks.

9. A copy machine to prevent copying of a document that is legally prohibited from being copied, comprising:

a scanning device to scan said document and generate an image data of said document;

a conversion device which is connected to said scanning device and which converts said image data into color signals for printing;

a printing device, which receives said color signals from said conversion device and performs specified processing needed for printing;

an image processing device to identify if said generated image data contains specified image data which is illegal to reproduce, said image processing device comprising:

a detection unit to detect a plurality of specified marks having an identical shape in said generated image data by comparing said generated image with a specified reference mark which has been previously determined;

a recognition unit to recognize an arrangement of said detected plurality of specified marks in said generated image data; and a judgment unit to judge if said generated image data contains a specified pattern comprising said plurality of specified identical shape marks arranged in a given relationship is contained in said input image data based on said recognized arrangement of said detected plurality of specified identical shape marks.

10. The copy machine of claim 9, wherein said recognition unit recognizes the arrangement by recognizing a distance between each of said detected specified marks.

11. A copy machine to prevent copying of a document that is legally prohibited from being copied, comprising:

a scanning device to scan said document and generate an image data of said document;

a conversion device which is connected to said scanning device and which converts said image data into color signals for printing;

a printing device, which receives said color signals from said conversion device and performs specified processing needed for printing;

an image processing device to identify if said generated image data contains specified image data which is illegal to reproduce, said image processing device comprising:

a detection unit to detect a plurality of specified marks having an identical shape in said generated image data by comparing said generated image with a specified reference mark which has been previously determined;

a recognition unit to recognize a total number and an arrangement of said detected plurality of specified marks in said generated image data, wherein said total number and said arrangement are recognized on an outline of a previously determined pattern; and a judgment unit to judge if said generated image data contains a specified pattern comprising said plurality of specified identical shape marks arranged in a given relationship is contained in said input image data based on said recognized number of and arrangement of said detected plurality of specified identical shape marks.

12. A copy machine to prevent copying of a document that is legally prohibited from being copied, comprising:

a scanning device to scan said document and generate an image data of said document;

a conversion device which is connected to said scanning device and which converts said image data into color signals for printing;

a printing device, which receives said color signals from said conversion device and performs specified processing needed for printing;

an image processing device to identify if said generated image data contains specified image data which is illegal to reproduce, said image processing device comprising:

a detection unit to detect a plurality of specified marks having an identical shape in said generated image data by comparing said generated image with a specified reference mark which has been previously determined;

a memory to store locations of said detected specified marks;

a recognition unit to recognize a total number and an arrangement of said stored locations of said detected plurality of specified marks in said generated image data, wherein said total number and said arrangement are recognized on an outline of a previously determined pattern; and a judgment unit to judge if said generated image data contains a specified pattern comprising said plurality of specified identical shape marks arranged in a given relationship is contained in said input image data based on said recognized number of and arrangement of said detected plurality of specified identical shape marks.

13. A scanning machine to prevent outputting by scanning of a document that is legally prohibited from being read out by the scanning, comprising:

a scanning device to scan said document and generate an image data of said document;

an image processing device to identify if said generated image data contains specified image data which is illegal to reproduce, said image processing device comprising:

a detection unit to detect a plurality of specified marks having an identical shape in said generated image data by comparing said generated image with a specified reference mark which has been previously determined;

a recognition unit to recognize an arrangement of said detected plurality of specified marks in said generated image data; and a judgment unit to judge if said generated image data contains a specified pattern comprising said plurality of specified identical shape marks arranged in a given relationship is contained in said input image data based on said recognized arrangement of said detected plurality of specified identical shape marks.

14. The scanning machine of claim 13, wherein said recognition unit recognizes the arrangement by recognizing a distance between each of said detected specified marks.

15. A scanning machine to prevent outputting by scanning of a document that is legally prohibited from being read out by the scanning, comprising:

a scanning device to scan said document and generate an image data of said document;

an image processing device to identify if said generated image data contains specified image data which is illegal to reproduce, said image processing device comprising:
- a detection unit to detect a plurality of specified marks having an identical shape in said generated image data by comparing said generated image with a specified reference mark which has been previously determined;
- a recognition unit to recognize a total number and an arrangement of said detected plurality of specified marks in said generated image data, wherein said total number and said arrangement are recognized on an outline of a previously determined pattern; and
- a judgment unit to judge if said generated image data contains a specified pattern comprising said plurality of specified identical shape marks arranged in a given relationship is contained in said input image data based on said recognized number of and arrangement of said detected plurality of specified identical shape marks.

16. A scanning machine to prevent outputting by scanning of a document that is legally prohibited from being read out by the scanning, comprising:
- a scanning device to scan said document and generate an image data of said document;
- an image processing device to identify if said generated image data contains specified image data which is illegal to reproduce, said image processing device comprising:
  - a detection unit to detect a plurality of specified marks having an identical shape in said generated image data by comparing said generated image with a specified reference mark which has been previously determined;
  - a memory to store locations of said detected specified marks;
  - a recognition unit to recognize a total number and an arrangement of said stored locations of said detected plurality of specified marks in said generated image data, wherein said total number and said arrangement are recognized on an outline of a previously determined pattern; and
  - a judgment unit to judge if said generated image data contains a specified pattern comprising said plurality of specified identical shape marks arranged in a given relationship is contained in said input image data based on said recognized number of and arrangement of said detected plurality of specified identical shape marks.

17. A printing machine to prevent printing of a document that is legally prohibited from being printed, comprising:
- a printing device, which receives image data from outside and performs specified processing needed for printing;
- an image processing device to identify if said received image data contains specified image data which is illegal to print, comprising:
- a detection unit to detect a plurality of specified marks having an identical shape in said received image data by comparing said received image data with a specified reference mark which has been previously determined;
- a recognition unit to recognize an arrangement of said detected plurality of specified marks in said received image data; and
- a judgment unit to judge if said received image data contains a specified pattern comprising said plurality of specified identical shape marks arranged in a given relationship is contained in said input image data based on said recognized arrangement of said detected plurality of specified identical shape marks.

18. The printing machine of claim 17, wherein said recognition unit recognizes the arrangement by recognizing a distance between each of said detected specified marks.

19. A printing machine to prevent printing of a document that is legally prohibited from being printed, comprising:
- a printing device, which receives image data from outside and performs specified processing needed for printing;
- an image processing device to identify if said received image data contains specified image data which is illegal to print, said image processing device comprising:
  - a detection unit to detect a plurality of specified marks having an identical shape in said received image data by comparing said generated image with a specified reference mark which has been previously determined;
  - a recognition unit to recognize a total number and an arrangement of said detected plurality of specified marks in said received image data, wherein said total number and said arrangement are recognized on an outline of a previously determined pattern; and
  - a judgment unit to judge if said received image data contains a specified pattern comprising said plurality of specified identical shape marks arranged in a given relationship is contained in said image data based on said recognized number of and arrangement of said detected plurality of specified identical shape marks.

20. A printing machine to prevent printing of a document that is legally prohibited from being printed, comprising:
- a printing device, which receives image data from outside and performs specified processing needed for printing;
- an image processing device to identify if said received image data contains specified image data which is illegal to print, said image processing device comprising:
  - a detection unit to detect a plurality of specified marks having an identical shape in said received image data by comparing said received image data with a specified reference mark which has been previously determined;
  - a memory to store locations of said detected specified marks;
  - a recognition unit to recognize a total number and an arrangement of said stored locations of said detected plurality of specified marks in said received image data, wherein said total number and said arrangement are recognized on an outline of a previously determined pattern; and
  - a judgment unit to judge if said received image data contains a specified pattern comprising said plurality of specified identical shape marks arranged in a given relationship is contained in said image data based on said recognized number of and arrangement of said detected plurality of specified identical shape marks.

* * * * *